US012454561B2

(12) United States Patent
Sobol et al.

(10) Patent No.: US 12,454,561 B2
(45) Date of Patent: Oct. 28, 2025

(54) METHODS AND COMPOSITIONS COMPRISING TUMOR SUPPRESSOR GENE THERAPY AND CD122/CD132 AGONISTS FOR THE TREATMENT OF CANCER

(71) Applicant: MULTIVIR INC., Houston, TX (US)

(72) Inventors: Robert E. Sobol, Houston, TX (US); Kerstin B. Menander, Houston, TX (US); Dora Wiederhold, Houston, TX (US); Sunil Chada, Houston, TX (US)

(73) Assignee: Multivir Inc., Houston, TX (US)

( * ) Notice: Subject to any disclaimer, the term of this patent is extended or adjusted under 35 U.S.C. 154(b) by 262 days.

(21) Appl. No.: 15/733,619

(22) PCT Filed: Mar. 19, 2019

(86) PCT No.: PCT/US2019/022985
§ 371 (c)(1),
(2) Date: Sep. 17, 2020

(87) PCT Pub. No.: WO2020/036635
PCT Pub. Date: Feb. 20, 2020

(65) Prior Publication Data
US 2021/0094991 A1   Apr. 1, 2021

Related U.S. Application Data

(60) Provisional application No. 62/803,887, filed on Feb. 11, 2019, provisional application No. 62/645,022, filed on Mar. 19, 2018.

(51) Int. Cl.
| | |
|---|---|
| C07K 14/47 | (2006.01) |
| A61K 35/768 | (2015.01) |
| A61K 48/00 | (2006.01) |
| A61P 35/00 | (2006.01) |
| C07K 14/54 | (2006.01) |
| C12N 15/86 | (2006.01) |
| A61K 9/00 | (2006.01) |
| A61K 45/06 | (2006.01) |

(52) U.S. Cl.
CPC ........ *C07K 14/4746* (2013.01); *A61K 35/768* (2013.01); *A61K 48/005* (2013.01); *A61P 35/00* (2018.01); *C07K 14/54* (2013.01); *C12N 15/86* (2013.01); *A61K 9/0019* (2013.01); *A61K 45/06* (2013.01); *C12N 2710/10343* (2013.01); *C12N 2710/24143* (2013.01)

(58) Field of Classification Search
CPC ..... C07K 14/4746; C07K 14/54; A61P 35/00; A61K 35/768; A61K 48/005; A61K 9/0019; A61K 45/06; C12N 15/86; C12N 2710/10343; C12N 2710/24143
See application file for complete search history.

(56) References Cited

U.S. PATENT DOCUMENTS

| | | | |
|---|---|---|---|
| 4,835,251 A | 5/1989 | Burnier et al. | |
| 5,023,321 A | 6/1991 | Hudson et al. | |
| 5,844,905 A | 12/1998 | McKay et al. | |
| 5,885,796 A | 3/1999 | Linsley et al. | |
| 6,740,320 B1 | 5/2004 | Zhang et al. | |
| 7,589,069 B1 | 9/2009 | Wold et al. | |
| 8,008,449 B2 | 8/2011 | Korman et al. | |
| 8,017,114 B2 | 9/2011 | Korman et al. | |
| 8,119,129 B2 | 2/2012 | Jure-Kunkel et al. | |
| 8,354,509 B2 | 1/2013 | Carven et al. | |
| 8,735,553 B1 | 5/2014 | Li et al. | |
| 2004/0208850 A1 | 10/2004 | Ellenhorn et al. | |
| 2007/0066552 A1* | 3/2007 | Clarke ................ | A61K 9/0014 424/440 |

(Continued)

FOREIGN PATENT DOCUMENTS

| | | |
|---|---|---|
| CN | 101658670 | 3/2010 |
| CN | 106659757 | 5/2017 |

(Continued)

OTHER PUBLICATIONS

Dubois et al ("Preassociation of IL-15 with IL-15R-IgG1-Fc Enhances Its Activity on Proliferation of NK and CD8/CD44high T Cells and Its Antitumor Action," The Journal of Immunology, 2008, 180: 2099-2106) (Year: 2008).*
Lebedeva et al ("Restoring apoptosis as a strategy for cancer gene therapy: focus on p53 and mda-7;" Seminars in Cancer Biology 13 (2003) 169-178) (Year: 2003).*
Dubois et al; Preassociation of IL-15 with IL-15Ra-IgG1-Fc Enhances Its Activity on Proliferation of NK and CD8+/CD44high T Cells and Its Antitumor Action; The Journal of Immunology, 2008, 180: 2099-2106 (Year: 2008).*
Aghi et al., "Multimodal cancer treatment mediated by a replicating oncolytic virus that delivers the oxazaphosphorine/rat cytochrome P450 2B1 and ganciclovir/herpes simplex virus thymidine kinase gene therapies," *Cancer Res.*, 59:3861-3865, 1999.
Ali et al., "Inactivation of the PI3K p110δ breaks regulatory T cell-mediated immune tolerance to cancer," *Nature*, 7505:407-411, 2014.

(Continued)

*Primary Examiner* — Fereydoun G Sajjadi
*Assistant Examiner* — Masudur Rahman
(74) *Attorney, Agent, or Firm* — pH IP LAW

(57) ABSTRACT

Provided herein are methods and compositions for treating cancer in an individual comprising administering to the individual an effective amount of at least one CD 122/CD 132 agonist, at least one immune checkpoint inhibitor and a viral composition comprising one or more viruses engineered to overexpress a tumor suppressor gene and/or an adenoviral death protein. Also provided herein are methods and compositions for treating cancer in an individual comprising administering to the individual an effective amount of at least one oncolytic viral composition and at least one CD122/CD132 agonist and at least one immune checkpoint inhibitor. Also provided herein are methods of enhancing anti-tumor efficacy by administering the agents described above in combination with other cancer therapies. In highly aggressive forms of cancer, known to be generally resistant to immune therapies, these treatments unexpectedly resulted in complete tumor remissions and curative outcomes.

23 Claims, 19 Drawing Sheets

(56) References Cited

U.S. PATENT DOCUMENTS

| | | | |
|---|---|---|---|
| 2007/0281041 | A1 | 12/2007 | Ramesh et al. |
| 2009/0004145 | A1* | 1/2009 | Ramesh ............ A61K 38/1709 514/44 R |
| 2010/0034776 | A1 | 2/2010 | Wold et al. |
| 2011/0008369 | A1 | 1/2011 | Finnefrock et al. |
| 2011/0039778 | A1 | 2/2011 | Barlos |
| 2014/0294898 | A1 | 10/2014 | Miller et al. |
| 2015/0072988 | A1 | 3/2015 | Carducci et al. |
| 2015/0250837 | A1 | 9/2015 | Nolin et al. |
| 2016/0331844 | A1* | 11/2016 | Fotin-Mleczek .... A61K 48/005 |
| 2017/0044229 | A1 | 2/2017 | Garcia et al. |
| 2017/0151310 | A1 | 6/2017 | Felber et al. |
| 2017/0312351 | A1 | 11/2017 | Niazi et al. |

FOREIGN PATENT DOCUMENTS

| | | |
|---|---|---|
| EP | 2522726 | 11/2012 |
| EP | 1869190 | 7/2015 |
| JP | 2010-531878 | 9/2010 |
| JP | 2017-518361 | 7/2017 |
| JP | 2000-516618 | 12/2020 |
| WO | WO 1998/042752 | 3/1998 |
| WO | WO 1998/006441 | 12/1998 |
| WO | WO 2000/037504 | 6/2000 |
| WO | WO 2001/005437 | 1/2001 |
| WO | WO 2001/014424 | 3/2001 |
| WO | WO 2004/058801 | 7/2004 |
| WO | WO 2012/009703 | 1/2012 |
| WO | WO 2013/112942 | 8/2013 |
| WO | WO 2014/047350 | 3/2014 |
| WO | WO 2014/063601 | 5/2014 |
| WO | WO 2014/150056 | 9/2014 |
| WO | WO 2015/016718 | 2/2015 |
| WO | WO 2015/069770 | 5/2015 |
| WO | WO 2015/077624 | 5/2015 |
| WO | WO 2015/150809 | 10/2015 |
| WO | WO 2016/008976 | 1/2016 |
| WO | WO 2016/009017 | 1/2016 |
| WO | WO 2017/079746 | 5/2017 |
| WO | WO 2018234862 | 12/2018 |

OTHER PUBLICATIONS

Amin et al., "Nivolumab (anti-PD-1; BMS-936558, ONO-4538) in combination with sunitinib or pazopanib in patients (pts) with metastatic renal cell carcinoma (mRCC),"2014 ASCO Annual Meeting Abstracts, *Journal of Clinical Oncology*, 32(15-suppl (May 20 Supplement)):5010, 2014.

Anonymous, "Study of Atezolizumab in combination with Cobimetinib in participants with locally advanced or metastatic solid tumors," ClinicalTrials.gov, retrieved from the internet: URL:https://clinicaltrials.gov/archive/NCT01988896/2014_12_01, Dec. 1, 2014; retrieved Mar. 7, 2016.

Balint and Vousden, "Activation and activities of the p53 tumour suppressor protein," *Br. J. Cancer*, 85(12):1813-1823, 2001.

Chase et al., "An oncolytic viral mutant that delivers the CYP2B1 transgene and augments cyclophosphamide chemotherapy," *Nat. Biotechnol.*, 16(5):444-8, 1998.

Choi et al., "Effect of decorin on overcoming the extracellular matrix barrier for oncolytic virotherapy," *Gene Therapy*, 17(2):190-201, 2010.

Doronin et al., "Overexpression of the ADP (E3-11.6K) protein increases cell lysis and spread of adenovirus," *Virology*, 305(2):378-387, 2003.

English translation of Office Communication issued in Japanese Patent Application No. 2018-543282, dated Oct. 2, 2020.

Ferguson et al., "Targeting Innate Host Immunity Through PI3K Delta for Enhancement of Systemic Delivery of Oncolytic Vaccinia Virus," Abstract, *Molecular Therapy*, 23(1):S258-259, 2015.

Ferretti et al., "Insights into the mechanism of action of NVP-HDM201, a differential and versatile next-generation small-molecule inhibitor of Mdm2, under evaluation in phase I clinical trials," In: *Proceedings from the 107th Annual Meeting of the American Association for Cancer Research (AACR)*, Abstract No. 1224, New Orleans, LA, Apr. 16-20, 2016.

Ganguli et al., "MDM2 induces hyperplasia and premalignant lesions when expressed in the basal layer of the epidermis," *EMBO J.*, 19(19):5135-5147, 2000.

Hardwick et al., "p53MVA therapy in patients with refractory gastrointestinal malignancies elevates p53-specific CD8+ T-cell responses," *Clinical Cancer Research*, 20(17):4459-4470, 2014.

Holzer et al., "Discovery of NVP-HDM201—first disclosure of a next-generation Mdm2 inhibitor with superior characteristics," In: *Proceedings from the 107th Annual Meeting of the American Association for Cancer Research (AACR)*, Abstract No. 4855, New Orleans, LA, Apr. 16-20, 2016.

Honda et al., "Oncoprotein MDM2 is a ubiquitin ligase E3 for tumor suppressor p53," *FEBS Lett.*, 420:25-27, 1997.

Jeay et al., "NVP-HDM201: cellular and in vivo profile of a novel highly potent and selective PPI inhibitor of p53-Mdm2," In: *Proceedings from the 107th Annual Meeting of the American Association for Cancer Research (AACR)*, Abstract No. 1225, New Orleans, LA, Apr. 16-20, 2016.

Kanai and Rabkin, "Combinatorial strategies for oncolytic herpes simplex virus therapy of brain tumors," *CNS Oncol.*, 2(2):129-142, 2013.

Kim et al., "Relaxin expression from tumor-targeting adenoviruses and its intratumoral spread, apoptosis induction, and efficacy," *Journal of the National Cancer Institute*, 98(20):1482-1493, 2006.

Kreil, "Hyaluronidases—a group of neglected enzymes," *Protein Sci.*, 4(9):1666-1669, 1995.

Lichtenstein et al., "Functions and mechanisms of action of the adenovirus E3 proteins," *Int. Rev. Immunol.*, 23(1-2):75-111, 2004.

Liu et al., "ICP34.5 deleted herpes simplex virus with enhanced oncolytic, immune stimulating, and anti-tumour properties," *Gene Therapy*, 10(4):292-303, 2003.

Ma et al., "Combination of adenoviruses expressing melanoma differentiation-associated gene-7 and chemotherapeutic agents produces enhanced cytotoxicity on esophageal carcinoma," *Cancer Gene Therapy*, 21(1):31-37, 2014.

McKenzie et al., "Combination therapy of Ad-mda7 and trastuzumab increases cell death in Her-2/neu-overexpressing breast cancer cells," *Surgery*, 136(2):437-442, 2004.

Mhashilkar et al., "Melanoma differentiation associated gene-7 (mda-7): a novel anti-tumor gene for cancer gene therapy," *Mol. Medicine*, 7(4):271-282, 2001.

Minev et al., "Combination immunotherapy with oncolytic vaccinia virus and checkpoint inhibitor following local tumor irradiation," *Journal for Immunotherapy of Cancer*, 2(Suppl. 3):p. 112, 2014.

National Institutes of Health (NIH). ClinicalTrials.gov. http://clinicaltrials.gov/show/NCT02143635. Accessed Apr. 6, 2016.

National Institutes of Health (NIH). ClinicalTrials.gov. http://clinicaltrials.gov/show/NCT02343172. Accessed Nov. 14, 2016.

Okazaki et al., "PD-1 and PD-1 ligands: from discovery to clinical application," *Intern. Immun.*, 19(7):813-24, 2007.

Pardoll, "The blockade of immune checkpoints in cancer immunotherapy," *Nat Rev Cancer*, 12(4):252-64, 2012.

PCT International Invitation to Pay Additional Fees issued in International Application No. PCT/US2016/060833, dated Mar. 3, 2017.

PCT International Search Report and Written Opinion issued in International Application No. PCT/US2019/022985, dated Feb. 5, 2020.

PCT International Search Report and Written Opinion issued in International Application No. PCT/US2017/065861, dated May 22, 2018.

PCT International Search Report and Written Opinion issued in International Application No. PCT/US2016/060833, dated May 10, 2017.

PCT Invitation to Pay Additional Fees issued in International Application No. PCT/US2017/065861, dated Mar. 23, 2018.

Rajani et al., "Combination Therapy with Reovirus and Anti-PD-1 Blockade Controls Tumor Growth Through Innate and Adaptive Immune Responses," *Molecular Therapy*, 24(1):166-174, 2016.

(56) References Cited

OTHER PUBLICATIONS

Ren et al., "Enhancement of CD8+ T-cell memory by removal of a vaccinia virus nuclear factor-kappaB inhibitor," *Immunology*, 145(1):34-49, 2015.

Rojas et al., "Defining Effective Combinations of Immune Checkpoint Blockade and Oncolytic Virotherapy," *Clinical Cancer Research*, 21(24):5543-5551, 2015.

Shen et al., "Immunovirotherapy with vesicular stomatitis virus and PD-L1 blockade enhances therapeutic outcome in murine acute myeloid leukemia," *Blood*, 127(11):1449-1458, 2014.

Sobol et al., "Tumor Suppressors Mediate Anti-Tumor Immune Responses: Pre-Clinical and Clinical Results," Abstract, presented at Cancer Prevention & Research Institute of Texas, Austin, Texas, Nov. 9-10, 2015.

Stachyra-Valat et al., "NVP-HDM201: biochemical and biophysical profile of a novel highly potent PPI inhibitor of p53-Mdm2," In: *Proceedings from the 107th Annual Meeting of the American Association for Cancer Research (AACR)*, Abstract No. 1239, New Orleans, LA, Apr. 16-20, 2016.

Sumner et al., "Increased attenuation but decreased immunogenicity by deletion of multiple vaccinia virus immunomodulators," *Vaccine*, 34(40):4827-4834, 2016.

Toda et al., "Tumor growth inhibition by intratumoral inoculation of defective herpes simplex virus vectors expressing granulocyte-macrophage colony-stimulating factor," *Mol. Therapy*, 2(4):324-329, 2000.

Tollefson et al., "The adenovirus death protein (E3-11.6K) is required at very late stages of infection for efficient cell lysis and release of adenovirus from infected cells," *J. Virol.*, 70(4):2296-2306, 1996.

Tysome et al., "A novel therapeutic regimen to eradicate established solid tumors with an effective induction of tumor-specific immunity," *Clin. Cancer Res.*, 18(24):6679-89, 2012.

Vogelstein et al., "Surfing the p53 network," *Nature*, 408:307-310, 2000.

Wei et al., "Combinatorial PD-1 blockade and CD137 activation has therapeutic efficacy in murine cancer models and synergizes with cisplatin," *PLoS One*, 8(12):e84927, 2013.

Woller et al., "Viral Infection of Tumors Overcomes Resistance to PD-1-immunotherapy by Broadening Neoantigenome-directed T-cell Responses," *Molecular Therapy*, 23(10):1630-1640, 2015.

Xu et al., "The systemic delivery of an oncolytic adenovirus expressing decorin inhibits bone metastasis in a mouse model of human prostate cancer," *Gene Therapy*, 22(3):247-256, 2015.

Zamarin et al., "Localized oncolytic virotherapy overcomes systemic tumor resistance to immune checkpoint blockade immunotherapy," *Science Translational Medicine*, 6(226)226ra32-226ra32, 2014.

Zamarin et al., "Potentiation of immunomodulatory antibody therapy with oncolytic viruses for treatment of cancer," *Molecular Therapy—Oncolytics*, 1:14004, 2014.

Zeimet and Marth, "Why did p53 gene therapy fail in ovarian cancer?" *The Lancet Oncology*, 4(7):415-422, 2003.

Zhang et al., "High-efficiency gene transfer and high-level expression of wild-type p53 in human lung cancer cells mediated by recombinant adenovirus," *Cancer Gene Ther.*, 1(1):5-13, 1994.

Zhang et al., "Negative regulation of HDM2 to attenuate p53 degradation by ribosomal protein L26," *Nucleic Acids Res.*, 38(19):6544-6554, 2010.

Extended European Search Report issued in European Application No. 19850329.4, issued Feb. 24, 2022.

Alter et al, "Targeted IL-15-based Protein Fusion Complexes as Cancer Immunotherapy Approaches," *Journal of Immunological Sciences*, 2(1): 15-18, 2018.

Gaston et al., "Production of Bioactive Soluble Interleukin-15 in Complex with Interleukin-15 Receptor Alpha from a Conditionally-Replicating Oncolytic HSV-1," *PLoS One*, 8(11): e81768, 2013.

Office Communication issued in Chinese Patent Application No. 201980026649.1, dated Apr. 23, 2023.

Office Communication issued in European Patent Application No. 19850329.4, dated May 17, 2023.

Office Communication issued in Japanese Patent Application No. 2020-550758, dated Apr. 18, 2023.

English translation of Final Office Action issued in Japanese Patent Application No. 2020-550758, mailed Jan. 16, 2024.

English translation of Office Action issued in Chinese Patent Application No. 201980026649.1, dated Dec. 27, 2023.

\* cited by examiner

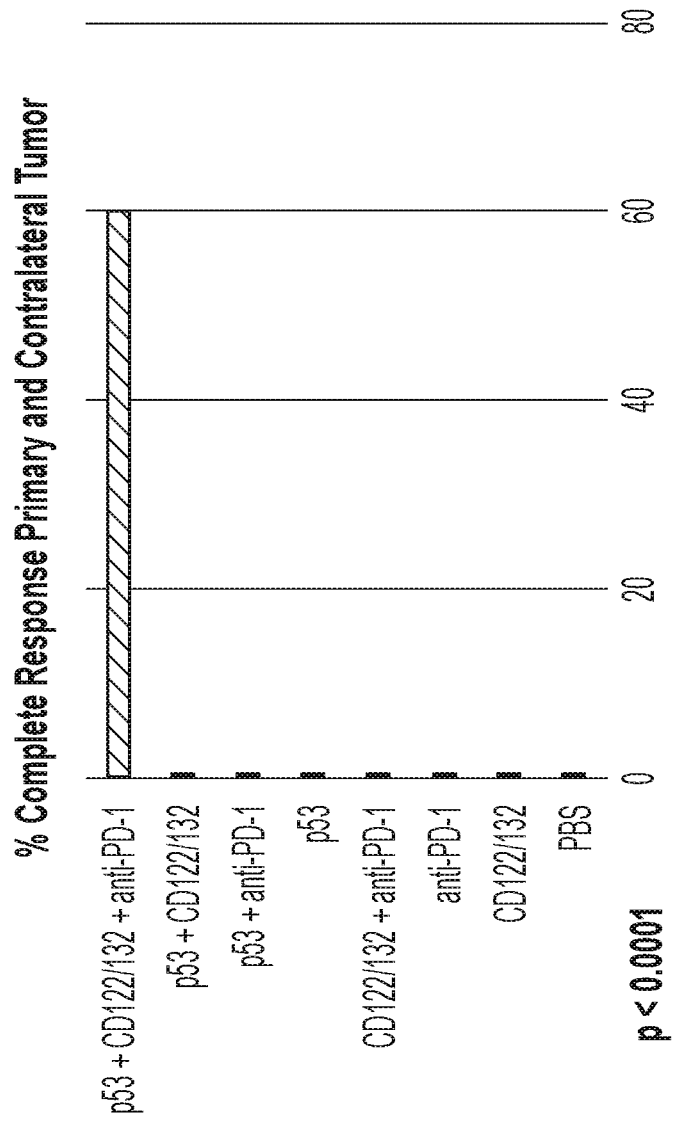

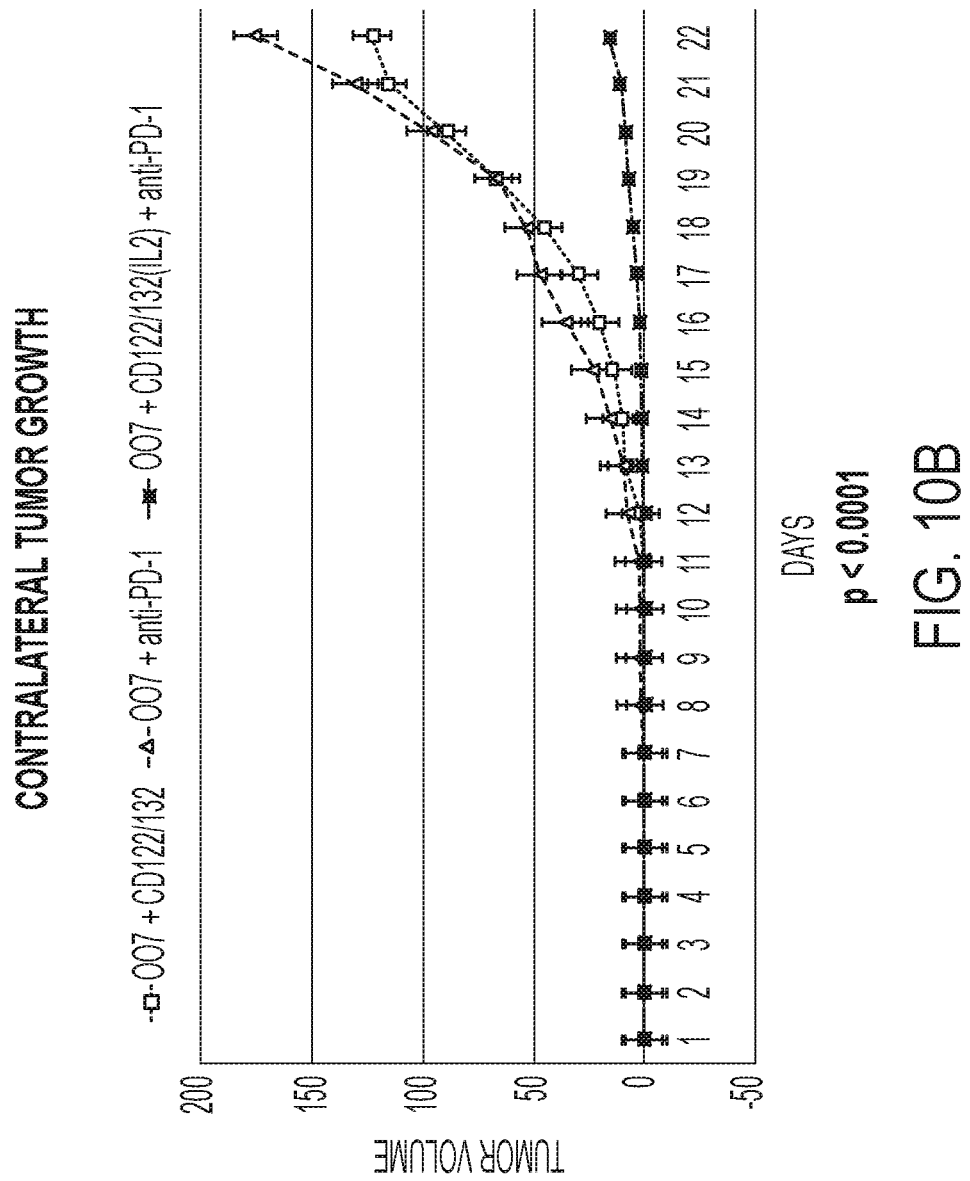

METHODS AND COMPOSITIONS COMPRISING TUMOR SUPPRESSOR GENE THERAPY AND CD122/CD132 AGONISTS FOR THE TREATMENT OF CANCER

This application is a national phase application under 35 U.S.C. § 371 of International Application No. PCT/US2019/022985, filed Mar. 19, 2019, which claims the benefit of U.S. Provisional Patent Application Ser. Nos. 62/645,022, filed Mar. 19, 2018 and 62/803,887, filed Feb. 11, 2019, which are each incorporated herein by reference in their entirety.

BACKGROUND

1. Field

The present invention relates generally to the fields of biology and medicine. More particularly, it concerns methods and compositions that combine the restoration or amplification of tumor suppressor function with a preferential CD122/CD132 agonist.

2. Description of Related Art

Malignant cells are frequently resistant to DNA damaging agents such as chemotherapy and irradiation-induced programmed cell death or apoptosis. Such resistance is generally the result of the abnormal expression of certain oncogenes or the loss of expression of tumor suppressor genes in the control of apoptosis. Strategies designed to replace defective tumor suppressor genes, as well as to force expression of apoptosis-inducing genes offer promise for restoring this mode of cell death in tumor cells.

Perhaps one of the most studied tumor suppressor genes is p53 which plays critical roles in several processes including cell-cycle regulation and control of apoptosis (Hartwell et al., 1994). p53 mutations are frequent in tumor cells and have been associated with cancer progression and the development of resistance to both chemotherapy and radiation therapy (Spitz et al., 1996). Preclinical studies both in vitro and in vivo have shown that restoration of wild-type (wt) p53 function can induce apoptosis in cancer cells. Intratumoral injection in animal models of retroviral or adenoviral wt-p53 constructs results in tumor regression for a variety of different tumor histologies, including non-small-cell lung cancer (NSCLC), leukemia, glioblastoma, and breast, liver, ovarian, colon and kidney cancers (Fujiwara et al., 1994). Promising preclinical and clinical data led to the initiation of an international randomized phase II/III trial of p53 gene-therapy trial for first-line treatment of patients with ovarian cancer (Buller et al., 2002). However, the study was closed after the first interim analysis because an adequate therapeutic benefit was not shown (Zeimet and Marth, 2003).

Thus, despite significant progress with tumor suppressor gene therapy, several hurdles still limit success in the clinic, including non-specific expression, low-efficiency delivery and biosafety. In addition, there are multiple genetic changes in cancer and epigenetic dysregulations leading to aberrant silencing of genes; thus, single gene therapy might not be a suitable strategy for the treatment of cancer. Thus, methods targeting multiple tumor suppressors in combination with other anti-cancer agents are needed for enhanced anti-tumor activity and efficient delivery of the gene therapy.

SUMMARY

In one embodiment, the present disclosure provides methods and compositions for treating cancer in a subject comprising administering an effective amount of (1) a nucleic acid encoding p53 and/or a nucleic acid encoding MDA-7 and (2) at least one CD122 agonist and CD132 agonist (e.g., a preferential CD122/CD132 agonist) to the subject.

In some aspects, the subject is administered a nucleic acid encoding p53. In certain aspects, the subject is administered a nucleic acid encoding MDA7. In some aspects, the subject is administered a nucleic acid encoding p53 and a nucleic acid encoding MDA7.

In particular aspects, the nucleic acid encoding p53 and/or a nucleic acid encoding MDA-7 and/or the CD122/CD132 agonist are delivered in an amount effective to restore or amplify tumor suppressor function. In specific aspects, the nucleic acid encoding p53 and/or a nucleic acid encoding MDA-7 are delivered to one or more tumor sites. In certain aspects, more than one CD122/CD132 agonist is administered. In particular aspects, the subject is a human.

In certain aspects, the CD122/CD132 agonist preferentially binds to the CD122/CD132 receptor complex and has lower affinity binding for CD25 or the IL15 alpha receptor as compared to the affinity binding to the CD122/CD132 receptor complex. In specific aspects, the one or more CD122/CD132 agonists are an IL-2/anti-IL-2 immune complex, an IL-15/anti-IL-15 immune complex, an IL-15/IL-15 Receptor α-IgG1-Fc (IL-15/IL-15Rα-IgG1-Fc) immune complex, PEGylated IL-2, PEGylated IL-15, IL-2 mutein and/or IL-15 mutein. The CD122/CD132 agonist may be an IL-15 mutant (e.g., IL-15N72D) bound to an IL-15 receptor α/IgG1 Fc fusion protein, such as ALT-803. In certain aspects, IL-15 is pre-complexed with IL-15Rα to preferentially bind to CD122/CD132. In particular aspects, the IL-2 receptor agonist is not F42K.

In some aspects, the nucleic acid encoding p53 and/or the nucleic acid encoding MDA-7 is delivered by viral and/or non-viral methods. In certain aspects, the nucleic acid encoding p53 and/or the nucleic acid encoding MDA-7 is delivered in an expression cassette, such as in a viral vector. In some aspects, p53 and MDA-7 are under the control of a single promoter, such as cytomegalovirus (CMV), SV40, or PGK. In certain aspects, the viral vector is an adenoviral vector (e.g., adenoviral vector overexpressing ADP), a retroviral vector, a vaccinia viral vector (e.g., NIL-deleted vaccinia viral vector), an adeno-associated viral vector, a herpes viral vector, a vesicular stomatitis viral vector, a polyoma viral vector. In some aspects, the nucleic acid encoding p53 and/or nucleic acid encoding MDA-7 are delivered by gene editing methods, such as Zinc Finger Nucleases (ZFN), Transcription Activator Like Effector Nucleases (TALEN), or Clustered Regularly Interspaced Short Palindromic Repeats (CRISPR), such as to restore or amplify expression of tumor suppressor genes. Combinations of viral and non-viral gene delivery and expression and/or gene editing methods are considered in the present disclosure. In certain aspects, the adenoviral p53 (Ad-p53) injection dose (mL) results in each tumor lesion receiving an Ad-p53 dose of at least $1\times10^{11}$ viral particles (vp)/$cm^3$ of tumor volume. In some aspects, the nucleic acid encoding p53 and/or nucleic acid encoding MDA-7 is administered to the subject in a lipoplex. In some aspects, the lipoplex comprises DOTAP and at least one cholesterol, cholesterol derivative, or cholesterol mixture.

In some aspects, the nucleic acid encoding p53 and/or the nucleic acid encoding MDA-7 is administered to the subject intravenously, intra-arterially, intravascularly, intrapleuraly, intraperitoneally, intratracheally, intratumorally, intrathecally, intramuscularly, endoscopically, intralesionally, percutaneously, subcutaneously, regionally, stereotactically, or by direct injection or perfusion. In particular aspects, the nucleic acid encoding p53 and/or the nucleic acid encoding MDA-7 is administered to the subject intratumorally. In some aspects, administering comprises a local or regional injection. In some aspects, administering is via continuous infusion, intratumoral injection, or intravenous injection.

In some aspects, the subject is administered the nucleic acid encoding p53 and/or the nucleic acid encoding MDA-7 more than once. In certain aspects, the subject is administered the at least one CD122/CD132 agonist more than once. In some aspects, the subject is administered the nucleic acid encoding p53 and/or the nucleic acid encoding MDA-7 before, simultaneously, or after the at least one CD122 agonist and CD132 agonist.

In some aspects, the cancer is melanoma, non-small cell lung, small-cell lung, lung, hepatocarcinoma, retinoblastoma, astrocytoma, glioblastoma, leukemia, neuroblastoma, head, neck, breast, pancreatic, prostate, renal, bone, testicular, ovarian, mesothelioma, cervical, gastrointestinal, urogenital, respiratory tract, hematopoietic, musculoskeletal, neuroendocrine, carcinoma, sarcoma, central nervous system, peripheral nervous system, lymphoma, brain, colon or bladder cancer. In particular aspects, the cancer is metastatic.

In some aspects, the method further comprises administering at least one additional anticancer treatment. In certain aspects, the at least one additional anticancer treatment is surgical therapy, chemotherapy, radiation therapy, hormonal therapy, immunotherapy, small molecule therapy, receptor kinase inhibitor therapy, anti-angiogenic therapy, cytokine therapy, cryotherapy, radioablation or a biological therapy. In some aspects, the biological therapy is a monoclonal antibody, siRNA, miRNA, antisense oligonucleotide, ribozyme, gene editing, cellular therapy or gene therapy.

In some aspects, the at least one additional anticancer treatment is an immune checkpoint inhibitor. In certain aspects the immune checkpoint inhibitor is of CTLA-4, PD-1, PD-L1, PD-L2, LAG-3, BTLA, B7H3, B7H4, TIM3, KIR, or A2aR. In some aspects, the at least one immune checkpoint inhibitor is an anti-CTLA-4 antibody. In some aspects, the anti-CTLA-4 antibody is tremelimumab or ipilimumab. In certain aspects, the at least one immune checkpoint inhibitor is an anti-killer-cell immunoglobulin-like receptor (KIR) antibody. In some embodiments, the anti-KIR antibody is lirilumab. In some aspects, the inhibitor of PD-L1 is durvalumab, atezolizumab, or avelumab. In some aspects, the inhibitor of PD-L2 is rHIgM12B7. In some aspects, the LAG3 inhibitor is IMP321, or BMS-986016. In some aspects, the inhibitor of A2aR is PBF-509. In some aspects, the at least one immune checkpoint inhibitor is a human programmed cell death 1 (PD-1) axis binding antagonist. In certain aspects, the PD-1 axis binding antagonist is selected from the group consisting of a PD-1 binding antagonist, a PDL1 binding antagonist and a PDL2 binding antagonist. In some aspects, the PD-1 axis binding antagonist is a PD-1 binding antagonist. In certain aspects, the PD-1 binding antagonist inhibits the binding of PD-1 to PDL1 and/or PDL2. In particular, the PD-1 binding antagonist is a monoclonal antibody or antigen binding fragment thereof. In some embodiments, the PD-1 binding antagonist is nivolumab, pembrolizumab, pidilizumab, AMP-514, REGN2810, CT-011, BMS 936559, MPDL3280A or AMP-224.

In some aspects, the at least one additional therapy is a histone deacetylase (HDAC) inhibitor. In certain aspects, the HDAC inhibitor is tractinostat (CHR-3996 or VRx-3996). In certain aspects, the method further comprises providing an extracellular matrix-degrading protein, such as relaxin, hyaluronidase or decorin.

In some aspects, the at least one additional anticancer treatment is an oncolytic virus. In some aspects, the oncolytic virus is engineered to express p53, MDA-7, IL-12, TGF-β inhibitor, and/or IL-10 inhibitor. In certain aspects, the oncolytic virus is a single- or double-stranded DNA virus, RNA virus, adenovirus, adeno-associated virus, retrovirus, lentivirus, herpes virus, pox virus, vaccinia virus, vesicular stomatitis virus, polio virus, Newcastle's Disease virus, Epstein-Barr virus, influenza virus, reoviruses, myxoma virus, maraba virus, rhabdovirus, enadenotucirev or coxsackie virus. In some aspects, the oncolytic virus is engineered to express a cytokine, such as granulocyte-macrophage colony-stimulating factor (GM-CSF) or IL-12. In some aspects, the oncolytic virus is further defined as talimogene laherparepvec (T-VEC). In some aspects, the oncolytic adenoviral vector is derived from an Elb deleted adenovirus, and adenovirus where the Ad Ela gene is driven by the alpha-fetoprotein (AFP) promoter, a modified TERT Promoter Oncolytic Adenovirus, the HRE-E2F-TERT Hybrid Promoter Oncolytic Adenovirus, and/or an adenovirus with a modified Ela regulatory sequence wherein at least one Pea3 binding site, or a functional portion thereof, is deleted with an Elb-19K clone insertion site, which may all be modified to express therapeutic genes.

In certain aspects, the at least one additional anticancer treatment is a protein kinase or growth factor signaling pathways inhibitor. In certain aspects, the protein kinase or growth factor signaling pathways inhibitor is Afatinib, Axitinib, Bevacizumab, Bosutinib, Cetuximab, Crizotinib, Dasatinib, Erlotinib, Fostamatinib, Gefitinib, Imatinib, Lapatinib, Lenvatinib, Mubritinib, Nilotinib, Panitumumab, Pazopanib, Pegaptanib, Ranibizumab, Ruxolitinib, Saracatinib, Sorafenib, Sunitinib, Trastuzumab, Vandetanib, AP23451, Vemurafenib, CAL101, PX-866, LY294002, rapamycin, temsirolimus, everolimus, ridaforolimus, Alvocidib, Genistein, Selumetinib, AZD-6244, Vatalanib, P1446A-05, AG-024322, ZD1839, P276-00 or GW572016. In some aspects, the protein kinase inhibitor is a PI3K inhibitor, such as a PI3K delta inhibitor.

In some aspects, the immunotherapy comprises a cytokine, such as GM-CSF, an interleukin (e.g., IL-2) and/or an interferon (e.g., IFNα) or heat shock proteins. In certain aspects, the immunotherapy comprises a co-stimulatory receptor agonist, a stimulator of innate immune cells, or an activator of innate immunity. In certain aspects, the co-stimulatory receptor agonist is an anti-OX40 antibody, anti-GITR antibody, anti-CD137 antibody, anti-CD40 antibody, or an anti-CD27 antibody. In some aspects, the stimulator of immune cells is an inhibitor of a cytotoxicity-inhibiting receptor or an agonist of immune stimulating toll like receptors (TLR). In some aspects, the cytotoxicity-inhibiting receptor is an inhibitor of NKG2A/CD94 or CD96 TACTILE. In some aspects, the TLR agonist is a TLR7 agonist, TLR8 agonist, or TLR9 agonist. In some aspects, the immunotherapy comprises a combination of a PD-L1 inhibitor, a 4-1BB agonist, and an OX40 agonist. In certain aspects, the immunotherapy comprises a stimulator of interferon genes (STING) agonist. In some aspects, the activator of innate immunity is an IDO inhibitor, TGFβ inhibitor, or IL-10 inhibitor. In some aspects, when these immunotherapies are proteins, they may be delivered as polypeptides or their corresponding nucleic acids administered by replication competent and/or replication incompetent viral and/or non-viral gene therapy. In some aspects, the chemotherapy comprises a DNA damaging agent, such as gamma-irradiation, X-rays, UV-irradiation, microwaves, electronic emissions, adriamycin, 5-fluorouracil (5FU), capecitabine, etoposide (VP-16), camptothecin, actinomycin-D, mitomycin C, cisplatin (CDDP), or hydrogen peroxide.

In another embodiment, there is provided a method of treating cancer in a subject comprising administering an effective amount of at least one oncolytic virus and at least one CD122/CD132 agonist to the subject and at least one immune checkpoint inhibitor. In some aspects, the least one oncolytic virus is an adenovirus engineered to overexpress the adenoviral death protein (ADP), such as VirRx007. In some aspects, the least one oncolytic virus is genetically modified to express p53, MDA-7, a cytokine, and/or immune stimulatory gene. In particular aspects, the cytokine is GM-CSF or IL-12. In some aspects, the immune stimulatory gene is an inhibitor of TGFβ or IL-10.

In some aspects, the at least one oncolytic virus is selected from the group consisting of a single- or double-stranded DNA virus, RNA virus, adenovirus, adeno-associated virus, retrovirus, lentivirus, herpes virus, pox virus, vaccinia virus, vesicular stomatitis virus, polio virus, Newcastle's Disease virus, Epstein-Barr virus, influenza virus, reoviruses, myxoma virus, maraba virus, rhabdovirus, enadenotucirev, and coxsackie virus.

In some aspects, the viruses employed in the above embodiments comprise replication competent and/or replication defective viruses. In certain aspects, the replication competent or replication incompetent virus is a single or double stranded DNA virus, RNA virus, adenovirus, adeno-associated virus, retrovirus, lentivirus, herpes virus, pox virus, vaccinia virus, vesicular stomatitis virus, polio virus, Newcastle's Disease virus, myxoma virus, Epstein-Barr virus, influenza virus, reovirus, maraba virus, rhabdovirus, enadenotucirev or coxsackie virus. In certain aspects, one or more viruses are utilized. In certain aspects, the virus composition comprises a combination of replication competent and replication incompetent viruses.

In further aspects, the replication competent viruses in the above embodiments may be one or more oncolytic viruses. These oncolytic viruses may be engineered to express p53 and/or IL24 and/or to express a gene other than p53 and/or IL24, such as a cytokine (e.g. IL12) and/or another immune stimulatory gene (e.g., TGF-beta inhibitors or IL10 inhibitors or heat shock proteins). In certain aspects, the oncolytic virus may be used in lieu of or in addition to p53 and/or IL24 tumor suppressor therapy. Examples of oncolytic viruses include single or double stranded DNA viruses, RNA viruses, adenoviruses, adeno-associated viruses, retroviruses, lentiviruses, herpes viruses, pox viruses, vaccinia viruses, vesicular stomatitis viruses, polio viruses, Newcastle's Disease viruses, Epstein-Barr viruses, influenza viruses and reoviruses, myxoma viruses, maraba viruses, rhabdoviruses, enadenotucirev or coxsackie viruses. Exemplary oncolytic viruses include, but are not limited to, Ad5-yCD/mutTKSR39rep-hIL12, Cavatak™, CG0070, DNX-2401, G207, HF10, IMLYGIC™ JX-594, MG1-MA3, MV-NIS, OBP-301, Reolysin®, Toca 511, Oncorine (H101), Onyx-015, H102, H103, RIGVIR, an adenovirus overexpressing the adenoviral death protein (ADP), such as VirRx007, an NIL deleted vaccinia virus or an NIL deleted vaccinia virus expressing IL12.

In some aspects, the viral and non-viral nucleic acid and gene editing compositions induce local and/or systemic effects. In some aspects, these compositions induce local and systemic effects.

In particular aspects, the treated subject is a mammal or human. In certain aspects, the treatment is provided to prevent or treat a pre-malignant or a malignant hyperproliferative condition. In certain aspects of prevention, the subject is a healthy subject. In other aspects of prevention, the subject comprises a pre-malignant lesion, such as, for example, a leukoplakia or a dysplastic lesion. In other aspects of prevention, the subject is at risk of developing cancer, such as, for example, by being a smoker or having a family history of cancer. In certain aspects, the treatment is for initial or recurrent hyperproliferative conditions. In some aspects, the treatment is administered to augment or reverse resistance to another therapy. In certain aspects, the resistance to treatment is known historically for a particular population of hyperproliferative condition patients. In certain aspects, the resistance to treatment is observed in individual hyperproliferative condition patients.

In certain aspects of the above embodiments, the method further comprises providing an extracellular matrix-degrading protein. In some aspects, this comprises administering an expression cassette encoding the extracellular matrix-degrading protein. In some embodiments, the extracellular matrix-degrading protein is relaxin, hyaluronidase or decorin. In particular aspects, the extracellular matrix-degrading protein is relaxin. In some aspects, the expression cassette is in a viral vector. In certain aspects, the viral vector is an adenoviral vector, a retroviral vector, a vaccinia viral vector, an adeno-associated viral vector, a herpes viral vector, a vesicular stomatitis viral vector, or a polyoma viral vector or another type of viral or non-viral gene therapy vector.

In some aspects, the expression cassette encoding the extracellular matrix-degrading protein is administered intratumorally, intraarterially, intravenously, intravascularly, intrapleuraly, intraperitoneally, intratracheally, intrathecally, intramuscularly, endoscopically, intralesionally, percutaneously, subcutaneously, regionally, stereotactically, or by direct injection or perfusion. In certain aspects, the subject is administered the nucleic acid encoding p53 and/or the nucleic acid encoding MDA-7 after the at least one CD122/CD132 agonist. In certain aspects, the subject is administered the nucleic acid encoding p53 and/or the nucleic acid encoding MDA-7 before the at least one CD122/CD132 agonist. In certain aspects, the subject is administered the nucleic acid encoding p53 and/or the nucleic acid encoding MDA-7 simultaneously with the at least one CD122/CD132 agonist. In particular aspects, the adenoviral vector is administered to the subject intratumorally. In some aspects, the nucleic acid encoding p53 and/or a nucleic acid encoding MDA-7 and at least one CD122/CD132 agonist induce abscopal (systemic) effects on distant tumors that are not injected with the nucleic acid encoding p53 and/or the nucleic acid encoding MDA-7.

In certain aspects, the cancer is melanoma, non-small cell lung, small-cell lung, lung, hepatocarcinoma, retinoblastoma, astrocytoma, glioblastoma, leukemia, neuroblastoma, head, neck, breast, pancreatic, prostate, renal, bone, testicular, ovarian, mesothelioma, cervical, gastrointestinal, urogenital, respiratory tract, hematopoietic, musculoskeletal, neuroendocrine, carcinoma, sarcoma, central nervous system, peripheral nervous system, lymphoma, brain, colon or bladder cancer. In some aspects, the cancer is metastatic.

In some aspects, the nucleic acid encoding p53 and/or the nucleic acid encoding MDA-7 is in an expression cassette. In certain aspects, the expression cassette is in a viral vector. In some embodiments, the viral vector is an adenoviral vector, a retroviral vector, a vaccinia viral vector, an adeno-associated viral vector, a herpes viral vector, a vesicular stomatitis viral vector, or a polyoma viral vector. In particular aspects, the viral vector is an adenoviral vector.

In certain aspects, the viral vector is administered at between about $10^3$ and about $10^{13}$ viral particles. In some aspects, the adenoviral vector is administered to the subject intravenously, intraarterially, intravascularly, intrapleurally, intraperitoneally, intratracheally, intratumorally, intrathecally, intramuscularly, endoscopically, intralesionally, percutaneously, subcutaneously, regionally, stereotactically, or by direct injection or perfusion. In certain aspects, the subject is administered the adenoviral vector more than once.

In some aspects, the subject is administered the nucleic acid encoding p53. In other aspects, the subject is administered the nucleic acid encoding MDA-7. In certain aspects, the subject is administered the nucleic acid encoding p53 and the nucleic acid encoding MDA-7. In some aspects, p53 and MDA-7 are under the control of a single promoter. In some embodiments, the promoter is a cytomegalovirus (CMV), SV40, or PGK.

In some aspects, the nucleic acid is administered to the subject in a lipoplex. In certain aspects, the lipoplex comprises DOTAP and at least one cholesterol, cholesterol derivative, or cholesterol mixture. In some aspects the nucleic acid is administered in a nanoparticle.

In certain aspects, administering comprises a local or regional injection. In other aspects, administering is via continuous infusion, intratumoral injection, or intravenous injection.

In some aspects, the method further comprises administering at least one additional anticancer treatment. In certain aspects, the at least one additional anticancer treatment is surgical therapy, chemotherapy (e.g., administration of a protein kinase inhibitor or a EGFR-targeted therapy), embolization therapy, chemoembolization therapy, radiation therapy, cryotherapy, hyperthermia treatment, phototherapy, radioablation therapy, hormonal therapy, immunotherapy, small molecule therapy, receptor kinase inhibitor therapy, anti-angiogenic therapy, cytokine therapy or a biological therapies such as monoclonal antibodies, siRNA, miRNA, antisense oligonucleotides, ribozymes or gene therapy.

In some aspects, the immunotherapy comprises a cytokine. In particular aspects, the cytokine is granulocyte macrophage colony-stimulating factor (GM-CSF), an interleukin such as IL-2, and/or an interferon such as IFN-alpha. Additional approaches to boost tumor-targeted immune responses include additional immune checkpoint inhibition. In some aspects, the immune checkpoint inhibition includes anti-CTLA4, anti-PD-1, anti-PD-L1, anti-PD-L2, anti-TIM-3, anti-LAG-3, anti-A2aR, or anti-KIR antibodies. In some aspects, the immunotherapy comprises co-stimulatory receptor agonists such as anti-OX40 antibody, anti-GITR antibody, anti-CD137 antibody, anti-CD40 antibody, and anti-CD27 antibody. In certain aspects, the immunotherapy comprises suppression of T regulatory cells (Tregs), myeloid derived suppressor cells (MDSCs) and cancer associated fibroblasts (CAFs). In further aspects, the immunotherapy comprises stimulation of innate immune cells, such as natural killer (NK) cells, macrophages, and dendritic cells. Additional immune stimulatory treatments may include IDO inhibitors, TGF-beta inhibitors, IL-10 inhibitors, stimulator of interferon genes (STING) agonists, toll like receptor (TLR) agonists (e.g., TLR7, TLR8, or TLR9), tumor vaccines (e.g., whole tumor cell vaccines, peptides, and recombinant tumor associated antigen vaccines), and adoptive cellular therapies (ACT) (e.g., T cells, natural killer cells, TILs, and LAK cells), and ACT with genetically engineered receptors (e.g., chimeric antigen receptors (CAR) and T cell receptors (TCR). In certain aspects, combinations of these agents may be used such as combining immune checkpoint inhibitors, checkpoint inhibition plus agonism of T-cell costimulatory receptors, and checkpoint inhibition plus TIL ACT. In certain aspects, additional anti-cancer treatment includes a combination of an immune checkpoint inhibitor (e.g., Avelumab), a 4-1BB (CD-137) agonist (e.g. Utomilumab), and an OX40 (TNFRS4) agonist.

In some aspects, the chemotherapy comprises a DNA damaging agent. In some embodiments, the DNA damaging agent is gamma-irradiation, X-rays, UV-irradiation, microwaves, electronic emissions, adriamycin, 5-fluorouracil (5FU), capecitabine, etoposide (VP-16). camptothecin. actinomycin-D, mitomycin C, cisplatin (CDDP), or hydrogen peroxide. In particular aspects, the DNA damaging agent is 5FU or capecitabine. In some aspects, the chemotherapy comprises a cisplatin (CDDP), carboplatin, procarbazine, mechlorethamine, cyclophosphamide, camptothecin, ifosfamide, melphalan, chlorambucil, bisulfan, nitrosurea, dactinomycin, daunorubicin, doxombicin, bleomycin, plicomycin, mitomycin, etoposide (VP16), tamoxifen, taxotere, taxol, transplatinum, 5-fluorouracil, vincristin, vinblastin, methotrexate, an HDAC inhibitor or any analog or derivative variant thereof.

In some aspects, the at least one additional cancer treatment is a protein kinase inhibitor or a monoclonal antibody that inhibits receptors involved in protein kinase or growth factor signaling pathways. For example, the protein kinase or receptor inhibitor can be an EGFR, VEGFR, AKT, Erb1, Erb2, ErbB, Syk, Bcr-Abl, JAK, Src, GSK-3, PI3K, Ras, Raf, MAPK, MAPKK, mTOR, c-Kit, eph receptor or BRAF inhibitor. In particular aspects, the protein kinase inhibitor is a PI3K inhibitor. In some embodiments, the PI3K inhibitor is a PI3K delta inhibitor. For example, the protein kinase or receptor inhibitor can be Afatinib, Axitinib, Bevacizumab, Bosutinib, Cetuximab, Crizotinib, Dasatinib, Erlotinib, Fostamatinib, Gefitinib, Imatinib, Lapatinib, Lenvatinib, Mubritinib, Nilotinib, Panitumumab, Pazopanib, Pegaptanib, Ranibizumab, Ruxolitinib, Saracatinib, Sorafenib, Sunitinib, Trastuzumab, Vandetanib, AP23451, Vemurafenib, CAL101, PX-866, LY294002, rapamycin, temsirolimus, everolimus, ridaforolimus, Alvocidib, Genistein, Selumetinib, AZD-6244, Vatalanib, P1446A-05, AG-024322, ZD1839, P276-00, GW572016, or a mixture thereof. In certain aspects, the protein kinase inhibitor is an AKT inhibitor (e.g., MK-2206, GSK690693, A-443654, VQD-002, Miltefosine or Perifosine). In certain aspects, EGFR-targeted therapies for use in accordance with the embodiments include, but are not limited to, inhibitors of EGFR/ErbB1/HER, ErbB2/Neu/HER2, ErbB3/HER3, and/or ErbB4/HER4. A wide range of such inhibitors are known and include, without limitation, tyrosine kinase inhibitors active against the receptor(s) and EGFR-binding antibodies or aptamers. For instance, the EGFR inhibitor can be gefitinib, erlotinib, cetuximab, matuzumab, panitumumab, AEE788; CI-1033, HKI-272, HKI-357, or EKB-569. The protein kinase inhibitor may be a BRAF inhibitor such as dabrafenib, or a MEK inhibitor such as trametinib.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 5: Complete Tumor Response Rates. It is generally appreciated that complete tumor responses to therapy are associated with important therapeutic benefits and are required for curative outcomes. As shown in FIG. 5 for the p53 treatment groups and their controls, only Ad-p53+CD122/132+anti-PD-1 treatment resulted in complete tumor remissions of both primary and contralateral tumors. Complete tumor responses of both primary and contralateral tumors were observed in 60% of the Ad-p53+CD122/132+anti-PD-1 treatment group (6 of 10 animals) and there were no complete tumor responses in any of the 70 animals in the other treatment groups (p-value <0.0001 by two-sided Fisher's Exact Test comparing Ad-p53+CD122/132+anti-PD-1 treatment group vs. animals in all other treatment groups; p-value <0.011 by two-sided Fisher's Exact Test comparing Ad-p53+CD122/132+anti-PD-1 treatment group vs. any other treatment group). Unexpectedly, the complete tumor responses were durable and were maintained after 40 days in 50% of the Ad-p53+CD122/132+anti-PD-1 treatment group presumably curing these animals of these tumors.

As shown in FIG. 6A, contralateral tumor growth was abolished in 90% of the animals receiving Ad-p53+CD122/132+anti-PD-1 primary tumor treatment (9 of 10 animals). In contrast, contralateral tumor growth was observed in 62.5-100% of animals in the other Ad-p53 treatment groups. This difference in contralateral tumor growth was statistically significant (p-value=0.0004 by Chi-square analysis for all treatment groups; p-value ≤0.0430 by two-sided Fisher's Exact Test comparing Ad-p53+CD122/132+anti-PD-1 treatment group vs. any other treatment group). FIG. 6B depicts a graph showing contralateral tumor volumes over time in rodents receiving the three most effective primary tumor treatments with either the combination of Ad-p53+CD122/132, Ad-p53+anti-PD-1, or Ad-p53+CD122/132+anti-PD-1. A statistical analysis of variance (ANOVA) comparison of these contralateral tumor volumes on Day 22 determined synergy of the anti-tumor effects of Ad-p53+CD122/132+anti-PD-1 treatment (p-value=0.0435 overall). Only the Ad-p53+CD122/132+anti-PD-1 group demonstrated a statistically significant decrease in contralateral tumor growth vs. the Ad-p53+anti-PD-1 group (p-value=0.0360). Taken together, these findings indicate that of all the Ad-p53 therapies, only the triplet combination Ad-p53+CD122/132+anti-PD-1 treatment resulted in curative efficacy by inducing powerful local and systemic anti-tumor immunity mediating substantial abscopal effects.

As shown in FIG. 9 for the VirRx007 treatment groups and their controls, only VirRx007+CD122/132+anti-PD-1 treatment resulted in complete tumor remissions of both primary and contralateral tumors. Complete tumor responses of both primary and contralateral tumors were observed in 60% of the VirRx007+CD122/132+anti-PD-1 treatment group and there were no complete tumor responses in any of the 70 animals in the other treatment groups (p-value <0.0001 by two-sided Fisher's Exact Test comparing VirRx007+CD122/132+anti-PD-1 treatment group vs. animals in all other treatment groups; p-value <0.011 by two-sided Fisher's Exact Test comparing VirRx007+CD122/132+anti-PD-1 treatment group vs. any other treatment group). Unexpectedly, the complete tumor responses were durable and maintained after 40 days in 50% of the VirRx007+CD122/132+anti-PD-1 treated animals presumably curing these animals of these tumors.

FIGS. 10A and 10B: Systemic/Abscopal Treatment Effects on Contralateral Tumor Growth. The systemic/abscopal effects of primary tumor treatment on contralaterally implanted tumors was assessed in rodents whose primary tumor had received one of the VirRx007 intra-tumoral therapies. Consistent with the unexpected, substantially increased synergistic effects of VirRx007+CD122/132+anti-PD-1 treatment on primary tumor growth and complete remission rates, we also observed a surprisingly powerful and highly statistically significant abscopal effect of VirRx007+CD122/132+anti-PD-1 treatment compared to the other VirRx007 treatment groups. As shown in FIG. 10A, contralateral tumor growth was abolished in 80% of the animals whose primary tumors received VirRx007+ CD122/132+anti-PD-1 treatment. In contrast, contralateral tumor growth was observed in 80-100% of animals in the other VirRx007 treatment groups. This difference in contralateral tumor growth was statistically significant (p-value=0.0002 by Chi-square analysis comparing all treatment groups; p-value ≤0.0230 by two-sided Fisher's Exact Test comparing VirRx007+CD122/132+anti-PD-1 treatment group vs. any other treatment group). These findings imply that combination VirRx007+CD122/132+anti-PD-1 treatment induced powerful systemic anti-tumor immunity and mediated substantial abscopal effects with potential curative efficacy. FIG. 10B depicts a graph showing contralateral tumor volumes over time in rodents receiving the three most effective primary tumor combination treatments with either VirRx007+CD122/132, VirRx007+anti-PD-1, or VirRx007+ CD122/132+anti-PD-1. A statistical analysis of variance (ANOVA) comparison of these contralateral tumor volumes on Day 22 determined synergy of the anti-tumor effects of VirRx007+CD122/132+anti-PD-1 treatment (p-value=0.0171 overall). Only the VirRx007+CD122/132+ anti-PD-1 group demonstrated a statistically significant decrease in contralateral tumor growth vs. the VirRx007+ anti-PD-1 group (p-value=0.0115). Taken together, these findings indicate that of all the VirRx007 therapies, only the triplet combination VirRx007+CD122/132+anti-PD-1 treatment resulted in curative efficacy by inducing powerful local and systemic anti-tumor immunity mediating substantial abscopal effects.

FIG. 17 depicts a graph showing contralateral tumor volumes over time in rodents receiving primary tumor treatments with either the combination of Ad-p53+CD122/132, Ad-p53+anti-PD-1, or Ad-p53+CD122/132 (IL15)+anti-PD-1. A statistical analysis of variance (ANOVA) comparison of these contralateral tumor volumes on Day 22 determined synergy of the anti-tumor effects of Ad-p53+CD122/132(IL15)+anti-PD-1 treatment (p-value=0.0433 overall). Only the Ad-p53+CD122/132+anti-PD-1 group demonstrated a statistically significant decrease in contralateral tumor growth vs. the Ad-p53+anti-PD-1 group (p-value=0.0359). Taken together, these findings indicate that of all the Ad-p53 therapies, only the triplet combination Ad-p53+CD122/132+anti-PD-1 treatment resulted in curative efficacy by inducing powerful local and systemic anti-tumor immunity mediating substantial abscopal effects.

DESCRIPTION OF ILLUSTRATIVE EMBODIMENTS

Figure 1:
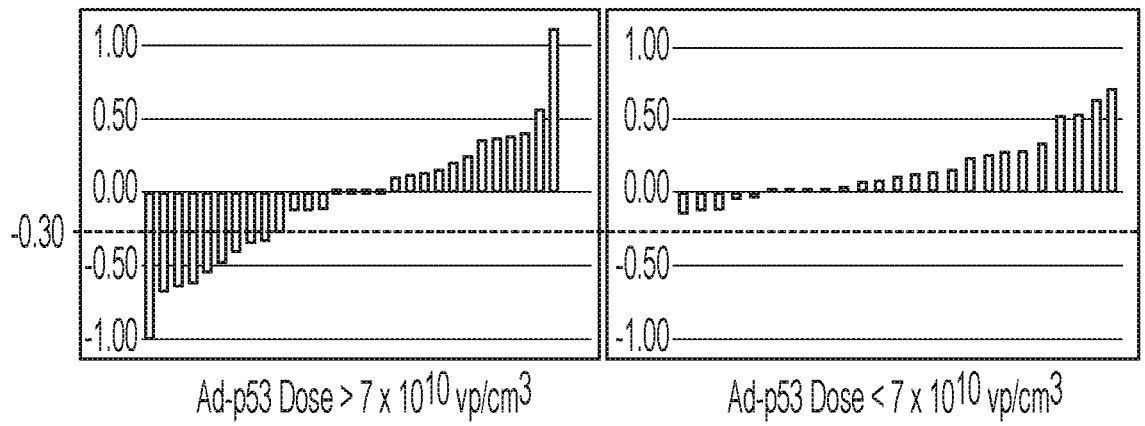
FIG. 1: Effective Ad-p53 Dosing and Tumor Response. Waterfall plots of tumor responses for favorable tumor p53 biomarker patient subgroups treated with Ad-p53>$7 \times 10^{10}$ viral particles/cm$^3$ (left panel) compared to Ad-p53 doses <$7 \times 10^{10}$ viral particles/cm$^3$ (right panel). A detailed examination of the Ad-p53 responders revealed that the majority of responders (7/9 patients) had received doses of Ad-p53 near or exceeding $1 \times 10^{11}$ vp/cm3 (range 7.81 to $333.2 \times 10^{10}$ vp/cm$^3$). Hence, the dose for the Ad-p53 clinical applications may exceed $1 \times 10^{11}$ vp/cm$^3$ of injected tumor volume.

It is well known that tumors evolve during their initiation and progression to evade destruction by the immune system. While the recent use of immune checkpoint inhibitors to reverse this resistance has demonstrated some success, the majority of patients do not respond these treatments. Accordingly, in certain embodiments, the present disclosure methods and compositions for altering the microenvironment of tumors to overcome resistance and to enhance anti-tumor immune responses. In one embodiment, there is provided a method for the treatment of cancer by expressing p53 and/or MDA-7 in combination with at least one CD122 and CD132 agonist. Particularly, the tumor suppressor genes are administered as replication-incompetent adenoviruses. In one method, the p53 and/or MDA7 gene therapy is administered in combination with a CD122/CD132 agonist. The CD122/CD132 agonist may be an IL-2/anti-IL-2 immune complex, an IL-15/anti-IL-15 immune complex, an IL-15/IL-15 Receptor α-IgG1-Fc (IL-15/IL-15Rα-IgG1-Fc) immune complex, PEGylated IL-2, PEGylated IL-15, IL-2 mutein and/or IL-15 mutein. The CD122/CD132 agonist may be an IL-15 mutant (e.g., IL-15N72D) bound to an IL-15 receptor α/IgG1 Fc fusion protein, such as ALT-803 (Rhode et al., 2016).

Additionally, the inventors have determined that administering an additional therapy such as an immune checkpoint inhibitor like an anti-PD1 antibody enhances anti-tumor immunity either before, during or after the administration of the p53 and/or MDA-7 gene therapy in combination with a preferential CD122/CD132 agonist.

Further, the inventors have also determined that administering an additional therapy to degrade the tumor cell's extracellular matrix can enhance the tumor penetration of the combination therapies. Particularly, the extracellular matrix degrading therapy is administered before the combination therapy. In one method, the extracellular matrix degrading therapy is relaxin gene therapy, such as adenoviral relaxin. Particularly, the adenoviral relaxin is administered intratumorally or intraarterially.

Further, the methods of treatment can include additional anti-cancer therapies such as cytokines or chemotherapeutics to enhance the anti-tumor effect of the combination therapy provided herein. For example, the cytokine could be granulocyte macrophage colony-stimulating factor (GM-CSF) and the chemotherapy could be 5-fluorouracil (5FU) or capecitabine or cyclophosphamide or a PI3K inhibitor.

I. Definitions

As used herein, "essentially free," in terms of a specified component, is used herein to mean that none of the specified component has been purposefully formulated into a composition and/or is present only as a contaminant or in trace amounts. The total amount of the specified component resulting from any unintended contamination of a composition is therefore well below 0.05%, preferably below 0.01%. Most preferred is a composition in which no amount of the specified component can be detected with standard analytical methods.

As used herein the specification, "a" or "an" may mean one or more. As used herein in the claim(s), when used in conjunction with the word "comprising," the words "a" or "an" may mean one or more than one.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" may mean at least a second or more.

Throughout this application, the term "about" is used to indicate that a value includes the inherent variation of error for the device, the method being employed to determine the value, or the variation that exists among the study subjects.

As used herein "wild-type" refers to the naturally occurring sequence of a nucleic acid at a genetic locus in the genome of an organism, and sequences transcribed or translated from such a nucleic acid. Thus, the term "wild-type" also may refer to the amino acid sequence encoded by the nucleic acid. As a genetic locus may have more than one sequence or alleles in a population of individuals, the term "wild-type" encompasses all such naturally occurring alleles. As used herein the term "polymorphic" means that variation exists (i.e., two or more alleles exist) at a genetic locus in the individuals of a population. As used herein, "mutant" refers to a change in the sequence of a nucleic acid or its encoded protein, polypeptide, or peptide that is the result of recombinant DNA technology.

The term "exogenous," when used in relation to a protein, gene, nucleic acid, or polynucleotide in a cell or organism refers to a protein, gene, nucleic acid, or polynucleotide that has been introduced into the cell or organism by artificial or natural means; or in relation to a cell, the term refers to a cell that was isolated and subsequently introduced to other cells or to an organism by artificial or natural means. An exogenous nucleic acid may be from a different organism or cell, or it may be one or more additional copies of a nucleic acid that occurs naturally within the organism or cell. An exogenous cell may be from a different organism, or it may be from the same organism. By way of a non-limiting example, an exogenous nucleic acid is one that is in a chromosomal location different from where it would be in natural cells, or is otherwise flanked by a different nucleic acid sequence than that found in nature.

By "expression construct" or "expression cassette" is meant a nucleic acid molecule that is capable of directing transcription. An expression construct includes, at a minimum, one or more transcriptional control elements (such as promoters, enhancers or a structure functionally equivalent thereof) that direct gene expression in one or more desired cell types, tissues or organs. Additional elements, such as a transcription termination signal, may also be included.

A "vector" or "construct" (sometimes referred to as a gene delivery system or gene transfer "vehicle") refers to a macromolecule or complex of molecules comprising a polynucleotide to be delivered to a host cell, either in vitro or in vivo.

A "plasmid," a common type of a vector, is an extra-chromosomal DNA molecule separate from the chromosomal DNA that is capable of replicating independently of the chromosomal DNA. In certain cases, it is circular and double-stranded.

An "origin of replication" ("ori") or "replication origin" is a DNA sequence, e.g., in a lymphotrophic herpes virus, that when present in a plasmid in a cell is capable of maintaining linked sequences in the plasmid and/or a site at or near where DNA synthesis initiates. As an example, an on for EBV includes FR sequences (20 imperfect copies of a 30 bp repeat), and preferably DS sequences; however, other sites in EBV bind EBNA-1, e.g., Rep* sequences can substitute for DS as an origin of replication (Kirshmaier and Sugden, 1998). Thus, a replication origin of EBV includes FR, DS or Rep* sequences or any functionally equivalent sequences through nucleic acid modifications or synthetic combination derived therefrom. For example, the present invention may also use genetically engineered replication origin of EBV, such as by insertion or mutation of individual elements, as specifically described in Lindner, et. al., 2008.

A "gene," "polynucleotide," "coding region," "sequence," "segment," "fragment," or "transgene" that "encodes" a particular protein, is a nucleic acid molecule that is transcribed and optionally also translated into a gene product, e.g., a polypeptide, in vitro or in vivo when placed under the control of appropriate regulatory sequences. The coding region may be present in either a cDNA, genomic DNA, or RNA form. When present in a DNA form, the nucleic acid molecule may be single-stranded (i.e., the sense strand) or double-stranded. The boundaries of a coding region are determined by a start codon at the 5' (amino) terminus and a translation stop codon at the 3' (carboxy) terminus. A gene can include, but is not limited to, cDNA from prokaryotic or eukaryotic mRNA, genomic DNA sequences from prokaryotic or eukaryotic DNA, and synthetic DNA sequences. A transcription termination sequence will usually be located 3' to the gene sequence.

The term "control elements" refers collectively to promoter regions, polyadenylation signals, transcription termination sequences, upstream regulatory domains, origins of replication, internal ribosome entry sites (IRES), enhancers, splice junctions, and the like, which collectively provide for the replication, transcription, post-transcriptional processing, and translation of a coding sequence in a recipient cell. Not all of these control elements need be present so long as the selected coding sequence is capable of being replicated, transcribed, and translated in an appropriate host cell.

The term "promoter" is used herein in its ordinary sense to refer to a nucleotide region comprising a DNA regulatory sequence, wherein the regulatory sequence is derived from a gene that is capable of binding RNA polymerase and initiating transcription of a downstream (3' direction) coding sequence. It may contain genetic elements at which regulatory proteins and molecules may bind, such as RNA polymerase and other transcription factors, to initiate the specific transcription of a nucleic acid sequence. The phrases "operatively positioned," "operatively linked," "under control," and "under transcriptional control" mean that a promoter is in a correct functional location and/or orientation in relation to a nucleic acid sequence to control transcriptional initiation and/or expression of that sequence.

By "enhancer" is meant a nucleic acid sequence that, when positioned proximate to a promoter, confers increased transcription activity relative to the transcription activity resulting from the promoter in the absence of the enhancer domain.

By "operably linked" or co-expressed" with reference to nucleic acid molecules is meant that two or more nucleic acid molecules (e.g., a nucleic acid molecule to be transcribed, a promoter, and an enhancer element) are connected in such a way as to permit transcription of the nucleic acid molecule. "Operably linked" or "co-expressed" with reference to peptide and/or polypeptide molecules means that two or more peptide and/or polypeptide molecules are connected in such a way as to yield a single polypeptide chain, i.e., a fusion polypeptide, having at least one property of each peptide and/or polypeptide component of the fusion. The fusion polypeptide is preferably chimeric, i.e., composed of heterologous molecules.

"Homology" refers to the percent of identity between two polynucleotides or two polypeptides. The correspondence between one sequence and another can be determined by techniques known in the art. For example, homology can be determined by a direct comparison of the sequence information between two polypeptide molecules by aligning the sequence information and using readily available computer programs. Alternatively, homology can be determined by hybridization of polynucleotides under conditions that promote the formation of stable duplexes between homologous regions, followed by digestion with single strand-specific nuclease(s), and size determination of the digested fragments. Two DNA, or two polypeptide, sequences are "substantially homologous" to each other when at least about 80%, preferably at least about 90%, and most preferably at least about 95% of the nucleotides, or amino acids, respectively match over a defined length of the molecules, as determined using the methods above.

The term "nucleic acid" will generally refer to at least one molecule or strand of DNA, RNA or a derivative or mimic thereof, comprising at least one nucleobase, such as, for example, a naturally occurring purine or pyrimidine base found in DNA (e.g., adenine "A," guanine "G," thymine "T," and cytosine "C") or RNA (e.g. A, G, uracil "U," and C). The term "nucleic acid" encompasses the terms "oligonucleotide" and "polynucleotide." The term "oligonucleotide" refers to at least one molecule of between about 3 and about 100 nucleobases in length. The term "polynucleotide" refers to at least one molecule of greater than about 100 nucleobases in length. These definitions generally refer to at least one single-stranded molecule, but in specific embodiments will also encompass at least one additional strand that is partially, substantially or fully complementary to the at least one single-stranded molecule. Thus, a nucleic acid may encompass at least one double-stranded molecule or at least one triple-stranded molecule that comprises one or more complementary strand(s) or "complement(s)" of a particular sequence comprising a strand of the molecule.

The term "therapeutic benefit" used throughout this application refers to anything that promotes or enhances the well-being of the patient with respect to the medical treatment of his cancer. A list of nonexhaustive examples of this includes extension of the patient's life by any period of time; decrease or delay in the neoplastic development of the disease; decrease in hyperproliferation; reduction in tumor growth; delay of metastases; reduction in the proliferation rate of a cancer cell or tumor cell; induction of apoptosis in any treated cell or in any cell affected by a treated cell; and a decrease in pain to the patient that can be attributed to the patient's condition.

An "effective amount" is at least the minimum amount required to effect a measurable improvement or prevention of a particular disorder. An effective amount herein may vary according to factors such as the disease state, age, sex, and weight of the patient, and the ability of the antibody to elicit a desired response in the individual. An effective amount is also one in which any toxic or detrimental effects of the treatment are outweighed by the therapeutically beneficial effects. For prophylactic use, beneficial or desired results include results such as eliminating or reducing the risk, lessening the severity, or delaying the onset of the disease, including biochemical, histological and/or behavioral symptoms of the disease, its complications and intermediate pathological phenotypes presenting during development of the disease. For therapeutic use, beneficial or desired results include clinical results such as decreasing one or more symptoms resulting from the disease, increasing the quality of life of those suffering from the disease, decreasing the dose of other medications required to treat the disease, enhancing effect of another medication such as via targeting, delaying the progression of the disease, and/or prolonging survival. In the case of cancer or tumor, an effective amount of the drug may have the effect in reducing the number of cancer cells; reducing the tumor size; inhibiting (i.e., slow to some extent or desirably stop) cancer cell infiltration into peripheral organs; inhibit (i.e., slow to some extent and desirably stop) tumor metastasis; inhibiting to some extent tumor growth; and/or relieving to some extent one or more of the symptoms associated with the disorder. An effective amount can be administered in one or more administrations. For purposes of this invention, an effective amount of drug, compound, or pharmaceutical composition is an amount sufficient to accomplish prophylactic or therapeutic treatment either directly or indirectly. As is understood in the clinical context, an effective amount of a drug, compound, or pharmaceutical composition may or may not be achieved in conjunction with another drug, compound, or pharmaceutical composition. Thus, an "effective amount" may be considered in the context of administering one or more therapeutic agents, and a single agent may be considered to be given in an effective amount if, in conjunction with one or more other agents, a desirable result may be or is achieved.

As used herein, "carrier" includes any and all solvents, dispersion media, vehicles, coatings, diluents, antibacterial and antifungal agents, isotonic and absorption delaying agents, buffers, carrier solutions, suspensions, colloids, and the like. The use of such media and agents for pharmaceutical active substances is well known in the art. Except insofar as any conventional media or agent is incompatible with the active ingredient, its use in the therapeutic compositions is contemplated. Supplementary active ingredients can also be incorporated into the compositions.

The term "pharmaceutical formulation" refers to a preparation which is in such form as to permit the biological activity of the active ingredient to be effective, and which contains no additional components which are unacceptably toxic to a subject to which the formulation would be administered. Such formulations are sterile. "Pharmaceutically acceptable" excipients (vehicles, additives) are those which can reasonably be administered to a subject mammal to provide an effective dose of the active ingredient employed.

As used herein, the term "treatment" refers to clinical intervention designed to alter the natural course of the individual or cell being treated during the course of clinical pathology. Desirable effects of treatment include decreasing the rate of disease progression, ameliorating or palliating the disease state, and remission or improved prognosis. For example, an individual is successfully "treated" if one or more symptoms associated with cancer are mitigated or eliminated, including, but are not limited to, reducing the proliferation of (or destroying) cancerous cells, decreasing symptoms resulting from the disease, increasing the quality of life of those suffering from the disease, decreasing the dose of other medications required to treat the disease, and/or prolonging survival of individuals.

An "anti-cancer" agent is capable of negatively affecting a cancer cell/tumor in a subject, for example, by promoting killing of cancer cells, inducing apoptosis in cancer cells, reducing the growth rate of cancer cells, reducing the incidence or number of metastases, reducing tumor size, inhibiting tumor growth, reducing the blood supply to a tumor or cancer cells, promoting an immune response against cancer cells or a tumor, preventing or inhibiting the progression of cancer, or increasing the lifespan of a subject with cancer.

The term "antibody" herein is used in the broadest sense and specifically covers monoclonal antibodies (including full length monoclonal antibodies), polyclonal antibodies, multispecific antibodies (e.g., bispecific antibodies), and antibody fragments so long as they exhibit the desired biological activity.

The term "monoclonal antibody" as used herein refers to an antibody obtained from a population of substantially homogeneous antibodies, e.g., the individual antibodies comprising the population are identical except for possible mutations, e.g., naturally occurring mutations, that may be present in minor amounts. Thus, the modifier "monoclonal" indicates the character of the antibody as not being a mixture of discrete antibodies. In certain embodiments, such a monoclonal antibody typically includes an antibody comprising a polypeptide sequence that binds a target, wherein the target-binding polypeptide sequence was obtained by a process that includes the selection of a single target binding polypeptide sequence from a plurality of polypeptide sequences. For example, the selection process can be the selection of a unique clone from a plurality of clones, such as a pool of hybridoma clones, phage clones, or recombinant DNA clones. It should be understood that a selected target binding sequence can be further altered, for example, to improve affinity for the target, to humanize the target binding sequence, to improve its production in cell culture, to reduce its immunogenicity in vivo, to create a multispecific antibody, etc., and that an antibody comprising the altered target binding sequence is also a monoclonal antibody of this invention. In contrast to polyclonal antibody preparations, which typically include different antibodies directed against different determinants (epitopes), each monoclonal antibody of a monoclonal antibody preparation is directed against a single determinant on an antigen. In addition to their specificity, monoclonal antibody preparations are advantageous in that they are typically uncontaminated by other immunoglobulins.

The term "CD122/CD132 agonist" or "preferential CD122/CD132 agonist" refers to an agent that preferentially binds to the CD122/CD132 receptor complex and has lower affinity binding for the IL-2 α receptor (CD25) or the IL-15 α receptor. Known preferential CD122/CD132 agonists comprise an IL2/anti-IL2 monoclonal antibody immunocomplex (see, for example, U.S. Patent Publication No. US20170183403A1; incorporated herein by reference in its entirety); a genetically engineered IL-2 mutein that has a modified amino acid sequence compared to wild type IL-2 (see, for example, U.S. Patent Publication No. US 2017/0044229 A1; incorporated herein by reference in its entirety); a genetically engineered IL-2 mutein that has a modified amino acid sequence compared to wild type IL-2 combined with an anti-IL2 monoclonal antibody immunocomplex (see, for example, International Patent Publication No. WO2014100014A1; incorporated herein by reference in its entirety); a PEGylated form of IL-2, such as NKTR-214 (see, for example, Charych et al., 2016; incorporated herein by reference in its entirety), an IL-15/anti-IL-15 monoclonal antibody immunocomplex; an IL15/IL15 Receptor α-IgG1-Fc (IL15/IL15Rα-IgG1-Fc) immunocomplex (see, for example, U.S. Patent Publication No. US20060257361A1, EP2724728A1 and Dubois et al., 2008; all incorporated herein by reference); a genetically engineered IL-15 mutein that has a modified amino acid sequence compared to wild type IL-15 combined with an IL15Rα-IgG1-Fc immunocomplex (see, for example, U.S. Patent Publication No. US20070160578; incorporated herein by reference in its entirety); or a PEGylated form of IL-15 with preferential binding to CD122/CD132.

The term "immune checkpoint" refers to a molecule such as a protein in the immune system which provides inhibitory signals to its components in order to balance immune reactions. Known immune checkpoint proteins comprise CTLA-4, PD-1 and its ligands PD-L1 and PD-L2 and in addition LAG-3, BTLA, B7H3, B7H4, TIM3, KIR. The pathways involving LAG3, BTLA, B7H3, B7H4, TIM3, and KIR are recognized in the art to constitute immune checkpoint pathways similar to the CTLA-4 and PD-1 dependent pathways (see e.g. Pardoll, 2012. Nature Rev Cancer 12:252-264; Mellman et al., 2011. Nature 480:480-489).

The term "PD-1 axis binding antagonist" refers to a molecule that inhibits the interaction of a PD-1 axis binding partner with either one or more of its binding partners, so as to remove T-cell dysfunction resulting from signaling on the PD-1 signaling axis—with a result being to restore or enhance T-cell function (e.g., proliferation, cytokine production, target cell killing). As used herein, a PD-1 axis binding antagonist may include a PD-1 binding antagonist, a PD-L1 binding antagonist or a PD-L2 binding antagonist.

The term "PD-1 binding antagonist" refers to a molecule that decreases, blocks, inhibits, abrogates or interferes with signal transduction resulting from the interaction of PD-1 with one or more of its binding partners, such as PD-L and/or PD-L2. In some embodiments, the PD-1 binding antagonist is a molecule that inhibits the binding of PD-1 to one or more of its binding partners. In a specific aspect, the PD-1 binding antagonist inhibits the binding of PD-1 to PD-L and/or PD-L2. For example, PD-1 binding antagonists include anti-PD-1 antibodies, antigen binding fragments thereof, immunoadhesins, fusion proteins, oligopeptides and other molecules that decrease, block, inhibit, abrogate or interfere with signal transduction resulting from the interaction of PD-1 with PD-L1 and/or PD-L2. In one embodiment, a PD-1 binding antagonist reduces the negative co-stimulatory signal mediated by or through cell surface proteins expressed on T lymphocytes mediated signaling through PD-1 so as render a dysfunctional T-cell less dysfunctional (e.g., enhancing effector responses to antigen recognition). In some embodiments, the PD-1 binding antagonist is an anti-PD-1 antibody. In a specific aspect, a PD-1 binding antagonist is MDX-1106 (nivolumab). In another specific aspect, a PD-1 binding antagonist is MK-3475 (pembrolizumab). In another specific aspect, a PD-1 binding antagonist is CT-011 (pidilizumab). In another specific aspect, a PD-1 binding antagonist is AMP-224.

The term "PD-L1 binding antagonist" refers to a molecule that decreases, blocks, inhibits, abrogates or interferes with signal transduction resulting from the interaction of PD-L1 with either one or more of its binding partners, such as PD-1 or B7-1. In some embodiments, a PD-L1 binding antagonist is a molecule that inhibits the binding of PD-L1 to its binding partners. In a specific aspect, the PD-L1 binding antagonist inhibits binding of PD-L1 to PD-1 and/or B7-1. In some embodiments, the PD-L1 binding antagonists include anti-PD-L1 antibodies, antigen binding fragments thereof, immunoadhesins, fusion proteins, oligopeptides and other molecules that decrease, block, inhibit, abrogate or interfere with signal transduction resulting from the interaction of PD-L1 with one or more of its binding partners, such as PD-1 or B7-1. In one embodiment, a PD-L1 binding antagonist reduces the negative co-stimulatory signal mediated by or through cell surface proteins expressed on T lymphocytes mediated signaling through PD-L1 so as to render a dysfunctional T-cell less dysfunctional (e.g., enhancing effector responses to antigen recognition). In some embodiments, a PD-L1 binding antagonist is an anti-PD-L1 antibody. In a specific aspect, an anti-PD-L1 antibody is YW243.55.S70. In another specific aspect, an anti-PD-L1 antibody is MDX-1105. In still another specific aspect, an anti-PD-L1 antibody is MPDL3280A. In still another specific aspect, an anti-PD-L1 antibody is MEDI4736.

The term "PD-L2 binding antagonist" refers to a molecule that decreases, blocks, inhibits, abrogates or interferes with signal transduction resulting from the interaction of PD-L2 with either one or more of its binding partners, such as PD-1. In some embodiments, a PD-L2 binding antagonist is a molecule that inhibits the binding of PD-L2 to one or more of its binding partners. In a specific aspect, the PD-L2 binding antagonist inhibits binding of PD-L2 to PD-1. In some embodiments, the PD-L2 antagonists include anti-PD-L2 antibodies, antigen binding fragments thereof, immunoadhesins, fusion proteins, oligopeptides and other molecules that decrease, block, inhibit, abrogate or interfere with signal transduction resulting from the interaction of PD-L2 with either one or more of its binding partners, such as PD-1. In one embodiment, a PD-L2 binding antagonist reduces the negative co-stimulatory signal mediated by or through cell surface proteins expressed on T lymphocytes mediated signaling through PD-L2 so as render a dysfunctional T-cell less dysfunctional (e.g., enhancing effector responses to antigen recognition). In some embodiments, a PD-L2 binding antagonist is an immunoadhesin.

An "immune checkpoint inhibitor" refers to any compound inhibiting the function of an immune checkpoint protein. Inhibition includes reduction of function and full blockade. In particular the immune checkpoint protein is a human immune checkpoint protein. Thus the immune checkpoint protein inhibitor in particular is an inhibitor of a human immune checkpoint protein.

An "extracellular matrix degradative protein" or "extracellular matrix degrading protein" refers any protein which acts on the integrity of the cell matrix, in particular exerting a total or partial degrading or destabilizing action on at least one of the constituents of the said matrix or on the bonds which unite these various constituents.

An "abscopal effect" is referred to herein as a shrinking of tumors outside the scope of the localized treatment of a tumor. For example, localized treatment with the p53 and/or IL-24 in combination with systemic treatment with an immune checkpoint therapy can result in an abscopal effect at distant untreated tumors.

II. Tumor Suppressors

In some embodiments, a subject is administered a tumor suppressor therapy, such as a p53 and/or MDA-7 therapy.

The nucleic acids encoding p53 and/or MDA-7 may be provided in various methods known in the art.

In some aspects, the p53 and MDA-7 tumor suppressor therapies incorporate nucleic acid variants to increase their activities. In certain aspects, the variant tumor suppressor nucleic acids are negative regulation-resistant p53 variants (Yun et al., 2012; incorporated herein by reference in its entirety).

A. p53

In certain embodiments, the present disclosure provides combination therapies for the treatment of cancer. Some of the combination therapies provided herein include p53 gene therapy comprising administering a wild-type p53 gene to the subject. Wild-type p53 is recognized as an important growth regulator in many cell types. The p53 gene encodes a 375-amino-acid phosphoprotein that can form complexes with host proteins such as large-T antigen and E1B. The protein is found in normal tissues and cells, but at concentrations which are minute by comparison with transformed cells or tumor tissue.

Missense mutations are common for the p53 gene and are essential for the transforming ability of the oncogene. A single genetic change prompted by point mutations can create carcinogenic p53. Unlike other oncogenes, however, p53 point mutations are known to occur in at least 30 distinct codons, often creating dominant alleles that produce shifts in cell phenotype without a reduction to homozygosity. Additionally, many of these dominant negative alleles appear to be tolerated in the organism and passed on in the germ line. Various mutant alleles appear to range from minimally dysfunctional to strongly penetrant, dominant negative alleles (Weinberg, 1991). High levels of mutant p53 have been found in many cells transformed by chemical carcinogenesis, ultraviolet radiation, and several viruses.

In some aspects, a p53 biomarker is employed to select patients for p53 treatment. In particular aspects, a favorable tumor p53 biomarker profile is defined by either wild-type p53 gene configuration or <20% p53-positive cells by immunohistochemistry (U.S. Pat. No. 9,746,471 and Nemunaitis et al., 2009; both incorporated by reference in their entirety).

B. MDA-7

The combination therapies provided herein can also additionally comprise MDA-7 gene therapy comprising administering a full-length or truncated MDA-7 gene. The protein product of the mda-7 gene, Interleukin (IL)-24 is a cytokine that belongs to the IL-10 family of cytokines and is also a tumor suppressor. The cDNA encoding the MDA-7 protein has been described by Jiang et al., 1995 (WO1995011986). The MDA-7 cDNA encodes an evolutionarily conserved protein of 206 amino acids with a predicted size of 23.8 kDa.

The nucleic acid encoding MDA-7 provided herein can encode a full-length or truncated human IL-24 protein or polypeptide. A truncated version of MDA-7 would comprise a portion or portions of contiguous amino acid regions of the full-length sequence, but would not contain the entire sequence. The truncated version may be truncated by any number of contiguous amino acids at any site in the polypeptide. For example, truncated versions of MDA-7 could encode amino acids from about 49 to about 206; about 75 to about 206; about 100 to about 206; about 125 to about 206; about 150 to about 206; about 175 to about 206; or about 182 to about 206 of human wild-type MDA-7. It is also contemplated that MDA-7 polypeptides containing at least about 85%, 90%, and 95% of human wild-type MDA-7 are within the scope of the invention.

C. Other Tumor Suppressors

Additional tumor suppressors may be utilized in the present disclosure. Gene therapy vectors for use in the present disclosure incorporating other tumor suppressors genes include but are not limited to those listed in Table 1.

TABLE 1

Tumor Suppressor Genes

| Tumor Suppressor | Function | Cancer | References |
|---|---|---|---|
| APC | Controls the function of specific transcription factors which are involved in tumorigenesis, and development and homeostasis of some cell types including epithelial and lymphoid cells. APC has also been implicated in cell proliferation and other cellular activities such as migration, and adhesion. | Familial adenomatous and non-inherited colorectal carcinomas | Aoki et al., 2007 |
| BRCA1, BRCA2 | DNA Damage Repair | Inherited breast cancers; ovarian cancers | Greenburg et al., 2008 |
| CDKN2A | Gene locus that encodes the tumor suppressors p16 and p14ARF. | Brain tumors | Hashemi et al., 2002 |
| DCC | Netrin-1 receptor. Regulation of cell proliferation and apoptosis of intestinal epithelium. | Colorectal carcinomas | Pierceall et al., 1994 |
| DPC4 (SMAD4) | Transcriptional factor involved in development; Implicated in metastasis and tumor invasiveness. | Colorectal tumors, pancreatic neoplasia | Yachida et al., 2009 |
| MADR2/JV18 (SMAD2) | Mediates signaling from growth factor receptors. Assists in transport of SMAD4 into nucleus. | Colorectal cancer | Heldin et al., 2009 |

TABLE 1-continued

Tumor Suppressor Genes

| Tumor Suppressor | Function | Cancer | References |
|---|---|---|---|
| MEN1 | Codes for the menin protein that interacts with transcription factors, DNA repair proteins, cytoskeletal proteins and others. Function not clearly defined. | Multiple endocrine neoplasia type 1 | Starker et al., 2009 |
| MTS1 | Inhibitor of cyclin-dependent kinases; regulates cell cycle passage from G1 into S. | Melanomas | Rocco et al., 2001 |
| NF1 | RAS GTPase activating protein (RAS-GAP) | Neurofibromatosis type 1 | Johannessen et al., 2005 |
| NF2 | ERM protein; organize plasma membrane by assembling protein complexes and linking them to actin. | Neurofibromatosis type 2 | Gladden et al., 2010 |
| p53, p63, p73 | Encodes a transcription factor for p21, a protein that arrests the cell cycle in G1 phase. p53 integrates signals related to cell size, DNA integrity and chrommosome replication. | Bladder, breast, colorectal, esophageal, liver, lung, prostate, and ovarian carcinomas; brain tumors, sarcomas, lymphomas, and leukemias | Giono et al., 2006 |
| PTEN | Lipid phosphatase. Regulates cell survival | Cowden syndrome; increased risk of breast and thyroid cancer | Backman et al., 2002 |
| Rb | Binds to, and inhibits, the E2F transcription factor. Halts cell cycle progression | Retinoblastoma, sarcomas; bladder, breast, esophageal, prostate, and lung carcinomas | Yamasaki, 2003 |
| VHL | Cell cycle regulation. May increase stability and activity of p53 | Renal cell carcinomas | Kaelin et al., 2002 |
| WRN | DNA helicase and exonuclease. Involved in repair of DNA breaks. | Werner syndrome | Bernstein et al., 2002 |
| WT1 | Transcription factor. Essential role in development. | Wilms tumors (pediatric kidney cancer) | |

III. Extracellular Matrix Degradation

Methods of enhancing the anti-tumor effect of the tumor suppressor gene therapy and/or an immune checkpoint inhibitor are also provided herein. In one aspect, the delivery of the gene therapy (e.g., viral distribution) and tumor penetration are enhanced by a protein or agent which degrades the tumor cell extracellular matrix (ECM) or component thereof.

The extracellular matrix (ECM) is a collection of extracellular molecules secreted by cells that provides structural and biochemical support to the surrounding cells. Because multicellularity evolved independently in different multicellular lineages, the composition of ECM varies between multicellular structures; however, cell adhesion, cell-to-cell communication and differentiation are common functions of the ECM. Components of the ECM that may be targeted by the extracellular matrix degradative protein include collagen, elastin, hyaluronic acid, fibronectin and laminin.

A. Relaxin

One extracellular matrix degrading protein that can be used in the methods provided herein is relaxin. Relaxin is a 6 kDa peptide hormone that is structurally related to insulin and insulin-like growth factors. It is predominantly produced in the corpus *luteum* and endometrium and its serum level greatly increases during pregnancy (Sherwood et al., 1984). Relaxin is a potent inhibitor of collagen expression when collagen is overexpressed, but it does not markedly alter basal levels of collagen expression, in contrast to other collagen. It promotes the expression of various MMPs such as MMP2, MMP3, and MMP9 to degrade collagen, so that connective tissues and basal membranes are degraded to lead to the disruption of extracellular matrix of birth canal. In addition to this, the promotion of MMP 1 and MMP 3 expressions by relaxin is also observed in lung, heart, skin, intestines, mammary gland, blood vessel and spermiduct where relaxin plays a role as an inhibitor to prevent overexpression of collagen (Qin, X., et al., 1997a; Qin, X., et al., 1997b).

Administration of the relaxin protein or nucleic acid encoding the relaxin protein can induce the degradation of collagen, a major component of the extracellular matrix surrounding tumor cells, to disrupt connective tissue and basal membrane, thereby resulting in the degradation of extracellular matrix. In particular, when administered to tumor tissues enclosed tightly by connective tissue, the administration of the tumor suppressor gene therapy in combination with relaxin exhibits improved anti-tumor efficacy.

The relaxin protein can be full length relaxin or a portion of the relaxin molecule that retains biological activity as described in U.S. Pat. No. 5,023,321. Particularly, the relaxin is recombinant human relaxin (H2) or other active agents with relaxin-like activity, such as agents that competitively displace bound relaxin from a receptor. Relaxin can be made by any method known to those skilled in the art, preferably as described in U.S. Pat. No. 4,835,251. Relaxin analogs or derivatives thereof are described in U.S. Pat. No. 5,811,395 and peptide synthesis is described in U.S. Patent Publication No. US20110039778.

An exemplary adenoviral relaxin that may be used in the methods provided herein is described by Kim et al. (2006). Briefly, a relaxin-expressing, replication-competent (Ad-ΔE1B-RLX) adenovirus is generated by inserting a relaxin gene into the E3 adenoviral region.

B. Hyaluronidase

In some embodiments, any substance which is able to hydrolyze the polysaccharides which are generally present in extracellular matrices such as hyaluronic acid can be administered. Particularly, the extracellular matrix degrading protein used in the present invention can be hyaluronidase. Hyaluronan (or hyaluronic acid) is a ubiquitous constituent of the vertebrate extracellular matrix. This linear polysaccharide, which is based on glucuronic acid and glucosamine [D-glucuronic acid 1-β-3)N-acetyl-D-glucosamine(1-b-4)], is able to exert an influence on the physicochemical characteristics of the matrices by means of its property of forming very viscous solutions. Hyaluronic acid also interacts with various receptors and binding proteins which are located on the surface of the cells. It is involved in a large number of biological processes such as fertilization, embryonic development, cell migration and differentiation, wound-healing, inflammation, tumor growth and the formation of metastases.

Hyaluronic acid is hydrolyzed by hyaluronidase and its hydrolysis leads to disorganization of the extracellular matrix. Thus, it is contemplated that any substance possessing hyaluronidase activity is suitable for use in the present methods such as hyaluronidases as described in Kreil (Protein Sci., 1995, 4:1666-1669). The hyaluronidase can be a hyaluronidase which is derived from a mammalian, reptilian or hymenopteran hyaluronate glycanohydrolase, from a hyaluronate glycanohydrolase from the salivary gland of the leech, or from a bacterial, in particular streptococcal, pneumococcal and clostridial hyaluronate lyase. The enzymatic activity of the hyaluronidase can be assessed by conventional techniques such as those described in Hynes and Ferretti (Methods Enzymol., 1994, 235: 606-616) or Bailey and Levine (J. Pharm. Biomed. Anal., 1993, 11: 285-292).

C. Decorin

Decorin, a small leucine-rich proteoglycan, is a ubiquitous component of the extracellular matrix and is preferentially found in association with collagen fibrils. Decorin binds to collagen fibrils and delays the lateral assembly of individual triple helical collagen molecules, resulting in the decreased diameter of the fibrils. In addition, decorin can modulate the interactions of extracellular matrix components, such as fibronectin and thrombospondin, with cells. Furthermore, decorin is capable of affecting extracellular matrix remodeling by induction of the matrix metalloproteinase collagenase. These observations suggest that decorin regulates the production and assembly of the extracellular matrix at several levels, and hence has a prominent role in remodeling connective tissues as described by Choi et al. (Gene Therapy, 17: 190-201, 2010) and by Xu et al. (Gene Therapy, 22(3): 31-40, 2015).

An exemplary adenoviral decorin that may be used in the methods provided herein is described by Choi et al. (Gene Therapy, 17: 190-201, 2010). Briefly, a decorin-expressing, replication-competent (Ad-ΔE1B-DCNG) adenovirus is generated by inserting a decorin gene into the E3 adenoviral region. Another exemplary adenoviral decorin that may be used in the methods provided herein is described by Xu et al. (Gene Therapy, 22(3): 31-40, 2015). Similarly, a decorin-expressing, replication-competent (Ad.dcn) adenovirus is generated by inserting a decorin gene into the E3 adenoviral region.

IV. Nucleic Acids

A nucleic acid may be made by any technique known to one of ordinary skill in the art. Non-limiting examples of a synthetic nucleic acid, particularly a synthetic oligonucleotide, include a nucleic acid made by in vitro chemical synthesis using phosphotriester, phosphite or phosphoramidite chemistry and solid phase techniques such as described in EP 266,032, or via deoxynucleoside H-phosphonate intermediates as described by Froehler et al., 1986, and U.S. Pat. No. 5,705,629. A non-limiting example of enzymatically produced nucleic acid includes one produced by enzymes in amplification reactions such as PCR™ (see for example, U.S. Pat. Nos. 4,683,202 and 4,682,195), or the synthesis of oligonucleotides described in U.S. Pat. No. 5,645,897. A non-limiting example of a biologically produced nucleic acid includes recombinant nucleic acid production in living cells, such as recombinant DNA vector production in bacteria (see for example, Sambrook et al. 1989).

The nucleic acid(s), regardless of the length of the sequence itself, may be combined with other nucleic acid sequences, including but not limited to, promoters, enhancers, polyadenylation signals, restriction enzyme sites, multiple cloning sites, coding segments, and the like, to create one or more nucleic acid construct(s). The overall length may vary considerably between nucleic acid constructs. Thus, a nucleic acid segment of almost any length may be employed, with the total length preferably being limited by the ease of preparation or use in the intended recombinant nucleic acid protocol.

A. Nucleic Acid Delivery by Expression Vector

Vectors provided herein are designed, primarily, to express a therapeutic tumor suppressor gene (e.g., p53 and/or MDA-7) and/or extracellular matrix degradative gene (e.g., relaxin) under the control of regulated eukaryotic promoters (i.e., constitutive, inducible, repressable, tissue-specific). In some aspects, p53 and MDA-7 may be co-expressed in a vector. In another aspect, the p53 and/or MDA-7 may be co-expressed with an extracellular matrix degradative gene. Also, the vectors may contain a selectable marker if, for no other reason, to facilitate their manipulation in vitro.

One of skill in the art would be well-equipped to construct a vector through standard recombinant techniques (see, for example, Sambrook et al., 2001 and Ausubel et al., 1996, both incorporated herein by reference). Vectors include but are not limited to, plasmids, cosmids, viruses (bacteriophage, animal viruses, and plant viruses), and artificial chromosomes (e.g., YACs), such as retroviral vectors (e.g. derived from Moloney murine leukemia virus vectors (MoMLV), MSCV, SFFV, MPSV, SNV etc), lentiviral vectors (e.g. derived from HIV-1, HIV-2, SIV, BIV, FIV etc.), adenoviral (Ad) vectors including replication competent, replication deficient and gutless forms thereof, adeno-associated viral (AAV) vectors, simian virus 40 (SV-40) vectors, bovine papilloma virus vectors, Epstein-Barr virus vectors, herpes virus vectors, vaccinia virus vectors, Harvey murine sarcoma virus vectors, murine mammary tumor virus vectors, Rous sarcoma virus vectors.

1. Viral Vectors

Viral vectors encoding the tumor suppressor and/or extracellular matrix degradative gene may be provided in certain aspects of the present invention. In generating recombinant viral vectors, non-essential genes are typically replaced with a gene or coding sequence for a heterologous (or non-native) protein. A viral vector is a kind of expression construct that utilizes viral sequences to introduce nucleic acid and possibly proteins into a cell. The ability of certain viruses to infect cells or enter cells via receptor-mediated endocytosis, and to integrate into host cell genomes and express viral genes stably and efficiently have made them attractive candidates for the transfer of foreign nucleic acids into cells (e.g., mammalian cells). Non-limiting examples of virus vectors that may be used to deliver a nucleic acid of certain aspects of the present invention are described below.

Lentiviruses are complex retroviruses, which, in addition to the common retroviral genes gag, pol, and env, contain other genes with regulatory or structural function. Lentiviral vectors are well known in the art (see, for example, Naldini et al., 1996; Zufferey et al., 1997; Blomer et al., 1997; U.S. Pat. Nos. 6,013,516 and 5,994,136).

Recombinant lentiviral vectors are capable of infecting non-dividing cells and can be used for both in vivo and ex vivo gene transfer and expression of nucleic acid sequences. For example, recombinant lentivirus capable of infecting a non-dividing cell—wherein a suitable host cell is transfected with two or more vectors carrying the packaging functions, namely gag, pol and env, as well as rev and tat—is described in U.S. Pat. No. 5,994,136, incorporated herein by reference.

a. Adenoviral Vector

One method for delivery of the tumor suppressor and/or extracellular matrix degradative gene involves the use of an adenovirus expression vector. Although adenovirus vectors are known to have a low capacity for integration into genomic DNA, this feature is counterbalanced by the high efficiency of gene transfer afforded by these vectors. Adenovirus expression vectors include constructs containing adenovirus sequences sufficient to (a) support packaging of the construct and (b) to ultimately express a recombinant gene construct that has been cloned therein.

Adenovirus growth and manipulation is known to those of skill in the art, and exhibits broad host range in vitro and in vivo. This group of viruses can be obtained in high titers, e.g., 109-1011 plaque-forming units per ml, and they are highly infective. The life cycle of adenovirus does not require integration into the host cell genome. The foreign genes delivered by adenovirus vectors are episomal and, therefore, have low genotoxicity to host cells. No side effects have been reported in studies of vaccination with wild-type adenovirus (Couch et al., 1963; Top et al., 1971), demonstrating their safety and therapeutic potential as in vivo gene transfer vectors.

Knowledge of the genetic organization of adenovirus, a 36 kb, linear, double-stranded DNA virus, allows substitution of large pieces of adenoviral DNA with foreign sequences up to 7 kb (Grunhaus and Horwitz, 1992). In contrast to retrovirus, the adenoviral infection of host cells does not result in chromosomal integration because adenoviral DNA can replicate in an episomal manner without potential genotoxicity. Also, adenoviruses are structurally stable, and no genome rearrangement has been detected after extensive amplification.

Adenovirus is particularly suitable for use as a gene transfer vector because of its mid-sized genome, ease of manipulation, high titer, wide target-cell range and high infectivity. Both ends of the viral genome contain 100-200 base pair inverted repeats (ITRs), which are cis elements necessary for viral DNA replication and packaging. The early (E) and late (L) regions of the genome contain different transcription units that are divided by the onset of viral DNA replication. The E1 region (E1A and E1B) encodes proteins responsible for the regulation of transcription of the viral genome and a few cellular genes. The expression of the E2 region (E2A and E2B) results in the synthesis of the proteins for viral DNA replication. These proteins are involved in DNA replication, late gene expression and host cell shut-off (Renan, 1990). The products of the late genes, including the majority of the viral capsid proteins, are expressed only after significant processing of a single primary transcript issued by the major late promoter (MLP). The MLP, (located at 16.8 m.u.) is particularly efficient during the late phase of infection, and all the mRNA's issued from this promoter possess a 5'-tripartite leader (TPL) sequence which makes them particular mRNA's for translation.

A recombinant adenovirus provided herein can be generated from homologous recombination between a shuttle vector and provirus vector. Due to the possible recombination between two proviral vectors, wild-type adenovirus may be generated from this process. Therefore, a single clone of virus is isolated from an individual plaque and its genomic structure is examined.

The adenovirus vector may be replication competent, replication defective, or conditionally defective, the nature of the adenovirus vector is not believed to be crucial to the successful practice of the invention. The adenovirus may be of any of the 42 different known serotypes or subgroups A-F. Adenovirus type 5 of subgroup C is the particular starting material in order to obtain the conditional replication-defective adenovirus vector for use in the present invention. This is because Adenovirus type 5 is a human adenovirus about which a great deal of biochemical and genetic information is known, and it has historically been used for most constructions employing adenovirus as a vector.

Nucleic acids can be introduced to adenoviral vectors as a position from which a coding sequence has been removed. For example, a replication defective adenoviral vector can have the E1-coding sequences removed. The polynucleotide encoding the gene of interest may also be inserted in lieu of the deleted E3 region in E3 replacement vectors as described by Karlsson et al. (1986) or in the E4 region where a helper cell line or helper virus complements the E4 defect.

Generation and propagation of replication deficient adenovirus vectors can be performed with helper cell lines. One unique helper cell line, designated 293, was transformed from human embryonic kidney cells by Ad5 DNA fragments and constitutively expresses E1 proteins (Graham et al., 1977). Since the E3 region is dispensable from the adenovirus genome (Jones and Shenk, 1978), adenovirus vectors, with the help of 293 cells, carry foreign DNA in either the E1, the E3, or both regions (Graham and Prevec, 1991).

Helper cell lines may be derived from human cells such as human embryonic kidney cells, muscle cells, hematopoietic cells or other human embryonic mesenchymal or epithelial cells. Alternatively, the helper cells may be derived from the cells of other mammalian species that are permissive for human adenovirus. Such cells include, e.g., Vero cells or other monkey embryonic mesenchymal or epithelial cells. As stated above, a particular helper cell line is 293.

Methods for producing recombinant adenovirus are known in the art, such as U.S. Pat. No. 6,740,320, incorporated herein by reference. Also, Racher et al. (1995) have disclosed improved methods for culturing 293 cells and propagating adenovirus. In one format, natural cell aggregates are grown by inoculating individual cells into 1 liter siliconized spinner flasks (Techne, Cambridge, UK) containing 100-200 ml of medium. Following stirring at 40 rpm, the cell viability is estimated with trypan blue. In another format, Fibra-Cel microcarriers (Bibby Sterlin, Stone, UK) (5 g/l) are employed as follows. A cell inoculum, resuspended in 5 ml of medium, is added to the carrier (50 ml) in a 250 ml Erlenmeyer flask and left stationary, with occasional agitation, for 1 to 4 hours. The medium is then replaced with 50 ml of fresh medium and shaking initiated. For virus production, cells are allowed to grow to about 80% confluence, after which time the medium is replaced (to 25% of the final volume) and adenovirus added at an MOI of 0.05. Cultures are left stationary overnight, following which the volume is increased to 100% and shaking commenced for another 72 hours.

b. Retroviral Vector

Additionally, the tumor suppressor and/or extracellular matrix degradative gene may be encoded by a retroviral vector. The retroviruses are a group of single-stranded RNA viruses characterized by an ability to convert their RNA to double-stranded DNA in infected cells by a process of reverse-transcription (Coffin, 1990). The resulting DNA then stably integrates into cellular chromosomes as a provirus and directs synthesis of viral proteins. The integration results in the retention of the viral gene sequences in the recipient cell and its descendants. The retroviral genome contains three genes, gag, pol, and env that code for capsid proteins, polymerase enzyme, and envelope components, respectively. A sequence found upstream from the gag gene contains a signal for packaging of the genome into virions. Two long terminal repeat (LTR) sequences are present at the 5' and 3' ends of the viral genome. These contain strong promoter and enhancer sequences and are also required for integration in the host cell genome (Coffin, 1990).

In order to construct a retroviral vector, a nucleic acid encoding a gene of interest is inserted into the viral genome in the place of certain viral sequences to produce a virus that is replication-defective. In order to produce virions, a packaging cell line containing the gag, pol, and env genes but without the LTR and packaging components is constructed (Mann et al., 1983). When a recombinant plasmid containing a cDNA, together with the retroviral LTR and packaging sequences is introduced into this cell line (by calcium phosphate precipitation for example), the packaging sequence allows the RNA transcript of the recombinant plasmid to be packaged into viral particles, which are then secreted into the culture media (Nicolas and Rubenstein, 1988; Temin, 1986; Mann et al., 1983). The media containing the recombinant retroviruses is then collected, optionally concentrated, and used for gene transfer. Retroviral vectors are able to infect a broad variety of cell types. However, integration and stable expression require the division of host cells (Paskind et al., 1975).

Concern with the use of defective retrovirus vectors is the potential appearance of wild-type replication-competent virus in the packaging cells. This can result from recombination events in which the intact sequence from the recombinant virus inserts upstream from the gag, pol, env sequence integrated in the host cell genome. However, packaging cell lines are available that should greatly decrease the likelihood of recombination (Markowitz et al., 1988; Hersdorffer et al., 1990).

c. Adeno-associated Viral Vector

Adeno-associated virus (AAV) is an attractive vector system for use in the present disclosure as it has a high frequency of integration and it can infect nondividing cells, thus making it useful for delivery of genes into mammalian cells (Muzyczka, 1992). AAV has a broad host range for infectivity (Tratschin, et al., 1984; Laughlin, et al., 1986; Lebkowski, et al., 1988; McLaughlin, et al., 1988), which means it is applicable for use with the present invention. Details concerning the generation and use of rAAV vectors are described in U.S. Pat. Nos. 5,139,941 and 4,797,368.

AAV is a dependent parvovirus in that it requires coinfection with another virus (either adenovirus or a member of the herpes virus family) to undergo a productive infection in cultured cells (Muzyczka, 1992). In the absence of coinfection with helper virus, the wild-type AAV genome integrates through its ends into human chromosome 19 where it resides in a latent state as a provirus (Kotin et al., 1990; Samulski et al., 1991). rAAV, however, is not restricted to chromosome 19 for integration unless the AAV Rep protein is also expressed (Shelling and Smith, 1994). When a cell carrying an AAV provirus is superinfected with a helper virus, the AAV genome is "rescued" from the chromosome or from a recombinant plasmid, and a normal productive infection is established (Samulski et al., 1989; McLaughlin et al., 1988; Kotin et al., 1990; Muzyczka, 1992).

Typically, recombinant AAV (rAAV) virus is made by cotransfecting a plasmid containing the gene of interest flanked by the two AAV terminal repeats (McLaughlin et al., 1988; Samulski et al., 1989; each incorporated herein by reference) and an expression plasmid containing the wild-type AAV coding sequences without the terminal repeats, for example pIM45 (McCarty et al., 1991). The cells are also infected or transfected with adenovirus or plasmids carrying the adenovirus genes required for AAV helper function. rAAV virus stocks made in such fashion are contaminated with adenovirus which must be physically separated from the rAAV particles (for example, by cesium chloride density centrifugation). Alternatively, adenovirus vectors containing the AAV coding regions or cell lines containing the AAV coding regions and some or all of the adenovirus helper genes could be used (Yang et al., 1994; Clark et al., 1995). Cell lines carrying the rAAV DNA as an integrated provirus can also be used (Flotte et al., 1995).

d. Other Viral Vectors

Other viral vectors may be employed as constructs in the present disclosure. Vectors derived from viruses such as vaccinia virus (Ridgeway, 1988; Baichwal and Sugden, 1986; Coupar et al., 1988) and herpesviruses may be employed. They offer several attractive features for various mammalian cells (Friedmann, 1989; Ridgeway, 1988; Baichwal and Sugden, 1986; Coupar et al., 1988; Horwich et al., 1990).

A molecularly cloned strain of Venezuelan equine encephalitis (VEE) virus has been genetically refined as a replication competent vaccine vector for the expression of heterologous viral proteins (Davis et al., 1996). Studies have demonstrated that VEE infection stimulates potent CTL responses and has been suggested that VEE may be an extremely useful vector for immunizations (Caley et al., 1997).

In further embodiments, the nucleic acid encoding chimeric CD154 is housed within an infective virus that has been engineered to express a specific binding ligand. The virus particle will thus bind specifically to the cognate receptors of the target cell and deliver the contents to the cell. A novel approach designed to allow specific targeting of retrovirus vectors was recently developed based on the chemical modification of a retrovirus by the chemical addition of lactose residues to the viral envelope. This modification can permit the specific infection of hepatocytes via sialoglycoprotein receptors.

For example, targeting of recombinant retroviruses was designed in which biotinylated antibodies against a retroviral envelope protein and against a specific cell receptor were used. The antibodies were coupled via the biotin components by using streptavidin (Roux et al., 1989). Using antibodies against major histocompatibility complex class I and class II antigens, they demonstrated the infection of a variety of human cells that bore those surface antigens with an ecotropic virus in vitro (Roux et al., 1989).

2. Regulatory Elements

Expression cassettes included in vectors useful in the present disclosure in particular contain (in a 5'-to-3' direction) a eukaryotic transcriptional promoter operably linked to a protein-coding sequence, splice signals including intervening sequences, and a transcriptional termination/polyadenylation sequence. The promoters and enhancers that control the transcription of protein encoding genes in eukaryotic cells are composed of multiple genetic elements. The cellular machinery is able to gather and integrate the regulatory information conveyed by each element, allowing different genes to evolve distinct, often complex patterns of transcriptional regulation. A promoter used in the context of the present invention includes constitutive, inducible, and tissue-specific promoters.

a. Promoter/Enhancers

The expression constructs provided herein comprise a promoter to drive expression of the tumor suppressor and/or extracellular matrix degradative gene. A promoter generally comprises a sequence that functions to position the start site for RNA synthesis. The best known example of this is the TATA box, but in some promoters lacking a TATA box, such as, for example, the promoter for the mammalian terminal deoxynucleotidyl transferase gene and the promoter for the SV40 late genes, a discrete element overlying the start site itself helps to fix the place of initiation. Additional promoter elements regulate the frequency of transcriptional initiation. Typically, these are located in the region 30-110 bp upstream of the start site, although a number of promoters have been shown to contain functional elements downstream of the start site as well. To bring a coding sequence "under the control of" a promoter, one positions the 5' end of the transcription initiation site of the transcriptional reading frame "downstream" of (i.e., 3' of) the chosen promoter. The "upstream" promoter stimulates transcription of the DNA and promotes expression of the encoded RNA.

The spacing between promoter elements frequently is flexible, so that promoter function is preserved when elements are inverted or moved relative to one another. In the tk promoter, the spacing between promoter elements can be increased to 50 bp apart before activity begins to decline. Depending on the promoter, it appears that individual elements can function either cooperatively or independently to activate transcription. A promoter may or may not be used in conjunction with an "enhancer," which refers to a cis-acting regulatory sequence involved in the transcriptional activation of a nucleic acid sequence.

A promoter may be one naturally associated with a nucleic acid sequence, as may be obtained by isolating the 5' non-coding sequences located upstream of the coding segment and/or exon. Such a promoter can be referred to as "endogenous." Similarly, an enhancer may be one naturally associated with a nucleic acid sequence, located either downstream or upstream of that sequence. Alternatively, certain advantages will be gained by positioning the coding nucleic acid segment under the control of a recombinant or heterologous promoter, which refers to a promoter that is not normally associated with a nucleic acid sequence in its natural environment. A recombinant or heterologous enhancer refers also to an enhancer not normally associated with a nucleic acid sequence in its natural environment. Such promoters or enhancers may include promoters or enhancers of other genes, and promoters or enhancers isolated from any other virus, or prokaryotic or eukaryotic cell, and promoters or enhancers not "naturally occurring," i.e., containing different elements of different transcriptional regulatory regions, and/or mutations that alter expression. For example, promoters that are most commonly used in recombinant DNA construction include the β-lactamase (penicillinase), lactose and tryptophan (trp) promoter systems. In addition to producing nucleic acid sequences of promoters and enhancers synthetically, sequences may be produced using recombinant cloning and/or nucleic acid amplification technology, including PCR™, in connection with the compositions disclosed herein (see U.S. Pat. Nos. 4,683,202 and 5,928,906, each incorporated herein by reference). Furthermore, it is contemplated that the control sequences that direct transcription and/or expression of sequences within non-nuclear organelles such as mitochondria, chloroplasts, and the like, can be employed as well.

Naturally, it will be important to employ a promoter and/or enhancer that effectively directs the expression of the DNA segment in the organelle, cell type, tissue, organ, or organism chosen for expression. Those of skill in the art of molecular biology generally know the use of promoters, enhancers, and cell type combinations for protein expression, (see, for example Sambrook et al. 1989, incorporated herein by reference). The promoters employed may be constitutive, tissue-specific, inducible, and/or useful under the appropriate conditions to direct high level expression of the introduced DNA segment, such as is advantageous in the large-scale production of recombinant proteins and/or peptides. The promoter may be heterologous or endogenous.

Additionally, any promoter/enhancer combination (as per, for example, the Eukaryotic Promoter Data Base EPDB, through world wide web at epd.isb-sib.ch/) could also be used to drive expression. Use of a T3, T7 or SP6 cytoplasmic expression system is another possible embodiment. Eukaryotic cells can support cytoplasmic transcription from certain bacterial promoters if the appropriate bacterial polymerase is provided, either as part of the delivery complex or as an additional genetic expression construct.

Non-limiting examples of promoters include early or late viral promoters, such as, SV40 early or late promoters, cytomegalovirus (CMV) immediate early promoters, Rous Sarcoma Virus (RSV) early promoters; eukaryotic cell promoters, such as, e. g., beta actin promoter (Ng, 1989; Quitsche et al., 1989), GADPH promoter (Alexander et al., 1988, Ercolani et al., 1988), metallothionein promoter (Karin et al., 1989; Richards et al., 1984); and concatenated response element promoters, such as cyclic AMP response element promoters (cre), serum response element promoter (sre), phorbol ester promoter (TPA) and response element promoters (tre) near a minimal TATA box. It is also possible to use human growth hormone promoter sequences (e.g., the human growth hormone minimal promoter described at Genbank, accession no. X05244, nucleotide 283-341) or a mouse mammary tumor promoter (available from the ATCC, Cat. No. ATCC 45007). In certain embodiments, the promoter is CMV IE, dectin-1, dectin-2, human CD11c, F4/80, SM22, RSV, SV40, Ad MLP, beta-actin, MHC class I or MHC class II promoter, however any other promoter that is useful to drive expression of the p53, MDA-7 and/or the relaxin gene is applicable to the practice of the present invention.

In certain aspects, methods of the disclosure also concern enhancer sequences, i.e., nucleic acid sequences that increase a promoter's activity and that have the potential to act in cis, and regardless of their orientation, even over relatively long distances (up to several kilobases away from the target promoter). However, enhancer function is not necessarily restricted to such long distances as they may also function in close proximity to a given promoter.

b. Initiation Signals and Linked Expression

A specific initiation signal also may be used in the expression constructs provided in the present disclosure for efficient translation of coding sequences. These signals include the ATG initiation codon or adjacent sequences. Exogenous translational control signals, including the ATG initiation codon, may need to be provided. One of ordinary skill in the art would readily be capable of determining this and providing the necessary signals. It is well known that the initiation codon must be "in-frame" with the reading frame of the desired coding sequence to ensure translation of the entire insert. The exogenous translational control signals and initiation codons can be either natural or synthetic. The efficiency of expression may be enhanced by the inclusion of appropriate transcription enhancer elements.

In certain embodiments, the use of internal ribosome entry sites (IRES) elements are used to create multigene, or polycistronic, messages. IRES elements are able to bypass the ribosome scanning model of 5' methylated Cap dependent translation and begin translation at internal sites (Pelletier and Sonenberg, 1988). IRES elements from two members of the picornavirus family (polio and encephalomyocarditis) have been described (Pelletier and Sonenberg, 1988), as well an IRES from a mammalian message (Macejak and Sarnow, 1991). IRES elements can be linked to heterologous open reading frames. Multiple open reading frames can be transcribed together, each separated by an IRES, creating polycistronic messages. By virtue of the IRES element, each open reading frame is accessible to ribosomes for efficient translation. Multiple genes can be efficiently expressed using a single promoter/enhancer to transcribe a single message (see U.S. Pat. Nos. 5,925,565 and 5,935,819, each herein incorporated by reference).

Additionally, certain 2A sequence elements could be used to create linked- or co-expression of genes in the constructs provided in the present disclosure. For example, cleavage sequences could be used to co-express genes by linking open reading frames to form a single cistron. An exemplary cleavage sequence is the F2A (Foot-and-mouth disease virus 2A) or a "2A-like" sequence (e.g., Thosea asigna virus 2A; T2A) (Minskaia and Ryan, 2013).

c. Origins of Replication

In order to propagate a vector in a host cell, it may contain one or more origins of replication sites (often termed "ori"), for example, a nucleic acid sequence corresponding to oriP of EBV as described above or a genetically engineered oriP with a similar or elevated function in programming, which is a specific nucleic acid sequence at which replication is initiated. Alternatively a replication origin of other extra-chromosomally replicating virus as described above or an autonomously replicating sequence (ARS) can be employed.

3. Selection and Screenable Markers

In some embodiments, cells containing a construct of the present disclosure may be identified in vitro or in vivo by including a marker in the expression vector. Such markers would confer an identifiable change to the cell permitting easy identification of cells containing the expression vector. Generally, a selection marker is one that confers a property that allows for selection. A positive selection marker is one in which the presence of the marker allows for its selection, while a negative selection marker is one in which its presence prevents its selection. An example of a positive selection marker is a drug resistance marker.

Usually the inclusion of a drug selection marker aids in the cloning and identification of transformants, for example, genes that confer resistance to neomycin, puromycin, hygromycin, DHFR, GPT, zeocin and histidinol are useful selection markers. In addition to markers conferring a phenotype that allows for the discrimination of transformants based on the implementation of conditions, other types of markers including screenable markers such as GFP, whose basis is colorimetric analysis, are also contemplated. Alternatively, screenable enzymes as negative selection markers such as herpes simplex virus thymidine kinase (tk) or chloramphenicol acetyltransferase (CAT) may be utilized. One of skill in the art would also know how to employ immunologic markers, possibly in conjunction with FACS analysis. The marker used is not believed to be important, so long as it is capable of being expressed simultaneously with the nucleic acid encoding a gene product. Further examples of selection and screenable markers are well known to one of skill in the art.

B. Other Methods of Nucleic Acid Delivery

In addition to viral delivery of the nucleic acids encoding the tumor suppressor(s) and/or extracellular matrix degradative gene, the following are additional methods of recombinant gene delivery to a given host cell and are thus considered in the present disclosure.

Introduction of a nucleic acid, such as DNA or RNA, may use any suitable methods for nucleic acid delivery for transformation of a cell, as described herein or as would be known to one of ordinary skill in the art. Such methods include, but are not limited to, direct delivery of DNA such as by ex vivo transfection (Wilson et al., 1989, Nabel et al, 1989), by injection (U.S. Pat. Nos. 5,994,624, 5,981,274, 5,945,100, 5,780,448, 5,736,524, 5,702,932, 5,656,610, 5,589,466 and 5,580,859, each incorporated herein by reference), including microinjection (Harland and Weintraub, 1985; U.S. Pat. No. 5,789,215, incorporated herein by reference); by electroporation (U.S. Pat. No. 5,384,253, incorporated herein by reference; Tur-Kaspa et al., 1986; Potter et al., 1984); by calcium phosphate precipitation (Graham and Van Der Eb, 1973; Chen and Okayama, 1987; Rippe et al., 1990); by using DEAE-dextran followed by polyethylene glycol (Gopal, 1985); by direct sonic loading (Fechheimer et al., 1987); by liposome mediated transfection (Nicolau and Sene, 1982; Fraley et al., 1979; Nicolau et al., 1987; Wong et al., 1980; Kaneda et al., 1989; Kato et al., 1991) and receptor-mediated transfection (Wu and Wu, 1987; Wu and Wu, 1988); by microprojectile bombardment (PCT Application Nos. WO 94/09699 and 95/06128; U.S. Pat. Nos. 5,610,042; 5,322,783 5,563,055, 5,550,318, 5,538, 877 and 5,538,880, and each incorporated herein by reference); by agitation with silicon carbide fibers (Kaeppler et al., 1990; U.S. Pat. Nos. 5,302,523 and 5,464,765, each incorporated herein by reference); by *Agrobacterium*-mediated transformation (U.S. Pat. Nos. 5,591,616 and 5,563, 055, each incorporated herein by reference); by desiccation/inhibition-mediated DNA uptake (Potrykus et al., 1985), and any combination of such methods. Through the application of techniques such as these, organelle(s), cell(s), tissue(s) or organism(s) may be stably or transiently transformed.

1. Electroporation

In certain particular embodiments of the present disclosure, the gene construct is introduced into target hyperproliferative cells via electroporation. Electroporation involves the exposure of cells (or tissues) and DNA (or a DNA complex) to a high-voltage electric discharge.

Transfection of eukaryotic cells using electroporation has been quite successful. Mouse pre-B lymphocytes have been transfected with human kappa-immunoglobulin genes (Potter et al., 1984), and rat hepatocytes have been transfected with the chloramphenicol acetyltransferase gene (Tur-Kaspa et al., 1986) in this manner.

It is contemplated that electroporation conditions for hyperproliferative cells from different sources may be optimized. One may particularly wish to optimize such parameters as the voltage, the capacitance, the time and the electroporation media composition. The execution of other routine adjustments will be known to those of skill in the art. See e.g., Hoffman, 1999; Heller et al., 1996.

2. Lipid-Mediated Transformation

In a further embodiment, the tumor suppressor and/or extracellular matrix degradative gene may be entrapped in a liposome or lipid formulation. Liposomes are vesicular structures characterized by a phospholipid bilayer membrane and an inner aqueous medium. Multilamellar liposomes have multiple lipid layers separated by aqueous medium. They form spontaneously when phospholipids are suspended in an excess of aqueous solution. The lipid components undergo self-rearrangement before the formation of closed structures and entrap water and dissolved solutes between the lipid bilayers (Ghosh and Bachhawat, 1991). Also contemplated is a gene construct complexed with Lipofectamine (Gibco BRL).

Lipid-mediated nucleic acid delivery and expression of foreign DNA in vitro has been very successful (Nicolau and Sene, 1982; Fraley et al., 1979; Nicolau et al., 1987). Wong et al. (1980) demonstrated the feasibility of lipid-mediated delivery and expression of foreign DNA in cultured chick embryo, HeLa and hepatoma cells.

Lipid based non-viral formulations provide an alternative to adenoviral gene therapies. Although many cell culture studies have documented lipid based non-viral gene transfer, systemic gene delivery via lipid based formulations has been limited. A major limitation of non-viral lipid based gene delivery is the toxicity of the cationic lipids that comprise the non-viral delivery vehicle. The in vivo toxicity of liposomes partially explains the discrepancy between in vitro and in vivo gene transfer results. Another factor contributing to this contradictory data is the difference in lipid vehicle stability in the presence and absence of serum proteins. The interaction between lipid vehicles and serum proteins has a dramatic impact on the stability characteristics of lipid vehicles (Yang and Huang, 1997). Cationic lipids attract and bind negatively charged serum proteins. Lipid vehicles associated with serum proteins are either dissolved or taken up by macrophages leading to their removal from circulation. Current in vivo lipid delivery methods use subcutaneous, intradermal, intratumoral, or intracranial injection to avoid the toxicity and stability problems associated with cationic lipids in the circulation. The interaction of lipid vehicles and plasma proteins is responsible for the disparity between the efficiency of in vitro (Felgner et al., 1987) and in vivo gene transfer (Zhu el al., 1993; Philip et al., 1993; Solodin et al., 1995; Liu et al., 1995; Thierry et al., 1995; Tsukamoto et al., 1995; Aksentijevich et al., 1996).

Advances in lipid formulations have improved the efficiency of gene transfer in vivo (Templeton et al. 1997; WO 98/07408). A novel lipid formulation composed of an equimolar ratio of 1,2-bis(oleoyloxy)-3-(trimethyl ammonio) propane (DOTAP) and cholesterol significantly enhances systemic in vivo gene transfer, approximately 150 fold. The DOTAP:cholesterol lipid formulation forms unique structure termed a "sandwich liposome". This formulation is reported to "sandwich" DNA between an invaginated bi-layer or 'vase' structure. Beneficial characteristics of these lipid structures include a positive p, colloidal stabilization by cholesterol, two dimensional DNA packing and increased serum stability. Patent Application Nos. 60/135,818 and 60/133,116 discuss formulations that may be used with the present invention.

The production of lipid formulations often is accomplished by sonication or serial extrusion of liposomal mixtures after (I) reverse phase evaporation (II) dehydration-rehydration (III) detergent dialysis and (IV) thin film hydration. Once manufactured, lipid structures can be used to encapsulate compounds that are toxic (chemotherapeutics) or labile (nucleic acids) when in circulation. Lipid encapsulation has resulted in a lower toxicity and a longer serum half-life for such compounds (Gabizon et al., 1990). Numerous disease treatments are using lipid based gene transfer strategies to enhance conventional or establish novel therapies, in particular therapies for treating hyperproliferative diseases.

V. Preferential CD123/CD132 Agonists

In certain aspects, the subject is administered at least one CD122/CD132 agonist, such as a CD122/CD132 agonist that preferentially binds to the CD122/CD132 receptor complex and has lower affinity binding for CD25 or the IL15α receptor. The CD122/CD132 may be selected from a genetically engineered IL-22 mutein that has a modified amino acid sequence compared to wild type IL2 (US 2017/0044229; incorporated by reference in its entirety). In certain aspects, the preferential CD122/CD132 agonist is an IL-2/anti-IL-2 monoclonal antibody immune complex (US20170183403A1; incorporated by reference in its entirety), or a genetically engineered IL-2 mutein that has a modified amino acid sequence compared to wild type IL-2 combined with an anti-IL2 monoclonal antibody immune complex (WO2014100014A1; incorporated by reference in its entirety), a PEGylated form of IL2 like NKTR-214 (Charych et al., 2016), an IL15/anti-IL15 monoclonal antibody immune complex, an IL15/IL15 Receptor α-IgG1-Fc (IL15/IL15Rα-IgG1-Fc) immune complex (US20060257361A1, EP2724728A1 and Dubois et al., 2008), a genetically engineered IL-15 mutein that has a modified amino acid sequence compared to wild type IL-15 combined with an IL15Rα-IgG1-Fc immune complex (US20070160578; incorporated herein in its entirety), or a PEGylated form of IL15 with preferential binding to CD122/CD132. In some embodiments, more than one CD122/CD132 agonist are utilized.

VI. Oncolytic Viruses

In some aspects, the present disclosure comprises administration of at least one oncolytic virus. In some aspects, the oncolytic virus is engineered to express p53, MDA-7, IL-12, TGF-β inhibitor, ADP, and/or IL-10 inhibitor. In certain aspects, the oncolytic virus is a single- or double-stranded DNA virus, RNA virus, adenovirus, adeno-associated virus, retrovirus, lentivirus, herpes virus, pox virus, vaccinia virus, vesicular stomatitis virus, polio virus, Newcastle's Disease virus, Epstein-Barr virus, influenza virus, reoviruses, myxoma virus, maraba virus, rhabdovirus, enadenotucirev or coxsackie virus. In some aspects, the oncolytic virus is engineered to express a cytokine, such as granulocyte-macrophage colony-stimulating factor (GM-CSF) or IL-12. In some aspects, the oncolytic virus is further defined as talimogene laherparepvec (T-VEC). In some aspects, the oncolytic adenoviral vector is derived from a modified TERT Promoter Oncolytic Adenovirus (U.S. Pat. No. 8,067,567; incorporated herein by reference in its entirety) and/or the HRE-E2F-TERT Hybrid Promoter Oncolytic Adenovirus (PCT/KR2011/004693; incorporated herein by reference in its entirety) and/or an adenovirus with a modified Ela regulatory sequence wherein at least one Pea3 binding site, or a functional portion thereof, is deleted with an Elb-19K clone insertion site (EP2403951A2; incorporated herein by reference in its entirety) which may all be modified to express therapeutic genes. In some aspects, the oncolytic adenoviral vector is derived from Elb deleted oncolytic adenoviruses (Yu and Fang, 2007; Li, 2009; both incorporated by reference in their entirety).

Exemplary oncolytic viruses include, but are not limited to, Ad5-yCD/mutTKSR39rep-hIL12, Cavatak™, CG0070, DNX-2401, G207, HF10, IMLYGIC™ JX-594, MG1-MA3, MV-NIS, OBP-301, Reolysin, Toca 511, Oncorine, RIG-VIR, an adenovirus overexpressing the adenoviral death protein (ADP) as described in U.S. Pat. No. 7,589,069 B1; incorporated by reference in its entirety, such as VirRx007, an NIL deleted vaccinia virus expressing IL12 as described in PCT/GB2015/051023; incorporated by reference in its entirety. Other exemplary oncolytic viruses are described, for example, in International Patent Publication Nos. WO2015/027163, WO2014/138314, WO2014/047350, and WO2016/009017; all incorporated herein by reference.

In a particular aspect, the oncolytic viral agent is talimogene laherparepvec (T-VEC) which is an oncolytic herpes simplex virus genetically engineered to express GM-CSF. Talimogene laherparepvec, HSV-1 [strain JS1] ICP34.5-/ICP47-/hGM-CSF, (previously known as OncoVEX$^{GM\ CSF}$) is an intratumorally delivered oncolytic immunotherapy comprising an immune-enhanced HSV-1 that selectively replicates in solid tumors. (Lui et al., 2003; U.S. Pat. Nos. 7,223,593 and 7,537,924; incorporated herein by reference). In October 2015, the US FDA approved T-VEC, under the brand name IMLYGIC™, for the treatment of melanoma in patients with inoperable tumors. The characteristics and methods of administration of T-VEC are described in, for example, the IMLYGIC™ package insert (Amgen, 2015) and U.S. Patent Publication No. US2015/0202290; both incorporated herein by reference. For example, talimogene laherparepvec is typically administered by intratumoral injection into injectable cutaneous, subcutaneous, and nodal tumors at a dose of up to 4.0 ml of $10^6$ plaque forming unit/mL (PFU/mL) at day 1 of week 1 followed by a dose of up to 4.0 ml of $10^8$ PFU/mL at day 1 of week 4, and every 2 weeks (±3 days) thereafter. The recommended volume of talimogene laherparepvec to be injected into the tumor(s) is dependent on the size of the tumor(s) and should be determined according to the injection volume guideline. While T-VEC has demonstrated clinical activity in melanoma patients, many cancer patients either do not respond or cease responding to T-VEC treatment. In one embodiment, the p53 and/or MDA-7 nucleic acids and the at least one CD122/CD132 agonist may be administered after, during or before T-VEC therapy, such as to reverse treatment resistance.

In some embodiments, Elb deleted oncolytic adenoviruses are combined with at least one preferential CD122/CD132 agonist and at least one immune checkpoint inhibitor. Exemplary Elb deleted oncolytic adenoviruses are H101 (Oncorine), Onyx 015 or H103 which expresses the heat shock protein 70 (HSP70) or the oncolytic adenovirus H102 in which expression of the Ad Ela gene is driven by the alpha-fetoprotein (AFP) promoter resulting in preferential replication in hepatocellular carcinoma and other AFP overexpressing cancers compared to normal cells (Yu and Fang, 2007; Li, 2009; both incorporated by reference in their entirety).

Additional, representative CD122/CD132 agonists for use in the invention include but are not limited to the agents listed in Table 2 below:

| CD122/CD132 Agonist | Company | Description |
| --- | --- | --- |
| NKTR-214 | Nektar Therapeutics | CD122 (IL-2Rβ)-biased pegylated IL-2 |
| ALT-803 | Aitor Bioscience | Mutant IL-15/IL-15Rα fusion protein; Stable heterodimer aiming to increase half life of IL-15 |
| RG7461 | Roche | Fibroblast activation protein-alpha/IL-2variant fusion protein; Diminished CD25 (IL-2Rα) binding; |
| XmAb24306 | Xencor-Roche/Genentech | IL-15/IL-15Rα cytokine complex engineered with Xencor's bispecific Fc domain |
| Teleukin | Philogen | F16 antibody/IL-2 fusion protein |
| ALKS 4230 | Alkermes | IL-2/CD25 (IL-2Rα) fusion protein; Diminished CD25 (IL-2Rα) binding by virtue of steric hindrance |
| Cergutuzumab amunaleukin (RG7813) | Roche | CEA MAb/IL-2v fusion protein; Diminished CD25 (IL-2Rα) binding; |
| NHS-IL2-LT/EMD 521873 | Merck KGaA | IL-2/Ab fusion protein; Ab portion meant to direct agent to regions of tumour necrosis and apoptosis |
| NIZ985 | Novartis | IL15/soluble IL-15Rα dimer |
| Thor 707 | Synthorx | IL-2 Mutein; Diminished CD25 (IL-2Rα) binding by site-specific pegylation |
| IL-15 Synthorins | Synthorx | IL-15 Synthorins with differentiated properties by site-specific pegylation. |
| MDNA109 | Medicenna Therapeutics | IL-2 Mutein; Enhanced version of IL-2 |
| MultiPharm | Nascent Therapeutics | IL-2/MAb complexes; Diminished CD25 (IL-2Rα) binding; |

-continued

| CD122/CD132 Agonist | Company | Description |
| --- | --- | --- |
| PB101 | Pivotal Biosciences | Low-toxicity IL-2 analogue; Aims to circumvent Proleukin's vascular leak syndrome toxicity |
| Anti-IL-2 Program | Xoma | IL-2/MAb complexes; MAb directs IL-2 to enhance effect; |
| CT101-IL2 | Courier Therapeutics | Re-targets IL-2 (mutein) using cowpox OMCP protein to NKGD2 receptor; Directs IL-2 to enhance effect |
| Neo-2/15 | Neoluekin Therapeutics | Enhanced version of IL-2; Diminished CD25 (IL-2Rα) binding; |
| NKTR-255 | Nektar Therapeutics | IL-15Rα-specific agonist; Aims to engage IL-15Rα (CD215)/IL-2Rγ (CD132) complex |
| P22339 | Shanghai Hengrui | IL-15Rα-specific agonist; Aims to engage IL-15Rα (CD215)/IL-2Rγ (CD132) complex |
| CYP 0150 | Cytunepharma | IL-15 linked to Sushi + domain of IL-15Rα; Aims to circumvent IL-15Rα (CD215) cleavage |
| AM0015 | Armo Biosciences | rhIL-15 |

Abbreviations:
MAb = monoclonal antibody;
Ab = antibody;
r = recombinant;
h = human;
Rα = Receptor Alpha;

VII. Immune Checkpoint Inhibitors

In certain embodiments, the present disclosure provides methods of combining the blockade of immune checkpoints with tumor suppressor gene therapy, such as p53 and/or MDA-7 gene therapy. Immune checkpoints are molecules in the immune system that either turn up a signal (e.g., co-stimulatory molecules) or turn down a signal. Inhibitory checkpoint molecules that may be targeted by immune checkpoint blockade include adenosine A2A receptor (A2AR), B7-H3 (also known as CD276), Band T lymphocyte attenuator (BTLA), cytotoxic T-lymphocyte-associated protein 4 (CTLA-4, also known as CD152), indoleamine 2,3-dioxygenase (IDO), killer-cell immunoglobulin (KIR), lymphocyte activation gene-3 (LAG3), programmed death 1 (PD-1), T-cell immunoglobulin domain and mucin domain 3 (TIM-3) and V-domain Ig suppressor of T cell activation (VISTA). In particular, the immune checkpoint inhibitors target the PD-1 axis and/or CTLA-4.

The immune checkpoint inhibitors may be drugs such as small molecules, recombinant forms of ligand or receptors, or, in particular, are antibodies, such as human antibodies (e.g., International Patent Publication WO2015016718; Pardoll, Nat Rev Cancer, 12(4): 252-64, 2012; both incorporated herein by reference). Known inhibitors of the immune checkpoint proteins or analogs thereof may be used, in particular chimerized, humanized or human forms of antibodies may be used. As the skilled person will know, alternative and/or equivalent names may be in use for certain antibodies mentioned in the present disclosure. Such alternative and/or equivalent names are interchangeable in the context of the present invention. For example it is known that lambrolizumab is also known under the alternative and equivalent names MK-3475 and pembrolizumab.

It is contemplated that any of the immune checkpoint inhibitors that are known in the art to stimulate immune responses may be used. This includes inhibitors that directly or indirectly stimulate or enhance antigen-specific T-lymphocytes. These immune checkpoint inhibitors include, without limitation, agents targeting immune checkpoint proteins and pathways involving PD-L2, LAG3, BTLA, B7H4 and TIM3. For example, LAG3 inhibitors known in the art include soluble LAG3 (IMP321, or LAG3-Ig disclosed in WO2009044273) as well as mouse or humanized antibodies blocking human LAG3 (e.g., IMP701 disclosed in WO2008132601), or fully human antibodies blocking human LAG3 (such as disclosed in EP 2320940). Another example is provided by the use of blocking agents towards BTLA, including without limitation antibodies blocking human BTLA interaction with its ligand (such as 4C7 disclosed in WO2011014438). Yet another example is provided by the use of agents neutralizing B7H4 including without limitation antibodies to human B7H4 (disclosed in WO 2013025779, and in WO2013067492) or soluble recombinant forms of B7H4 (such as disclosed in US20120177645). Yet another example is provided by agents neutralizing B7-H3, including without limitation antibodies neutralizing human B7-H3 (e.g. MGA271 disclosed as BRCA84D and derivatives in US 20120294796). Yet another example is provided by agents targeting TIM3, including without limitation antibodies targeting human TIM3 (e.g. as disclosed in WO 2013006490 A2 or the anti-human TIM3, blocking antibody F38-2E2 disclosed by Jones et al., J Exp Med. 2008; 205(12):2763-79).

In addition, more than one immune checkpoint inhibitor (e.g., anti-PD-1 antibody and anti-CTLA-4 antibody) may be used in combination with the tumor suppressor gene therapy. For example, p53 gene therapy and immune checkpoint inhibitors (e.g., anti-KIR antibody and/or anti-PD-1 antibody) can be administered to enhance innate anti-tumor immunity followed by IL24 gene therapy and immune checkpoint inhibitors (e.g., anti-PD-1 antibody) to induce adaptive anti-tumor immune responses.

A. PD-1 Axis Antagonists

T cell dysfunction or anergy occurs concurrently with an induced and sustained expression of the inhibitory receptor, programmed death 1 polypeptide (PD-1). Thus, therapeutic targeting of PD-1 and other molecules which signal through interactions with PD-1, such as programmed death ligand 1 (PD-L) and programmed death ligand 2 (PD-L2) is provided herein. PD-L1 is overexpressed in many cancers and is often associated with poor prognosis (Okazaki T et al., Intern.

Immun. 2007 19(7):813). Thus, inhibition of the PD-L/PD-1 interaction in combination with p53, ADP, and/or MDA-7 gene therapy is provided herein such as to enhance CD8+ T cell-mediated killing of tumors.

Provided herein is a method for treating or delaying progression of cancer in an individual comprising administering to the individual an effective amount of a PD-1 axis binding antagonist in combination with p53, ADP (VirRx007), and/or MDA-7 gene therapy. Also provided herein is a method of enhancing immune function in an individual in need thereof comprising administering to the individual an effective amount of a PD-1 axis binding antagonist and p53, ADP (VirRx007), and/or MDA-7 gene therapy.

For example, a PD-1 axis binding antagonist includes a PD-1 binding antagonist, a PDL1 binding antagonist and a PDL2 binding antagonist. Alternative names for "PD-1" include CD279 and SLEB2. Alternative names for "PDL1" include B7-H1, B7-4, CD274, and B7-H. Alternative names for "PDL2" include B7-DC, Btdc, and CD273. In some embodiments, PD-1, PDL1, and PDL2 are human PD-1, PDL1 and PDL2.

In some embodiments, the PD-1 binding antagonist is a molecule that inhibits the binding of PD-1 to its ligand binding partners. In a specific aspect, the PD-1 ligand binding partners are PDL1 and/or PDL2. In another embodiment, a PDL1 binding antagonist is a molecule that inhibits the binding of PDL1 to its binding partners. In a specific aspect, PDL1 binding partners are PD-1 and/or B7-1. In another embodiment, the PDL2 binding antagonist is a molecule that inhibits the binding of PDL2 to its binding partners. In a specific aspect, a PDL2 binding partner is PD-1. The antagonist may be an antibody, an antigen binding fragment thereof, an immunoadhesion, a fusion protein, or oligopeptide. Exemplary antibodies are described in U.S. Pat. Nos. 8,735,553, 8,354,509, and 8,008,449, all incorporated herein by reference. Other PD-1 axis antagonists for use in the methods provided herein are known in the art such as described in U.S. Patent Application No. US20140294898, US2014022021, and US20110008369, all incorporated herein by reference.

In some embodiments, the PD-1 binding antagonist is an anti-PD-1 antibody (e.g., a human antibody, a humanized antibody, or a chimeric antibody). In some embodiments, the anti-PD-1 antibody is selected from the group consisting of nivolumab, pembrolizumab, and CT-011. In some embodiments, the PD-1 binding antagonist is an immunoadhesin (e.g., an immunoadhesin comprising an extracellular or PD-1 binding portion of PDL1 or PDL2 fused to a constant region (e.g., an Fc region of an immunoglobulin sequence). In some embodiments, the PD-1 binding antagonist is AMP-224. Nivolumab, also known as MDX-1106-04, MDX-1106, ONO-4538, BMS-936558, and OPDIVO®, is an anti-PD-1 antibody described in WO2006/121168. Pembrolizumab, also known as MK-3475, Merck 3475, lambrolizumab, KEYTRUDA®, and SCH-900475, is an anti-PD-1 antibody described in WO2009/114335. CT-011, also known as hBAT or hBAT-1, is an anti-PD-1 antibody described in WO2009/101611. AMP-224, also known as B7-DCIg, is a PDL2-Fc fusion soluble receptor described in WO2010/027827 and WO2011/066342. Additional PD-1 binding antagonists include Pidilizumab, also known as CT-011, MEDI0680, also known as AMP-514, and REGN2810.

In some aspects, the immune checkpoint inhibitor is a PD-L1 antagonist such as Durvalumab, also known as MEDI4736, atezolizumab, also known as MPDL328OA, or avelumab, also known as MSB00010118C. In certain aspects, the immune checkpoint inhibitor is a PD-L2 antagonist such as rHIgM12B7. In some aspects, the immune checkpoint inhibitor is a LAG-3 antagonist such as, but not limited to, IMP321, and BMS-986016. The immune checkpoint inhibitor may be an adenosine A2a receptor (A2aR) antagonist such as PBF-509.

In some aspects, the antibody described herein (such as an anti-PD-1 antibody, an anti-PDL1 antibody, or an anti-PDL2 antibody) further comprises a human or murine constant region. In a still further aspect, the human constant region is selected from the group consisting of IgG1, IgG2, IgG2, IgG3, IgG4. In a still further specific aspect, the human constant region is IgG1. In a still further aspect, the murine constant region is selected from the group consisting of IgG1, IgG2A, IgG2B, IgG3. In a still further specific aspect, the antibody has reduced or minimal effector function. In a still further specific aspect, the minimal effector function results from production in prokaryotic cells. In a still further specific aspect the minimal effector function results from an "effector-less Fc mutation" or aglycosylation.

Accordingly, an antibody used herein can be aglycosylated. Glycosylation of antibodies is typically either N-linked or O-linked. N-linked refers to the attachment of the carbohydrate moiety to the side chain of an asparagine residue. The tripeptide sequences asparagine-X-serine and asparagine-X-threonine, where X is any amino acid except proline, are the recognition sequences for enzymatic attachment of the carbohydrate moiety to the asparagine side chain. Thus, the presence of either of these tripeptide sequences in a polypeptide creates a potential glycosylation site. O-linked glycosylation refers to the attachment of one of the sugars N-aceylgalactosamine, galactose, or xylose to a hydroxy amino acid, most commonly serine or threonine, although 5-hydroxyproline or 5-hydroxy lysine may also be used. Removal of glycosylation sites form an antibody is conveniently accomplished by altering the amino acid sequence such that one of the above-described tripeptide sequences (for N-linked glycosylation sites) is removed. The alteration may be made by substitution of an asparagine, serine or threonine residue within the glycosylation site another amino acid residue (e.g., glycine, alanine or a conservative substitution).

The antibody or antigen binding fragment thereof, may be made using methods known in the art, for example, by a process comprising culturing a host cell containing nucleic acid encoding any of the previously described anti-PDL1, anti-PD-1, or anti-PDL2 antibodies or antigen-binding fragment in a form suitable for expression, under conditions suitable to produce such antibody or fragment, and recovering the antibody or fragment.

B. CTLA-4

Another immune checkpoint that can be targeted in the methods provided herein is the cytotoxic T-lymphocyte-associated protein 4 (CTLA-4), also known as CD152. The complete cDNA sequence of human CTLA-4 has the Genbank accession number L15006. CTLA-4 is found on the surface of T cells and acts as an "off" switch when bound to CD80 or CD86 on the surface of antigen-presenting cells. CTLA4 is a member of the immunoglobulin superfamily that is expressed on the surface of Helper T cells and transmits an inhibitory signal to T cells. CTLA4 is similar to the T-cell co-stimulatory protein, CD28, and both molecules bind to CD80 and CD86, also called B7-1 and B7-2 respectively, on antigen-presenting cells. CTLA4 transmits an inhibitory signal to T cells, whereas CD28 transmits a stimulatory signal. Intracellular CTLA4 is also found in regulatory T cells and may be important to their function. T cell activation through the T cell receptor and CD28 leads to increased expression of CTLA-4, an inhibitory receptor for B7 molecules.

In some embodiments, the immune checkpoint inhibitor is an anti-CTLA-4 antibody (e.g., a human antibody, a humanized antibody, or a chimeric antibody), an antigen binding fragment thereof, an immunoadhesin, a fusion protein, or oligopeptide.

Anti-human-CTLA-4 antibodies (or VH and/or VL domains derived therefrom) suitable for use in the present methods can be generated using methods well known in the art. Alternatively, art recognized anti-CTLA-4 antibodies can be used. For example, the anti-CTLA-4 antibodies disclosed in: U.S. Pat. No. 8,119,129, WO 01/14424, WO 98/42752; WO 00/37504 (CP675,206, also known as tremelimumab; formerly ticilimumab), U.S. Pat. No. 6,207,156; Hurwitz et al. (1998) Proc Natl Acad Sci USA 95(17): 10067-10071; Camacho et al. (2004) J Clin Oncology 22(145): Abstract No. 2505 (antibody CP-675206); and Mokyr et al. (1998) Cancer Res 58:5301-5304 can be used in the methods disclosed herein. The teachings of each of the aforementioned publications are hereby incorporated by reference. Antibodies that compete with any of these art-recognized antibodies for binding to CTLA-4 also can be used. For example, a humanized CTLA-4 antibody is described in International Patent Application No. WO2001014424, WO2000037504, and U.S. Pat. No. 8,017,114; all incorporated herein by reference.

An exemplary anti-CTLA-4 antibody is ipilimumab (also known as 10D1, MDX-010, MDX-101, and Yervoy®) or antigen binding fragments and variants thereof (see, e.g., WOO 1/14424). In other embodiments, the antibody comprises the heavy and light chain CDRs or VRs of ipilimumab. Accordingly, in one embodiment, the antibody comprises the CDR1, CDR2, and CDR3 domains of the VH region of ipilimumab, and the CDR1, CDR2 and CDR3 domains of the VL region of ipilimumab. In another embodiment, the antibody competes for binding with and/or binds to the same epitope on CTLA-4 as the above-mentioned antibodies. In another embodiment, the antibody has at least about 90% variable region amino acid sequence identity with the above-mentioned antibodies (e.g., at least about 90%, 95%, or 99% variable region identity with ipilimumab).

Other molecules for modulating CTLA-4 include CTLA-4 ligands and receptors such as described in U.S. Pat. Nos. 5,844,905, 5,885,796 and International Patent Application Nos. WO1995001994 and WO1998042752; all incorporated herein by reference, and immunoadhesions such as described in U.S. Pat. No. 8,329,867, incorporated herein by reference.

C. Killer Immunoglobulin-Like Receptor (KIR)

Another immune checkpoint inhibitor for use in the present invention is an anti-KIR antibody. Anti-human-KIR antibodies (or VH/VL domains derived therefrom) suitable for use in the invention can be generated using methods well known in the art.

Alternatively, art recognized anti-KIR antibodies can be used. The anti-KIR antibody can be cross-reactive with multiple inhibitory KIR receptors and potentiates the cytotoxicity of NK cells bearing one or more of these receptors. For example, the anti-KIR antibody may bind to each of KIR2D2DL1, KIR2DL2, and KIR2DL3, and potentiate NK cell activity by reducing, neutralizing and/or reversing inhibition of NK cell cytotoxicity mediated by any or all of these KIRs. In some aspects, the anti-KIR antibody does not bind KIR2DS4 and/or KIR2DS3. For example, monoclonal antibodies 1-7F9 (also known as IPH2101), 14F1, 1-6F1 and 1-6F5, described in WO 2006/003179, the teachings of which are hereby incorporated by reference, can be used. Antibodies that compete with any of these art-recognized antibodies for binding to KIR also can be used. Additional art-recognized anti-KIR antibodies which can be used include, for example, those disclosed in WO 2005/003168, WO 2005/009465, WO 2006/072625, WO 2006/072626, WO 2007/042573, WO 2008/084106, WO 2010/065939, WO 2012/071411 and WO/2012/160448.

An exemplary anti-KIR antibody is lirilumab (also referred to as BMS-986015 or IPH2102). In other embodiments, the anti-KIR antibody comprises the heavy and light chain complementarity determining regions (CDRs) or variable regions (VRs) of lirilumab. Accordingly, in one embodiment, the antibody comprises the CDR1, CDR2, and CDR3 domains of the heavy chain variable (VH) region of lirilumab, and the CDR1, CDR2 and CDR3 domains of the light chain variable (VL) region of lirilumab. In another embodiment, the antibody has at least about 90% variable region amino acid sequence identity with lirilumab.

VIII. Methods of Treatment

Provided herein are methods for treating or delaying progression of cancer in an individual comprising administering to the individual an effective amount of at least one CD122/CD132 agonist and at least one tumor suppressor gene therapy (e.g., p53 and/or MDA-7 gene therapy, or viral oncolytic therapy—VirRx007). The therapy may further comprise at least one immune checkpoint inhibitor (e.g., PD-1 axis binding antagonist and/or CTLA-4 antibody).

In some embodiments, the treatment results in a sustained response in the individual after cessation of the treatment. The methods described herein may find use in treating conditions where enhanced immunogenicity is desired such as increasing tumor immunogenicity for the treatment of cancer. Also provided herein are methods of enhancing immune function such as in an individual having cancer comprising administering to the individual an effective amount of a CD122/CD132 agonist (e.g., IL-2/anti-IL-2 immune complex, IL-15/anti-IL-15 immune complex, an IL-15/IL-15 Receptor α-IgG1-Fc (IL-15/IL-15Rα-IgG1-Fc) immunocomplex, PEGylated IL-2, PEGylated IL-15, IL-2 muteins and/or IL-15 muteins) and p53 and/or MDA-7 tumor suppressor gene therapy, or viral oncolytic therapy, VirRx007. The CD122/CD132 agonist may be an IL-15 mutant (e.g., IL-15N72D) bound to an IL-15 receptor α/IgG1 Fc fusion protein, such as ALT-803. In some embodiments, the individual is a human.

In some aspects, the subject is further administered a tumor suppressor immune gene therapy (see, PCT/US2016/060833, which is incorporated herein by reference in its entirety). In some aspects, the subject is further administered additional viral and non-viral gene therapies (PCT/US2017/065861; incorporated herein by reference in its entirety). In some aspects, the replication competent and/or replication incompetent viral and/or non-viral gene therapy may deliver one or more therapeutic genes which could be tumor suppressor genes or immune stimulatory genes.

Examples of cancers contemplated for treatment include lung cancer, head and neck cancer, breast cancer, pancreatic cancer, prostate cancer, renal cancer, bone cancer, testicular cancer, cervical cancer, gastrointestinal cancer, lymphomas, pre-neoplastic lesions in the lung, colon cancer, melanoma, and bladder cancer.

In some embodiments, the individual has cancer that is resistant (has been demonstrated to be resistant) to one or more anti-cancer therapies. In some embodiments, resistance to anti-cancer therapy includes recurrence of cancer or refractory cancer. Recurrence may refer to the reappearance of cancer, in the original site or a new site, after treatment. In some embodiments, resistance to anti-cancer therapy includes progression of the cancer during treatment with the anti-cancer therapy. In some embodiments, the cancer is at early stage or at late stage.

In some embodiments, the subject is also treated with an immune checkpoint inhibitor such as a PD-1 axis binding antagonist and/or an anti-CTLA-4 antibody. The individual may have a cancer that expresses (has been shown to express e.g., in a diagnostic test) PD-L1 biomarker or have a high tumor mutational burden. In some embodiments, the patient's cancer expresses low PD-L1 biomarker. In some embodiments, the patient's cancer expresses high PD-L1 biomarker. The PD-L1 biomarker can be detected in the sample using a method selected from the group consisting of FACS, Western blot, ELISA, immunoprecipitation, immunohistochemistry, immunofluorescence, radioimmunoassay, dot blotting, immunodetection methods, HPLC, surface plasmon resonance, optical spectroscopy, mass spectrometery, HPLC, qPCR, RT-qPCR, multiplex qPCR or RT-qPCR, RNA-seq, microarray analysis, SAGE, MassARRAY technique, and FISH, and combinations thereof. Measurement of a high mutational tumor burden may be determined by genomic sequencing (e.g., Foundation One CDx assay).

In some embodiments, the subject is also treated with a histone deacetylase (HDAC) inhibitor (e.g., tractinostat, formerly CHR-3996 or VRx-3996, an orally administered class 1 histone deacetylase selective inhibitor).

The efficacy of any of the methods described herein (e.g., combination treatments including administering an effective amount of a combination of at least one CD122/CD132 agonist, a p53, ADP, and/or MDA-7 gene therapy, at least one immune checkpoint inhibitor, and/or at least one HDAC inhibitor may be tested in various models known in the art, such as clinical or pre-clinical models. Suitable pre-clinical models are exemplified herein and further may include without limitation ID8 ovarian cancer, GEM models, B16 melanoma, RENCA renal cell cancer, CT26 colorectal cancer, MC38 colorectal cancer, and Cloudman melanoma models of cancer.

In some embodiments of the methods of the present disclosure, the cancer has low levels of T cell infiltration. In some embodiments, the cancer has no detectable T cell infiltrate. In some embodiments, the cancer is a non-immunogenic cancer (e.g., non-immunogenic colorectal cancer and/or ovarian cancer). Without being bound by theory, the combination treatment may increase T cell (e.g., CD4$^+$ T cell, CD8$^+$ T cell, memory T cell) priming, activation and/or proliferation relative to prior to the administration of the combination.

In some embodiments of the methods of the present disclosure, activated CD4 and/or CD8 T cells in the individual are characterized by γ-IFN producing CD4 and/or CD8 T cells and/or enhanced cytolytic activity relative to prior to the administration of the combination. γ-IFN may be measured by any means known in the art, including, e.g., intracellular cytokine staining (ICS) involving cell fixation, permeabilization, and staining with an antibody against γ-IFN. Cytolytic activity may be measured by any means known in the art, e.g., using a cell killing assay with mixed effector and target cells.

The present disclosure is useful for any human cell that participates in an immune reaction either as a target for the immune system or as part of the immune system's response to the foreign target. The methods include ex vivo methods, in vivo methods, and various other methods that involve injection of polynucleotides or vectors into the host cell. The methods also include injection directly into the tumor or tumor bed as well as local or regional to the tumor.

A. Administration

The combination therapy provided herein comprises administration of a preferential CD122/CD132 agonist (e.g., IL-2/anti-IL-2 immune complex, IL-15/anti-IL-15 immune complex, an IL-15/IL-15 Receptor α-IgG1-Fc (IL-15/IL-15Rα-IgG1-Fc) immunocomplex, PEGylated IL-2, PEGylated IL-15, IL-2 muteins and/or IL-15 muteins) and a p53, ADP, and/or MDA-7 gene therapy. The combination therapy may be administered in any suitable manner known in the art. For example, a CD122/CD132 agonist (e.g., IL-2/anti-IL-2 immune complex, IL-15/anti-IL-15 immune complex, an IL-15/IL-15 Receptor α-IgG1-Fc (IL-15/IL-15Rα-IgG1-Fc) immunocomplex, PEGylated IL-2, PEGylated IL-15, IL-2 muteins and/or IL-15 muteins) and a p53 and/or MDA-7 gene therapy may be administered sequentially (at different times) or concurrently (at the same time). In some embodiments, the one or more CD122/CD132 agonists are in a separate composition as the p53, ADP, and/or MDA-7 gene therapy or expression construct thereof. In some embodiments, the CD122/CD132 agonist is in the same composition as the p53 and/or MDA-7 gene therapy. In certain aspects, the subject is administered the nucleic acid encoding p53, ADP, and/or the nucleic acid encoding MDA-7 before, simultaneously, or after the at least one CD122/CD132 agonist.

The one or more CD122/CD132 agonists and the p53, ADP, and/or MDA-7 gene therapy may be administered by the same route of administration or by different routes of administration. In some embodiments, the CD122/CD132 agonist is administered intravenously, intramuscularly, subcutaneously, topically, orally, transdermally, intraperitoneally, intraorbitally, by implantation, by inhalation, intrathecally, intraventricularly, or intranasally. In some embodiments, the p53, ADP, and/or MDA-7 gene therapy is administered intravenously, intramuscularly, subcutaneously, topically, orally, transdermally, intraperitoneally, intraorbitally, by implantation, by inhalation, intrathecally, intraventricularly, or intranasally. An effective amount of the CD122/CD132 agonist and the p53, ADP, and/or MDA-7 gene therapy may be administered for prevention or treatment of disease. The appropriate dosage of CD122/CD132 agonist and/or the p53, ADP, and/or MDA-7 gene therapy may be determined based on the type of disease to be treated, severity and course of the disease, the clinical condition of the individual, the individual's clinical history and response to the treatment, and the discretion of the attending physician. In some embodiments, combination treatment with at least one CD122/CD132 agonist (e.g., IL-2/anti-IL-2 immune complex, IL-15/anti-IL-15 immune complex, an IL-15/IL-15 Receptor α-IgG1-Fc (IL-15/IL-15Rα-IgG1-Fc) immunocomplex, PEGylated IL-2, PEGylated IL-15, IL-2 muteins and/or IL-15 muteins) and a p53, ADP, and/or MDA-7 gene therapy are synergistic, whereby there is more than an additive effect of separate doses of a p53, ADP, and/or MDA-7 gene therapy in the combination with at the least one CD122/CD132 agonist (e.g., IL-2/anti-IL-2 immune complex, IL-15/anti-IL-15 immune complex, an IL-15/IL-15 Receptor α-IgG1-Fc (IL-15/IL-15Rα-IgG1-Fc)

immunocomplex, PEGylated IL-2, PEGylated IL-15, IL-2 muteins and/or IL-15 muteins) compared to the treatment as a single agent.

For example, the therapeutically effective amount of the CD122/CD132 agonist, such as an IL-2/anti-IL-2 immune complex, IL-15/anti-IL-15 immune complex, an IL-15/IL-15 Receptor α-IgG1-Fc (IL-15/IL-15Rα-IgG1-Fc) immunocomplex, PEGylated IL-2, PEGylated IL-15, IL-2 muteins and/or IL-15 muteins) is administered in doses ranging between 5-100 ug/kg given either SQ or IV at intervals ranging from weekly to every 2-4 weeks.

For example, when the therapeutically effective amount of the one or more CD122/CD132 agonists and the p53, ADP, and/or MDA-7 gene therapy is administered in further combination with an immune checkpoint inhibitor, such as an antibody, will be in the range of about 0.01 to about 50 mg/kg of patient body weight whether by one or more administrations. In some embodiments, the antibody used is about 0.01 to about 45 mg/kg, about 0.01 to about 40 mg/kg, about 0.01 to about 35 mg/kg, about 0.01 to about 30 mg/kg, about 0.01 to about 25 mg/kg, about 0.01 to about 20 mg/kg, about 0.01 to about 15 mg/kg, about 0.01 to about 10 mg/kg, about 0.01 to about 5 mg/kg, or about 0.01 to about 1 mg/kg administered daily, for example. In some embodiments, the antibody is administered at 15 mg/kg. However, other dosage regimens may be useful. In one embodiment, an anti-PD-L antibody described herein is administered to a human at a dose of about 100 mg, about 200 mg, about 300 mg, about 400 mg, about 500 mg, about 600 mg, about 700 mg, about 800 mg, about 900 mg, about 1000 mg, about 1100 mg, about 1200 mg, about 1300 mg or about 1400 mg on day 1 of 21-day cycles. The dose may be administered as a single dose or as multiple doses (e.g., 2 or 3 doses), such as infusions. The progress of this therapy is easily monitored by conventional techniques.

Intratumoral injection, or injection into the tumor vasculature is specifically contemplated for the p53, ADP, and/or MDA-7 gene therapy component of the combined therapy. Local, regional or systemic administration also may be appropriate. For tumors of >4 cm, the volume to be administered will be about 4-10 ml (in particular 10 ml), while for tumors of <4 cm, a volume of about 1-3 ml will be used (in particular 3 ml). Multiple injections delivered as single dose comprise about 0.1 to about 0.5 ml volumes. For example, adenoviral particles may advantageously be contacted by administering multiple injections to the tumor.

Treatment regimens may vary as well, and often depend on tumor type, tumor location, disease progression, and health and age of the patient. Obviously, certain types of tumors will require more aggressive treatment, while at the same time, certain patients cannot tolerate more taxing protocols. The clinician will be best suited to make such decisions based on the known efficacy and toxicity (if any) of the therapeutic formulations.

In certain embodiments, the tumor being treated may not, at least initially, be respectable. The combined treatments may increase the respectability of the tumor due to shrinkage at the margins or by elimination of certain particularly invasive portions. Following the combined treatments, resection is performed. Additional treatments subsequent to resection will serve to eliminate residual disease.

The treatments may include various "unit doses." Unit dose is defined as containing a predetermined-quantity of the therapeutic composition. The quantity to be administered, and the particular route and formulation, are within the skill of those in the clinical arts. A unit dose need not be administered as a single injection but may comprise continuous infusion over a set period of time. Unit dose of the present invention may conveniently be described in terms of plaque forming units (pfu) for a viral construct. Unit doses range from $10^3$, $10^4$, $10^5$, $10^6$, $10^7$, $10^8$, $10^9$, $10^{10}$, $10^{11}$, $10^{12}$, $10^{13}$ pfu and higher. Alternatively, depending on the kind of virus and the titer attainable, one will deliver 1 to 100, 10 to 50, 100-1000, or up to about $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, or $1\times10^{15}$ or higher infectious viral particles (vp) to the patient or to the patient's cells.

B. Injectable Compositions and Formulations

One method for the delivery of one or more expression constructs encoding human p53, ADP, and MDA-7 proteins to hyperproliferative cells in the present invention is via intratumoral injection while the CD122/CD132 agonists, immune checkpoint inhibitors and HDAC inhibitors are administered systemically. However, the pharmaceutical compositions disclosed herein may alternatively be administered intra-tumorally, parenterally, intravenously, intradermally, intra-arterially, intramuscularly, transdermally or even intraperitoneally as described in U.S. Pat. Nos. 5,543,158, 5,641,515 and 5,399,363, all incorporated herein by reference.

Injection of nucleic acid constructs may be delivered by syringe or any other method used for injection of a solution, as long as the expression construct can pass through the particular gauge of needle required for injection. A novel needleless injection system has been described (U.S. Pat. No. 5,846,233) having a nozzle defining an ampule chamber for holding the solution and an energy device for pushing the solution out of the nozzle to the site of delivery. A syringe system has also been described for use in gene therapy that permits multiple injections of predetermined quantities of a solution precisely at any depth (U.S. Pat. No. 5,846,225). Another injection system that may be used is the Quadra-Fuse device comprising a multipronged needle adjustable to different depths with an attached syringe.

Solutions of the active compounds as free base or pharmacologically acceptable salts may be prepared in water suitably mixed with a surfactant, such as hydroxypropylcellulose. Dispersions may also be prepared in glycerol, liquid polyethylene glycols, and mixtures thereof and in oils. Under ordinary conditions of storage and use, these preparations contain a preservative to prevent the growth of microorganisms. The pharmaceutical forms suitable for injectable use include sterile aqueous solutions or dispersions and sterile powders for the extemporaneous preparation of sterile injectable solutions or dispersions (U.S. Pat. No. 5,466,468). In all cases the form must be sterile and must be fluid to the extent that easy syringability exists. It must be stable under the conditions of manufacture and storage and must be preserved against the contaminating action of microorganisms, such as bacteria and fungi. The carrier can be a solvent or dispersion medium containing, for example, water, ethanol, polyol (e.g., glycerol, propylene glycol, and liquid polyethylene glycol, and the like), suitable mixtures thereof, and/or vegetable oils. Proper fluidity may be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

For parenteral administration in an aqueous solution, for example, the solution should be suitably buffered if necessary and the liquid diluent first rendered isotonic with sufficient saline or glucose. These particular aqueous solutions are especially suitable for intravenous, intramuscular, subcutaneous, intratumoral and intraperitoneal administration. In this connection, sterile aqueous media that can be employed will be known to those of skill in the art in light of the present disclosure. For example, one dosage may be dissolved in 1 ml of isotonic NaCl solution and either added to 1000 ml of hypodermoclysis fluid or injected at the proposed site of infusion, (see for example, "Remington's Pharmaceutical Sciences" 22md Edition). Some variation in dosage will necessarily occur depending on the condition of the subject being treated. The person responsible for administration will, in any event, determine the appropriate dose for the individual subject. Moreover, for human administration, preparations should meet sterility, pyrogenicity, general safety and purity standards as required by FDA Office of Biologics standards.

Sterile injectable solutions are prepared by incorporating the active compounds in the required amount in the appropriate solvent with various of the other ingredients enumerated above, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vaccuum-drying and freeze-drying techniques which yield a powder of the active ingredient plus any additional desired ingredient from a previously sterile-filtered solution thereof.

The compositions disclosed herein may be formulated in a neutral or salt form. Pharmaceutically-acceptable salts, include the acid addition salts (formed with the free amino groups of the protein) and which are formed with inorganic acids such as, for example, hydrochloric or phosphoric acids, or such organic acids as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like. Upon formulation, solutions will be administered in a manner compatible with the dosage formulation and in such amount as is therapeutically effective. The formulations are easily administered in a variety of dosage forms such as injectable solutions, drug release capsules and the like.

C. Additional Anti-Cancer Therapies

In order to increase the effectiveness of the p53, ADP, and/or MDA-7 nucleic acids and the at least one CD122/CD132 agonist, they can be combined with at least one additional agent effective in the treatment of cancer. More generally, these other compositions would be provided in a combined amount effective to kill or inhibit proliferation of the cell. This process may involve contacting the cells with the expression construct and the agent(s) or multiple factor (s) at the same time. This may be achieved by contacting the cell with a single composition or pharmacological formulation that includes both agents, or by contacting the cell with two distinct compositions or formulations, at the same time, wherein one composition includes the expression construct and the other includes the second agent(s). Alternatively, the expression construct may contact the proliferating cell and the additional therapy may affect other cells of the immune system or the tumor microenvironment to enhance anti-tumor immune responses and therapeutic efficacy. The at least one additional anticancer therapy may be, without limitation, a surgical therapy, chemotherapy (e.g., administration of a protein kinase inhibitor or a EGFR-targeted therapy), radiation therapy, cryotherapy, hyperthermia treatment, phototherapy, radioablation therapy, hormonal therapy, immunotherapy including but not limited to immune checkpoint inhibitors, small molecule therapy, receptor kinase inhibitor therapy, anti-angiogenic therapy, cytokine therapy or a biological therapies such as monoclonal antibodies, siRNA, miRNA, antisense oligonucleotides, ribozymes or gene therapy. Without limitation the biological therapy may be a gene therapy, such as tumor suppressor gene therapy, a cell death protein gene therapy, a cell cycle regulator gene therapy, a cytokine gene therapy, a toxin gene therapy, an immunogene therapy, a suicide gene therapy, a prodrug gene therapy, an anti-cellular proliferation gene therapy, an enzyme gene therapy, or an anti-angiogenic factor gene therapy.

The gene therapy may precede or follow the other agent treatment by intervals ranging from minutes to weeks. In embodiments where the other agent and expression construct are applied separately to the cell, one would generally ensure that a significant period of time did not expire between the time of each delivery, such that the agent and expression construct would still be able to exert an advantageously combined effect on the cell. In such instances, it is contemplated that one may contact the cell with both modalities within about 12-24 hours of each other and, more preferably, within about 6-12 hours of each other. In some situations, it may be desirable to extend the time period for treatment significantly, however, where several days (e.g., 2, 3, 4, 5, 6 or 7) to several weeks (e.g., 1, 2, 3, 4, 5, 6, 7 or 8) lapse between the respective administrations. In certain embodiments, one or more of the therapies may be continued either with or without the others as maintenance therapy.

Various combinations may be employed, gene therapy and CD122/CD132 agonist is "A" and the secondary agent, i.e. an immune checkpoint inhibitor, is "B":

A/B/A B/A/B B/B/A A/A/B A/B/B B/A/A A/B/B/B B/A/B/B
B/B/B/A B/B/A/B A/A/B/B A/B/A/B A/B/B/A B/B/A/A
B/A/B/A B/A/A/B A/A/A/B B/A/A/A A/B/A/A A/A/B/A

1. Chemotherapy

Cancer therapies in general also include a variety of combination therapies with both chemical and radiation based treatments. Combination chemotherapies include, for example, cisplatin (CDDP), carboplatin, procarbazine, mechlorethamine, cyclophosphamide, camptothecin, ifosfamide, melphalan, chlorambucil, busulfan, nitrosurea, dactinomycin, daunorubicin, doxorubicin, bleomycin, plicomycin, mitomycin, etoposide (VP16), tamoxifen, raloxifene, estrogen receptor binding agents, taxol, gemcitabien, navelbine, famesyl-protein transferase inhibitors, transplatinum, 5-fluorouracil, vincristine, vinblastine and methotrexate, Temazolomide (an aqueous form of DTIC), or any analog or derivative variant of the foregoing. The combination of chemotherapy with biological therapy is known as biochemotherapy. The chemotherapy may also be administered at low, continuous doses which is known as metronomic chemotherapy.

Yet further combination chemotherapies include, for example, alkylating agents such as thiotepa and cyclosphosphamide; alkyl sulfonates such as busulfan, improsulfan and piposulfan; aziridines such as benzodopa, carboquone, meturedopa, and uredopa; ethylenimines and methylamelamines including altretamine, triethylenemelamine, trietylenephosphoramide, triethiylenethiophosphoramide and trimethylolomelamine; acetogenins (especially bullatacin and bullatacinone); a camptothecin (including the synthetic analogue topotecan); bryostatin; callystatin; CC-1065 (including its adozelesin, carzelesin and bizelesin synthetic analogues); cryptophycins (particularly cryptophycin 1 and cryptophycin 8); dolastatin; duocarmycin (including the synthetic analogues, KW-2189 and CB1-TM1); eleutherobin; pancratistatin; a sarcodictyin; spongistatin; nitrogen mustards such as chlorambucil, chlornaphazine, cholophosphamide, estramustine, ifosfamide, mechlorethamine, mechlorethamine oxide hydrochloride, melphalan, novembichin, phenesterine, prednimustine, trofosfamide, uracil mustard; nitrosureas such as carmustine, chlorozotocin, fotemustine, lomustine, nimustine, and ranimnustine; antibiotics such as the enediyne antibiotics (e.g., calicheamicin, especially calicheamicin gammalI and calicheamicin omegaII; dynemicin, including dynemicin A; bisphosphonates, such as clodronate; an esperamicin; as well as neocarzinostatin chromophore and related chromoprotein enediyne antiobiotic chromophores, aclacinomysins, actinomycin, authrarnycin, azaserine, bleomycins, cactinomycin, carabicin, carminomycin, carzinophilin, chromomycinis, dactinomycin, daunorubicin, detorubicin, 6-diazo-5-oxo-L-norleucine, doxorubicin (including morpholino-doxorubicin, cyanomorpholino-doxorubicin, 2-pyrrolino-doxorubicin and deoxydoxorubicin), epirubicin, esorubicin, idarubicin, marcellomycin, mitomycins such as mitomycin C, mycophenolic acid, nogalarnycin, olivomycins, peplomycin, potfiromycin, puromycin, quelamycin, rodorubicin, streptonigrin, streptozocin, tubercidin, ubenimex, zinostatin, zorubicin; anti-metabolites such as methotrexate and 5-fluorouracil (5-FU); folic acid analogues such as denopterin, pteropterin, trimetrexate; purine analogs such as fludarabine, 6-mercaptopurine, thiamiprine, thioguanine; pyrimidine analogs such as ancitabine, azacitidine, 6-azauridine, carmofur, cytarabine, dideoxyuridine, doxifluridine, enocitabine, floxuridine; androgens such as calusterone, dromostanolone propionate, epitiostanol, mepitiostane, testolactone; anti-adrenals such as mitotane, trilostane; folic acid replenisher such as frolinic acid; aceglatone; aldophosphamide glycoside; aminolevulinic acid; eniluracil; amsacrine; bestrabucil; bisantrene; edatraxate; defofamine; demecolcine; diaziquone; elformithine; elliptinium acetate; an epothilone; etoglucid; gallium nitrate; hydroxyurea; lentinan; lonidainine; maytansinoids such as maytansine and ansamitocins; mitoguazone; mitoxantrone; mopidanmol; nitraerine; pentostatin; phenamet; pirarubicin; losoxantrone; podophyllinic acid; 2-ethylhydrazide; procarbazine; PSK polysaccharide complex; razoxane; rhizoxin; sizofiran; spirogermanium; tenuazonic acid; triaziquone; 2,2',2"-trichlorotriethylamine; trichothecenes (especially T-2 toxin, verracurin A, roridin A and anguidine); urethan; vindesine; dacarbazine; mannomustine; mitobronitol; mitolactol; pipobroman; gacytosine; arabinoside ("Ara-C"); cyclophosphamide; taxoids, e.g., paclitaxel and docetaxel gemcitabine; 6-thioguanine; mercaptopurine; platinum coordination complexes such as cisplatin, oxaliplatin and carboplatin; vinblastine; platinum; etoposide (VP-16); ifosfamide; mitoxantrone; vincristine; vinorelbine; novantrone; teniposide; edatrexate; daunomycin; aminopterin; xeloda; ibandronate; irinotecan (e.g., CPT-11); topoisomerase inhibitor RFS 2000; difluorometlhylornithine (DMFO); retinoids such as retinoic acid; capecitabine; carboplatin, procarbazine, plicomycin, gemcitabien, navelbine, farnesyl-protein transferase inhibitors, transplatinum; and pharmaceutically acceptable salts, acids or derivatives of any of the above. In certain embodiments, the compositions provided herein may be used in combination with histone deacetylase inhibitors. In certain embodiments, the compositions provided herein may be used in combination with gefitinib. In other embodiments, the present embodiments may be practiced in combination with Gleevec (e.g., from about 400 to about 800 mg/day of Gleevec may be administered to a patient). In certain embodiments, one or more chemotherapeutic may be used in combination with the compositions provided herein.

2. Radiotherapy

Other factors that cause DNA damage and have been used extensively include what are commonly known as y-rays, X-rays, and/or the directed delivery of radioisotopes to tumor cells. Other forms of DNA damaging factors are also known such as microwaves and UV-irradiation. It is most likely that all of these factors effect a broad range of damage on DNA, on the precursors of DNA, on the replication and repair of DNA, and on the assembly and maintenance of chromosomes. Dosage ranges for X-rays range from daily doses of 50 to 200 roentgens for prolonged periods of time (3 to 4 wk), to single doses of 2000 to 6000 roentgens. Dosage ranges for radioisotopes vary widely, and depend on the half-life of the isotope, the strength and type of radiation emitted, and the uptake by the neoplastic cells.

3. Immunotherapy

Immunotherapeutics, generally, rely on the use of immune effector cells and molecules to target and destroy cancer cells. The immune effector may be, for example, an antibody specific for some marker on the surface of a tumor cell. The antibody alone may serve as an effector of therapy or it may recruit other cells to actually effect cell killing. The antibody also may be conjugated to a drug or toxin (chemotherapeutic, radionuclide, ricin A chain, cholera toxin, pertussis toxin, etc.) and serve merely as a targeting agent. Alternatively, the effector may be a lymphocyte carrying a surface molecule that interacts, either directly or indirectly, with a tumor cell target. Various effector cells include cytotoxic T cells and NK cells as well as genetically engineered variants of these cell types modified to express chimeric antigen receptors. Mda-7 gene transfer to tumor cells causes tumor cell death and apoptosis. The apoptotic tumor cells are scavenged by reticuloendothelial cells including dendritic cells and macrophages and presented to the immune system to generate anti-tumor immunity (Rovere et al., 1999; Steinman et al., 1999).

It will be appreciated by those skilled in the art of cancer immunotherapy that other complementary immune therapies may be added to the regimens described above to further enhance their efficacy including but not limited to GM-CSF to increase the number of myeloid derived innate immune system cells, low dose cyclophosphamide or PI3K inhibitors (e.g., PI3K delta inhibitors) to eliminate T regulatory cells that inhibit innate and adaptive immunity and 5FU (e.g., capecitabine), PI3K inhibitors or histone deacetylase inhibitors to remove inhibitory myeloid derived suppressor cells. For example, PI3K inhibitors include, but are not limited to, LY294002, Perifosine, BKM120, Duvelisib, PX-866, BAY 80-6946, BEZ235, SF1126, GDC-0941, XL147, XL765, Palomid 529, GSK1059615, PWT33597, IC87114, TG100-15, CAL263, PI-103, GNE-477, CUDC-907, and AEZS-136. In some aspects, the PI3K inhibitor is a PI3K delta inhibitor such as, but not limited to, Idelalisib, RP6530, TGR1202, and RP6503. Additional PI3K inhibitors are disclosed in U.S. Patent Application Nos. US20150291595, US20110190319, and International Patent Application Nos. WO2012146667, WO2014164942, WO2012062748, and WO2015082376. The immunotherapy may also comprise the administration of an interleukin such as IL-2, or an interferon such as INFα.

Examples of immunotherapies that can be combined with the p53, ADP, and/or MDA-7 gene therapy and CD122/CD132 agonists are immune adjuvants (e.g., *Mycobacterium bovis*, *Plasmodium falciparum*, dinitrochlorobenzene and aromatic compounds) (U.S. Pat. Nos. 5,801,005; 5,739,169; Hui and Hashimoto, 1998; Christodoulides et al., 1998), cytokine therapy (e.g., interferons α, β and γ; interleukins (IL-1, IL-2), GM-CSF and TNF) (Bukowski et al., 1998; Davidson et al., 1998; Hellstrand et al., 1998) gene therapy (e.g., TNF, IL-1, IL-2, p53) (Qin et al., 1998; Austin-Ward and Villaseca, 1998; U.S. Pat. Nos. 5,830,880 and 5,846,945) and monoclonal antibodies (e.g., anti-ganglioside GM2, anti-HER-2, anti-p185) (Pietras et al., 1998; Hanibuchi et al., 1998; U.S. Pat. No. 5,824,311). Herceptin (trastuzumab) is a chimeric (mouse-human) monoclonal antibody that blocks the HER2-neu receptor. It possesses anti-tumor activity and has been approved for use in the treatment of malignant tumors (Dillman, 1999). Combination therapy of cancer with herceptin and chemotherapy has been shown to be more effective than the individual therapies. Thus, it is contemplated that one or more anti-cancer therapies may be employed with the p53, ADP. and/or MDA-7 gene therapy described herein.

Additional immunotherapies that may be combined with the p53, ADP, and/or MDA-7 gene therapy and CD122/CD132 agonists include immune checkpoint inhibitors, a co-stimulatory receptor agonist, a stimulator of innate immune cells, or an activator of innate immunity. In certain aspects the immune checkpoint inhibitor is an inhibitor of CTLA-4, PD-1, PD-L1, PD-L2, LAG-3, BTLA, B7H3, B7H4, TIM3, KIR, or A2aR. In some aspects, the at least one immune checkpoint inhibitor is an anti-CTLA-4 antibody. In some aspects, the anti-CTLA-4 antibody is tremelimumab or ipilimumab. In certain aspects, the at least one immune checkpoint inhibitor is an anti-killer-cell immunoglobulin-like receptor (KIR) antibody. In some embodiments, the anti-KIR antibody is lirilumab. In some aspects, the inhibitor of PD-L1 is durvalumab, atezolizumab, or avelumab. In some aspects, the inhibitor of PD-L2 is rHIgM12B7. In some aspects, the LAG3 inhibitor is IMP321, or BMS-986016. In some aspects, the inhibitor of A2aR is PBF-509.

In some aspects, the at least one immune checkpoint inhibitor is a human programmed cell death 1 (PD-1) axis binding antagonist. In certain aspects, the PD-1 axis binding antagonist is selected from the group consisting of a PD-1 binding antagonist, a PDL1 binding antagonist and a PDL2 binding antagonist. In some aspects, the PD-1 axis binding antagonist is a PD-1 binding antagonist. In certain aspects, the PD-1 binding antagonist inhibits the binding of PD-1 to PDL1 and/or PDL2. In particular, the PD-1 binding antagonist is a monoclonal antibody or antigen binding fragment thereof. In some embodiments, the PD-1 binding antagonist is nivolumab, pembrolizumab, pidilizumab, AMP-514, REGN2810, CT-011, BMS 936559, MPDL328OA or AMP-224.

In certain aspects, the at least one checkpoint inhibitor is selected from an inhibitor of CTLA-4, PD-1, PD-L1, PD-L2, LAG-3, BTLA, B7H3, B7H4, TIM3, KIR, or A2aR. In some aspects, the at least one immune checkpoint inhibitor is an anti-CTLA-4 antibody. In some aspects, the anti-CTLA-4 antibody is tremelimumab or ipilimumab. In certain aspects, the at least one immune checkpoint inhibitor is an anti-killer-cell immunoglobulin-like receptor (KIR) antibody. In some embodiments, the anti-KIR antibody is lirilumab. In some aspects, the inhibitor of PD-L1 is durvalumab, atezolizumab, or avelumab. In some aspects, the inhibitor of PD-L2 is rHIgM12B7. In some aspects, the LAG3 inhibitor is IMP321, or BMS-986016. In some aspects, the inhibitor of A2aR is PBF-509.

The co-stimulatory receptor agonist may be an anti-OX40 antibody (e.g., MEDI6469, MEDI6383, MEDI0562, and MOXR0916), anti-GITR antibody (e.g., TRX518, and MK-4166), anti-CD137 antibody (e.g., Urelumab, and PF-05082566), anti-CD40 antibody (e.g., CP-870,893, and Chi Lob 7/4), or an anti-CD27 antibody (e.g., Varlilumab, also known as CDX-1127). The stimulators of innate immune cells include, but are not limited to, a KIR monoclonal antibody (e.g., lirilumab), an inhibitor of a cytotoxicity-inhibiting receptor (e.g., NKG2A, also known as KLRC and as CD94, such as the monoclonal antibody monalizumab, and anti-CD96, also known as TACTILE), and a toll like receptor (TLR) agonist. The TLR agonist may be BCG, a TLR7 agonist (e.g., poly0ICLC, and imiquimod), a TLR8 agonist (e.g., resiquimod), or a TLR9 agonist (e.g., CPG 7909). The activators of innate immune cells, such as natural killer (NK) cells, macrophages, and dendritic cells, include IDO inhibitors, TGFβ inhibitor, IL-10 inhibitor. An exemplary activator of innate immunity is Indoximod. In some aspects, the immunotherapy is a stimulator of interferon genes (STING) agonist (Corrales et al., 2015).

Other immunotherapies contemplated for use in methods of the present disclosure include those described by Tchekmedyian et al., 2015, incorporated herein by reference. The immunotherapy may comprise suppression of T regulatory cells (Tregs), myeloid derived suppressor cells (MDSCs) and cancer associated fibroblasts (CAFs). In some embodiments, the immunotherapy is a tumor vaccine (e.g., whole tumor cell vaccines, dendritic cell vaccines, DNA and/or RNA expression vaccines, peptides, and recombinant tumor associated antigen vaccines), or adoptive cellular therapies (ACT) (e.g., T cells, natural killer cells, TILs, and LAK cells). The T cells and/or natural killer cells may be engineered with chimeric antigen receptors (CARs) or T cell receptors (TCRs) to specific tumor antigens. As used herein, a chimeric antigen receptor (or CAR) may refer to any engineered receptor specific for an antigen of interest that, when expressed in a T cell or natural killer cell, confers the specificity of the CAR onto the T cell or natural killer cell. Once created using standard molecular techniques, a T cell or natural killer cell expressing a chimeric antigen receptor may be introduced into a patient, as with a technique such as adoptive cell transfer. In some aspects, the T cells are activated CD4 and/or CD8 T cells in the individual which are characterized by γ-IFN+ producing CD4 and/or CD8 T cells and/or enhanced cytolytic activity relative to prior to the administration of the combination. The CD4 and/or CD8 T cells may exhibit increased release of cytokines selected from the group consisting of IFN-γ, TNF-α and interleukins. The CD4 and/or CD8 T cells can be effector memory T cells. In certain embodiments, the CD4 and/or CD8 effector memory T cells are characterized by having the expression of $CD44^{high}$ $CD62^{low}$.

In certain aspects, two or more immunotherapies may be combined with the p53, ADP, and/or MDA-7 gene therapy and CD122/CD132 agonists including additional immune checkpoint inhibitors in combination with agonists of T-cell costimulatory receptors, or in combination with TIL ACT. Other combinations include T-cell checkpoint blockade plus costimulatory receptor agonists, T-cell checkpoint blockade to improve innate immune cell function, checkpoint blockade plus IDO inhibition, or checkpoint blockade plus adoptive T-cell transfer. In certain aspects, immunotherapy includes a combination of an anti-PD-L1 immune checkpoint inhibitor (e.g., Avelumab), a 4-1BB (CD-137) agonist (e.g. Utomilumab), and an OX40 (TNFRS4) agonist. The immunotherapy may be combined with histone deacetylase (HDAC) inhibitors such as 5-azacytidine and entinostat.

The immunotherapy may be a cancer vaccine comprising one or more cancer antigens, in particular a protein or an immunogenic fragment thereof, DNA or RNA encoding said cancer antigen, in particular a protein or an immunogenic fragment thereof, cancer cell lysates, and/or protein preparations from tumor cells. As used herein, a cancer antigen is an antigenic substance present in cancer cells. In principle, any protein produced in a cancer cell that is upregulated in cancer cells compared to normal cells or has an abnormal structure due to mutation can act as a cancer antigen. In principle, cancer antigens can be products of mutated or overexpressed oncogenes and tumor suppressor genes, products of other mutated genes, overexpressed or aberrantly expressed cellular proteins, cancer antigens produced by oncogenic viruses, oncofetal antigens, altered cell surface glycolipids and glycoproteins, or cell type-specific differentiation antigens. Examples of cancer antigens include the abnormal or overexpressed products of ras and p53 genes. Other examples include tissue differentiation antigens, mutant protein antigens, oncogenic viral antigens, cancer-testis antigens and vascular or stromal specific antigens. Tissue differentiation antigens are those that are specific to a certain type of tissue. Mutant protein antigens are likely to be much more specific to cancer cells because normal cells shouldn't contain these proteins. Normal cells will display the normal protein antigen on their MHC molecules, whereas cancer cells will display the mutant version. Some viral proteins are implicated in forming cancer, and some viral antigens are also cancer antigens. Cancer-testis antigens are antigens expressed primarily in the germ cells of the testes, but also in fetal ovaries and the trophoblast. Some cancer cells aberrantly express these proteins and therefore present these antigens, allowing attack by T-cells specific to these antigens. Exemplary antigens of this type are CTAG1 B and MAGEA1 as well as Rindopepimut, a 14-mer intradermal injectable peptide vaccine targeted against epidermal growth factor receptor (EGFR) vlll variant. Rindopepimut is particularly suitable for treating glioblastoma when used in combination with an inhibitor of the CD95/CD95L signaling system as described herein. Also, proteins that are normally produced in very low quantities, but whose production is dramatically increased in cancer cells, may trigger an immune response. An example of such a protein is the enzyme tyrosinase, which is required for melanin production. Normally tyrosinase is produced in minute quantities but its levels are very much elevated in melanoma cells. Oncofetal antigens are another important class of cancer antigens. Examples are alphafetoprotein (AFP) and carcinoembryonic antigen (CEA). These proteins are normally produced in the early stages of embryonic development and disappear by the time the immune system is fully developed. Thus self-tolerance does not develop against these antigens. Abnormal proteins are also produced by cells infected with oncoviruses, e.g. EBV and HPV. Cells infected by these viruses contain latent viral DNA which is transcribed and the resulting protein produces an immune response. A cancer vaccine may include a peptide cancer vaccine, which in some embodiments is a personalized peptide vaccine. In some embodiments. the peptide cancer vaccine is a multivalent long peptide vaccine, a multi-peptide vaccine, a peptide cocktail vaccine, a hybrid peptide vaccine, or a peptide-pulsed dendritic cell vaccine The immunotherapy may be an antibody, such as part of a polyclonal antibody preparation, or may be a monoclonal antibody. The antibody may be a humanized antibody, a chimeric antibody, an antibody fragment, a bispecific antibody or a single chain antibody. An antibody as disclosed herein includes an antibody fragment, such as, but not limited to, Fab, Fab' and F(ab')2, Fd, single-chain Fvs (scFv), single-chain antibodies, disulfide-linked Fvs (sdfv) and fragments including either a VL or VH domain. In some aspects, the antibody or fragment thereof specifically binds epidermal growth factor receptor (EGFR1, Erb-B1), HER2/neu (Erb-B2), CD20, Vascular endothelial growth factor (VEGF), insulin-like growth factor receptor (IGF-1R), TRAIL-receptor, epithelial cell adhesion molecule, carcinoembryonic antigen, Prostate-specific membrane antigen, Mucin-1, CD30, CD33, or CD40.

Examples of monoclonal antibodies that may be used in combination with the compositions provided herein include, without limitation, trastuzumab (anti-HER2/neu antibody); Pertuzumab (anti-HER2 mAb); cetuximab (chimeric monoclonal antibody to epidermal growth factor receptor EGFR); panitumumab (anti-EGFR antibody); nimotuzumab (anti-EGFR antibody); Zalutumumab (anti-EGFR mAb); Necitumumab (anti-EGFR mAb); MDX-210 (humanized anti-HER-2 bispecific antibody); MDX-210 (humanized anti-HER-2 bispecific antibody); MDX-447 (humanized anti-EGF receptor bispecific antibody); Rituximab (chimeric murine/human anti-CD20 mAb); Obinutuzumab (anti-CD20 mAb); Ofatumumab (anti-CD20 mAb); Tositumumab-I131 (anti-CD20 mAb); Ibritumomab tiuxetan (anti-CD20 mAb); Bevacizumab (anti-VEGF mAb); Ramucirumab (anti-VEGFR2 mAb); Ranibizumab (anti-VEGF mAb); Aflibercept (extracellular domains of VEGFR1 and VEGFR2 fused to IgG1 Fc); AMG386 (angiopoietin-1 and -2 binding peptide fused to IgG1 Fc); Dalotuzumab (anti-IGF-1R mAb); Gemtuzumab ozogamicin (anti-CD33 mAb); Alemtuzumab (anti-Campath-1/CD52 mAb); Brentuximab vedotin (anti-CD30 mAb); Catumaxomab (bispecific mAb that targets epithelial cell adhesion molecule and CD3); Naptumomab (anti-5T4 mAb); Girentuximab (anti-Carbonic anhydrase ix); or Farletuzumab (anti-folate receptor). Other examples include antibodies such as Panorex™ (17-1A) (murine monoclonal antibody); Panorex (@ (17-1A) (chimeric murine monoclonal antibody); BEC2 (ami-idiotypic mAb, mimics the GD epitope) (with BCG); Oncolym (Lym-1 monoclonal antibody); SMART M195 Ab, humanized 13' 1 LYM-1 (Oncolym), Ovarex (B43.13, anti-idiotypic mouse mAb); 3622W94 mAb that binds to EGP40 (17-1A) pancarcinoma antigen on adenocarcinomas; Zenapax (SMART Anti-Tac (IL-2 receptor); SMART M195 Ab, humanized Ab, humanized); NovoMAb-G2 (pancarcinoma specific Ab); TNT (chimeric mAb to histone antigens); TNT (chimeric mAb to histone antigens); Gliomab-H (Monoclonals-Humanized Abs); GNI-250 Mab; EMD-72000 (chimeric-EGF antagonist); LymphoCide (humanized IL.L.2 antibody); and MDX-260 bispecific, targets GD-2, ANA Ab, SMART IDIO Ab, SMART ABL 364 Ab or ImmuRAIT-CEA. Examples of antibodies include those disclosed in U.S. Pat. Nos. 5,736, 167, 7,060,808, and 5,821,337.

Further examples of antibodies include Zanulimumab (anti-CD4 mAb), Keliximab (anti-CD4 mAb); Ipilimumab (MDX-101; anti-CTLA-4 mAb); Tremilimumab (anti-CTLA-4 mAb); (Daclizumab (anti-CD25/IL-2R mAb); Basiliximab (anti-CD25/IL-2R mAb); MDX-1106 (anti-PD1 mAb); antibody to GITR; GC1008 (anti-TGF-β antibody); metelimumab/CAT-192 (anti-TGF-β antibody); lerdelimumab/CAT-152 (anti-TGF-β antibody); ID11 (anti-TGF-β antibody); Denosumab (anti-RANKL mAb); BMS-663513 (humanized anti-4-1BB mAb); SGN-40 (humanized anti-CD40 mAb); CP870,893 (human anti-CD40 mAb); Infliximab (chimeric anti-TNF mAb; Adalimumab (human anti-TNF mAb); Certolizumab (humanized Fab anti-TNF); Golimumab (anti-TNF); Etanercept (Extracellular domain of TNFR fused to IgG1 Fc); Belatacept (Extracellular domain of CTLA-4 fused to Fc); Abatacept (Extracellular domain of CTLA-4 fused to Fc); Belimumab (anti-B Lymphocyte stimulator); Muromonab-CD3 (anti-CD3 mAb); Otelixizumab (anti-CD3 mAb); Teplizumab (anti-CD3 mAb); Tocilizumab (anti-IL6R mAb); REGN88 (anti-IL6R mAb); Ustekinumab (anti-IL-12/23 mAb); Briakinumab (anti-IL-12/23 mAb); Natalizumab (anti-α4 integrin); Vedolizumab (anti-α4 β7 integrin mAb); T1 h (anti-CD6 mAb); Epratuzumab (anti-CD22 mAb); Efalizumab (anti-CD11a mAb); and Atacicept (extracellular domain of transmembrane activator and calcium-modulating ligand interactor fused with Fc).

a. Passive Immunotherapy

A number of different approaches for passive immunotherapy of cancer exist. They may be broadly categorized into the following: injection of antibodies alone; injection of antibodies coupled to toxins or chemotherapeutic agents; injection of antibodies coupled to radioactive isotopes; injection of anti-idiotype antibodies; and finally, purging of tumor cells in bone marrow.

Preferably, human monoclonal antibodies are employed in passive immunotherapy, as they produce few or no side effects in the patient. Human monoclonal antibodies to ganglioside antigens have been administered intralesionally to patients suffering from cutaneous recurrent melanoma (Irie & Morton, 1986). Regression was observed in six out of ten patients, following, daily or weekly, intralesional injections. In another study, moderate success was achieved from intralesional injections of two human monoclonal antibodies (Irie et al., 1989).

It may be favorable to administer more than one monoclonal antibody directed against two different antigens or even antibodies with multiple antigen specificity. Treatment protocols also may include administration of lymphokines or other immune enhancers as described by Bajorin et al. (1988). The development of human monoclonal antibodies is described in further detail elsewhere in the specification.

b. Active Immunotherapy

In active immunotherapy, an antigenic peptide, polypeptide or protein, or an autologous or allogenic tumor cell composition or "vaccine" is administered, generally with a distinct bacterial adjuvant (Ravindranath & Morton, 1991; Morton & Ravindranath, 1996; Morton et al., 1992; Mitchell et al., 1990; Mitchell et al., 1993). In melanoma immunotherapy, those patients who elicit high IgM response often survive better than those who elicit no or low IgM antibodies (Morton et al., 1992). IgM antibodies are often transient antibodies and the exception to the rule appears to be anti-ganglioside or anticarbohydrate antibodies.

c. Adoptive Immunotherapy

In adoptive immunotherapy, the patient's circulating lymphocytes, or tumor infiltrated lymphocytes, are isolated in vitro, activated by lymphokines such as IL-2 or transduced with genes for tumor necrosis, and readministered (Rosenberg et al., 1988; 1989). To achieve this, one would administer to an animal, or human patient, an immunologically effective amount of activated lymphocytes in combination with an adjuvant-incorporated antigenic peptide composition as described herein. The activated lymphocytes will most preferably be the patient's own cells that were earlier isolated from a blood or tumor sample and activated (or "expanded") in vitro. This form of immunotherapy has produced several cases of regression of melanoma and renal carcinoma, but the percentage of responders were few compared to those who did not respond. More recently, higher response rates have been observed when such adoptive immune cellular therapies have incorporated genetically engineered T cells that express chimeric antigen receptors (CAR) termed CAR T cell therapy. Similarly, natural killer cells both autologous and allogenic have been isolated, expanded and genetically modified to express receptors or ligands to facilitate their binding and killing of tumor cells.

4. Other Agents

It is contemplated that other agents may be used in combination with the compositions provided herein to improve the therapeutic efficacy of treatment. These additional agents include immunomodulatory agents, agents that affect the upregulation of cell surface receptors and GAP junctions, cytostatic and differentiation agents, inhibitors of cell adhesion, or agents that increase the sensitivity of the hyperproliferative cells to apoptotic inducers. Immunomodulatory agents include tumor necrosis factor; interferon alpha, beta, and gamma; IL-2 and other cytokines; or MIP-1, MIP-1beta, MCP-1, RANTES, and other chemokines. It is further contemplated that the upregulation of cell surface receptors or their ligands such as Fas/Fas ligand, DR4 or DR5/TRAIL would potentiate the apoptotic inducing abilities of the compositions provided herein by establishment of an autocrine or paracrine effect on hyperproliferative cells. Increases intercellular signaling by elevating the number of GAP junctions would increase the anti-hyperproliferative effects on the neighboring hyperproliferative cell population. In other embodiments, cytostatic or differentiation agents can be used in combination with the compositions provided herein to improve the anti-hyerproliferative efficacy of the treatments. Inhibitors of cell adhesion are contemplated to improve the efficacy of the present invention. Examples of cell adhesion inhibitors are focal adhesion kinase (FAKs) inhibitors and Lovastatin. It is further contemplated that other agents that increase the sensitivity of a hyperproliferative cell to apoptosis, such as the antibody c225, could be used in combination with the compositions provided herein to improve the treatment efficacy.

In further embodiments, the other agents may be one or more oncolytic viruses. These oncolytic viruses may be engineered to express p53 and/or IL24 and/or to express a gene other than p53 and/or IL24, such as a cytokine, ADP, or a heat shock protein. Examples of oncolytic viruses include single or double stranded DNA viruses, RNA viruses, adenoviruses, adeno-associated viruses, retroviruses, lentiviruses, herpes viruses, pox viruses, vaccinia viruses, vesicular stomatitis viruses, polio viruses, Newcastle's Disease viruses, Epstein-Barr viruses, influenza viruses and reoviruses, myxoma viruses, maraba viruses, rhabdoviruses, enadenotucirev or coxsackie viruses. In a particular embodiment, the other agent is talimogene laherparepvec (T-VEC) which is an oncolytic herpes simplex virus genetically engineered to express GM-CSF. Talimogene laherparepvec, HSV-1 [strain JS1] ICP34.5-/ICP47-/hGM-CSF, (previously known as OncoVEX$^{GM\ CSF}$), is an intratumorally delivered oncolytic immunotherapy comprising an immune-enhanced HSV-1 that selectively replicates in solid tumors. (Lui et al., *Gene Therapy*, 10:292-303, 2003; U.S. Pat. Nos. 7,223,593 and 7,537,924; incorporated herein by reference). In October 2015, the US FDA approved T-VEC, under the brand name IMLYGIC™, for the treatment of melanoma in patients with inoperable tumors. The characteristics and methods of administration of T-VEC are described in, for example, the IMLYGIC™ package insert (Amgen, 2015) and U.S. Patent Publication No. US2015/0202290; both incorporated herein by reference. For example, talimogene laherparepvec is typically administered by intratumoral injection into injectable cutaneous, subcutaneous, and nodal tumors at a dose of up to 4.0 ml of $10^6$ plaque forming unit/mL (PFU/mL) at day 1 of week 1 followed by a dose of up to 4.0 ml of $10^8$ PFU/mL at day 1 of week 4, and every 2 weeks (±3 days) thereafter. The recommended volume of talimogene laherparepvec to be injected into the tumor(s) is dependent on the size of the tumor(s) and should be determined according to the injection volume guideline. While T-VEC has demonstrated clinical activity in melanoma patients, many cancer patients either do not respond or cease responding to T-VEC treatment. In one embodiment, the p53, ADP, and/or MDA-7 nucleic acids and the at least one CD122/CD132 agonist may be administered after, during or before T-VEC therapy, such as to reverse treatment resistance. Exemplary oncolytic viruses include, but are not limited to, Ad5-yCD/mutTKSR39rep-hIL12, Cavatak™, CG0070, DNX-2401, G207, HF10, IMLYGIC™ JX-594, MG1-MA3, MV-NIS, OBP-301, Reolysin®, Toca 511, Oncorine (H101), Onyx-015, H102, H103, and RIGVIR. Other exemplary oncolytic viruses are described, for example, in International Patent Publication Nos. WO2015/027163, WO2014/138314, WO2014/047350, and WO2016/009017; all incorporated herein by reference.

In certain embodiments, hormonal therapy may also be used in conjunction with the present embodiments or in combination with any other cancer therapy previously described. The use of hormones may be employed in the treatment of certain cancers such as breast, prostate, ovarian, or cervical cancer to lower the level or block the effects of certain hormones such as testosterone or estrogen. This treatment is often used in combination with at least one other cancer therapy as a treatment option or to reduce the risk of metastases In some aspects, the additional anti-cancer agent is a protein kinase inhibitor or a monoclonal antibody that inhibits receptors involved in protein kinase or growth factor signaling pathways such as an EGFR, VEGFR, AKT, Erb1, Erb2, ErbB, Syk, Bcr-Abl, JAK, Src, GSK-3, PI3K, Ras, Raf, MAPK, MAPKK, mTOR, c-Kit, eph receptor or BRAF inhibitors. Nonlimiting examples of protein kinase or growth factor signaling pathways inhibitors include Afatinib, Axitinib, Bevacizumab, Bosutinib, Cetuximab, Crizotinib, Dasatinib, Erlotinib, Fostamatinib, Gefitinib, Imatinib, Lapatinib, Lenvatinib, Mubritinib, Nilotinib, Panitumumab, Pazopanib, Pegaptanib, Ranibizumab, Ruxolitinib, Saracatinib, Sorafenib, Sunitinib, Trastuzumab, Vandetanib, AP23451, Vemurafenib, MK-2206, GSK690693, A-443654, VQD-002, Miltefosine, Perifosine, CAL101, PX-866, LY294002, rapamycin, temsirolimus, everolimus, ridaforolimus, Alvocidib, Genistein, Selumetinib, AZD-6244, Vatalanib, P1446A-05, AG-024322, ZD1839, P276-00, GW572016 or a mixture thereof.

In some aspects, the PI3K inhibitor is selected from the group of PI3K inhibitors consisting of buparlisib, idelalisib, BYL-719, dactolisib, PF-05212384, pictilisib, copanlisib, copanlisib dihydrochloride, ZSTK-474, GSK-2636771, duvelisib, GS-9820, PF-04691502, SAR-245408, SAR-245409, sonolisib, Archexin, GDC-0032, GDC-0980, apitolisib, pilaralisib, DLBS 1425, PX-866, voxtalisib, AZD-8186, BGT-226, DS-7423, GDC-0084, GSK-21 26458, INK-1 1 17, SAR-260301, SF-1 126, AMG-319, BAY-1082439, CH-5132799, GSK-2269557, P-71 70, PWT-33597, CAL-263, RG-7603, LY-3023414, RP-5264, RV-1729, taselisib, TGR-1 202, GSK-418, INCB-040093, Panulisib, GSK-105961 5, CNX-1351, AMG-51 1, PQR-309, 17beta-Hydroxywortmannin, AEZS-129, AEZS-136, HM-5016699, IPI-443, ONC-201, PF-4989216, RP-6503, SF-2626, X-339, XL-499, PQR-401, AEZS-132, CZC-24832, KAR-4141, PQR-31 1, PQR-316, RP-5090, VS-5584, X-480, AEZS-126, AS-604850, BAG-956, CAL-130, CZC-24758, ETP-46321, ETP-471 87, GNE-317, GS-548202, HM-032, KAR-1 139, LY-294002, PF-04979064, PI-620, PKI-402, PWT-143, RP-6530, 3-HOI-BA-01, AEZS-134, AS-041 164, AS-252424, AS-605240, AS-605858, AS-606839, BCCA-621 C, CAY-10505, CH-5033855, CH-51 08134, CUDC-908, CZC-1 9945, D-106669, D-87503, DPT-NX7, ETP-46444, ETP-46992, GE-21, GNE-123, GNE-151, GNE-293, GNE-380, GNE-390, GNE-477, GNE-490, GNE-493, GNE-614, HMPL-51 8, HS-104, HS-1 06, HS-1 16, HS-173, HS-196, IC-486068, INK-055, KAR 1 141, KY-1 2420, Wortmannin, Lin-05, NPT-520-34, PF-04691503, PF-06465603, PGNX-01, PGNX-02, PI 620, PI-103, PI-509, PI-516, PI-540, PIK-75, PWT-458, RO-2492, RP-5152, RP-5237, SB-201 5, SB-2312, SB-2343, SHBM-1009, SN 32976, SR-13179, SRX-2523, SRX-2558, SRX-2626, SRX-3636, SRX-5000, TGR-5237, TGX-221, UCB-5857, WAY-266175, WAY-266176, EI-201, AEZS-131, AQX-MN100, KCC-TGX, OXY-1 1 1 A, PI-708, PX-2000, and WJD-008.

It is contemplated that the additional cancer therapy can comprise an antibody, peptide, polypeptide, small molecule inhibitor, siRNA, miRNA or gene therapy which targets, for example, epidermal growth factor receptor (EGFR, EGFR1, ErbB-1, HER1), ErbB-2 (HER2/neu), ErbB-3/HER3, ErbB-4/HER4, EGFR ligand family; insulin-like growth factor receptor (IGFR) family, IGF-binding proteins (IGFBPs), IGFR ligand family (IGF-1R); platelet derived growth factor receptor (PDGFR) family, PDGFR ligand family; fibroblast growth factor receptor (FGFR) family, FGFR ligand family, vascular endothelial growth factor receptor (VEGFR) family, VEGF family; HGF receptor family: TRK receptor family; ephrin (EPH) receptor family; AXL receptor family; leukocyte tyrosine kinase (LTK) receptor family; TIE receptor family, angiopoietin 1, 2; receptor tyrosine kinase-like orphan receptor (ROR) receptor family; discoidin domain receptor (DDR) family; RET receptor family; KLG receptor family; RYK receptor family; MuSK receptor family; Transforming growth factor alpha (TGF-α), TGF-α receptor; Transforming growth factor-beta (TGF-0), TGF-0 receptor; Interleukin 13 receptor alpha2 chain (1L13Ralpha2), Interleukin-6 (IL-6), 1L-6 receptor, Interleukin-4, IL-4 receptor, Cytokine receptors, Class I (hematopoietin family) and Class II (interferon/1L-10 family) receptors, tumor necrosis factor (TNF) family, TNF-α, tumor necrosis factor (TNF) receptor superfamily (TNTRSF), death receptor family, TRAIL-receptor; cancer-testis (CT) antigens, lineage-specific antigens, differentiation antigens, alpha-actinin-4, ARTC1, breakpoint cluster region-Abelson (Bcr-abl) fusion products, B-RAF, caspase-5 (CASP-5), caspase-8 (CASP- 8), beta-catenin (CTNNB1), cell division cycle 27 (CDC27), cyclin-dependent kinase 4 (CDK4), CDKN2A, COA-1, dek-can fusion protein, EFTUD-2, Elongation factor 2 (ELF2), Ets variant gene 6/acute myeloid leukemia 1 gene ETS (ETC6-AML1) fusion protein, fibronectin (FN), GPNMB, low density lipid receptor/GDP-L fucose: beta-Dgalactose 2-alpha-Lfucosyltraosferase (LDLR/FUT) fusion protein, HLA-A2, arginine to isoleucine exchange at residue 170 of the alpha-helix of the alpha2-domain in the HLA-A2 gene (HLA-A*201-R170I), MLA-A11, heat shock protein 70-2 mutated (HSP70-2M), KIAA0205, MART2, melanoma ubiquitous mutated 1, 2, 3 (MUM-1, 2, 3), prostatic acid phosphatase (PAP), neo-PAP, Myosin class 1, NFYC, OGT, OS-9, pm1-RARalpha fusion protein, PRDX5, PTPRK, K-ras (KRAS2), N-ras (NRAS), HRAS, RBAF600, SIRT2, SNRPD1, SYT-SSX1 or -SSX2 fusion protein, Triosephosphate Isomerase, BAGE, BAGE-1, BAGE-2,3,4,5, GAGE-1,2,3,4,5,6,7,8, GnT-V (aberrant N-acetyl giucosaminyl transferase V, MGAT5), HERV-K-MEL, KK-LC, KM-HN-1, LAGE, LAGE-1, CTL-recognixed antigen on melanoma (CAMEL), MAGE-A1 (MAGE-1), MAGE-A2, MAGE-A3, MAGE-A4, MAGE-AS, MAGE-A6, MAGE-A8, MAGE-A9, MAGE-A10, MAGE-A11, MAGE-A12, MAGE-3, MAGE-B1, MAGE-B2, MAGE-B5, MAGE-B6, MAGE-C1, MAGE-C2, mucin 1 (MUC1), MART-1/Melan-A (MLANA), gp100, gp100/Pme117 (S1LV), tyrosinase (TYR), TRP-1, HAGE, NA-88, NY-ESO-1, NY-ESO-1/LAGE-2, SAGE, Sp17, SSX-1,2,3,4, TRP2-1NT2, carcinoembryonic antigen (CEA), Kallikfein 4, mammaglobm-A, OA1, prostate specific antigen (PSA), prostate specific membrane antigen, TRP-1/gp75, TRP-2, adipophilin, interferon inducible protein absent in nielanoma 2 (AIM-2), BING-4, CPSF, cyclin D1, epithelial cell adhesion molecule (Ep-CAM), EpbA3, fibroblast growth factor-5 (FGF-5), glycoprotein 250 (gp250 intestinal carboxyl esterase (iCE), alpha-feto protein (AFP), M-CSF, mdm-2 (e.g., small molecule inhibitor of HDM2, also known as MDM2, and/or HDM4, such as to reverse its inhibition of p53 activity, such as HDM201, cis-imidazolines (e.g., Nutlins), benzodiazepines (BDPs), spiro-oxindoles), MUCI, p53 (TP53), PBF, FRAME, PSMA, RAGE-1, RNF43, RU2AS, SOX10, STEAP1, survivin (BIRCS), human telomerase reverse transcriptase (hTERT), telomerase, Wilms' tumor gene (WT1), SYCP1, BRDT, SPANX, XAGE, ADAM2, PAGE-5, LIP1, CTAGE-1, CSAGE, MMA1, CAGE, BORIS, HOM-TES-85, AF15q14, HCA66I, LDHC, MORC, SGY-1, SPO11, TPX1, NY-SAR-35, FTHLI7, NXF2 TDRD1, TEX 15, FATE, TPTE, immunoglobulin idiotypes, Bence-Jones protein, estrogen receptors (ER), androgen receptors (AR), CD40, CD30, CD20, CD19, CD33, CD4, CD25, CD3, cancer antigen 72-4 (CA 72-4), cancer antigen 15-3 (CA 15-3), cancer antigen 27-29 (CA 27-29), cancer antigen 125 (CA 125), cancer antigen 19-9 (CA 19-9), beta-human chorionic gonadotropin, 1-2 microglobulin, squamous cell carcinoma antigen, neuron-specific enoJase, heat shock protein gp96, GM2, sargramostim, CTLA-4, 707 alanine proline (707-AP), adenocarcinoma antigen recognized by T cells 4 (ART-4), carcinoembryogenic antigen peptide-1 (CAP-1), calcium-activated chloride channel-2 (CLCA2), cyclophilin B (Cyp-B), human signet ring tumor-2 (HST-2), Human papilloma virus (HPV) proteins (HPV-E6, HPV-E7, major or minor capsid antigens, others), Epstein-Barr vims (EBV) proteins (EBV latent membrane proteins-LMP1, LMP2; others), Hepatitis B or C virus proteins, and HIV proteins.

IX. Articles of Manufacture or Kits

An article of manufacture or a kit is provided comprising at least one CD122/CD132 agonist (e.g., IL-2/anti-IL-2 immune complex, IL-15/anti-IL-15 immune complex, an IL-15/IL-15 Receptor α-IgG1-Fc (IL-15/IL-15Rα-IgG1-Fc) immunocomplex, PEGylated IL-2, PEGylated IL-15, IL-2 muteins and/or IL-15 muteins) and a nucleic acid encoding p53, ADP, and/or a nucleic acid encoding MDA-7 (e.g. ad-p53 and/or ad-MDA-7) is also provided herein. The article of manufacture or kit can further comprise a package insert comprising instructions for using the at least one CD122/CD132 agonist in conjunction with a tumor suppressor gene therapy to treat or delay progression of cancer in an individual or to enhance immune function of an individual having cancer. Any of the CD122/CD132 agonists and nucleic acid encoding p53, ADP, and/or a nucleic acid encoding MDA-7, described herein may be included in the article of manufacture or kits. The kit may additionally comprise an extracellular matrix degrading protein or expression construct encoding the extracellular matrix degrading protein.

In some embodiments, the at least one preferential CD122/CD132 agonist (e.g., IL-2/anti-IL-2 immune complex, IL-15/anti-IL-15 immune complex, an IL-15/IL-15 Receptor α-IgG1-Fc (IL-15/IL-15Rα-IgG1-Fc) immunocomplex, PEGylated IL-2, PEGylated IL-15, IL-2 muteins and/or IL-15 muteins) and a nucleic acid encoding p53, ADP, and/or a nucleic acid encoding MDA-7 are in the same container or separate containers. Suitable containers include, for example, bottles, vials, bags and syringes. The container may be formed from a variety of materials such as glass, plastic (such as polyvinyl chloride or polyolefin), or metal alloy (such as stainless steel or hastelloy). In some embodiments, the container holds the formulation and the label on, or associated with, the container may indicate directions for use. The article of manufacture or kit may further include other materials desirable from a commercial and user standpoint, including other buffers, diluents, filters, needles, syringes, and package inserts with instructions for use. In some embodiments, the article of manufacture further includes one or more of another agent (e.g., a chemotherapeutic agent, and anti-neoplastic agent). Suitable containers for the one or more agent include, for example, bottles, vials, bags and syringes.

X. EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1—Ad-p53 and Ad-IL24 Tumor Suppressor and Oncolytic Virus (VirRx007) Immune Gene Therapy in Combination with Preferential CD122/132 Agonist(s) and Immune Checkpoint Inhibitors for Enhancement of Local and Systemic Efficacy and Reversal of Resistance to Prior Immunotherapy The efficacy of combining CD122/CD132 agonists with tumor suppressor and viral oncolytic immune gene therapy to enhance local and systemic anti-tumor effects including tumors resistant to prior immunotherapy is demonstrated in immunocompetent animal tumor models. The following treatment methods, doses, and schedules were utilized:

Animals, tumor inoculation and measurements: Pathogen-free C57BL/6 (B6) male mice (6-8 weeks of age obtained from Charles River Labs) were utilized. Animals were injected into the right flank, subcutaneously, with B16F10 melanoma cells (ATCC, $5 \times 10^5$ cells/mouse, suspended in serum free media) to form the "Primary Tumor". Treatment was initiated when tumors had reached approximately 50 mm$^3$ in size and this is termed treatment Day 1. Tumor growth is monitored by measuring the length (L) and width (w) of the tumor, and tumor volume calculated using the following formula: volume=0.523 L(w)$^2$. Animals are monitored for up to 40 days and sacrificed when tumors reached approximately 2000 mm$^3$.

Viral vectors: Replication-deficient human type 5 adenovirus (Ad5) encoding for expression of either the p53 or IL24 tumor suppressor genes and a replication competent oncolytic adenovirus that was engineered to overexpress ADP (VirRx007) were used for these experiments. The construction, properties and purification of the vectors have been reported elsewhere for Ad5/CMV p53, IL24 and VirRx007 vectors (Zhang 1994; Mhashilkar et al., 2001; U.S. Pat. No. 7,589,069 B1). Three to four doses of the viral vectors are administered intra-tumorally. For Ad-p53 and/or ADP (VRX-007), the viral vector was administered on Days 2, 5 and 8. For Ad-IL24, the vector was administered on Days 3, 5, 7, and 9 (at 48 hour intervals). An additional intra-tumoral viral injection was administered on Day 21 in the groups evaluating virus treatment in combination with CD122/CD132 agonist and immune checkpoint inhibitors. Each viral dose contained $5 \times 10^9$ viral particles in a volume of 50 µl.

CD122/CD132 agonist treatment: For B16F10 models, murine IL-2 (eBioscience or R&D Systems Minneapolis, MN) was mixed with the S4B6-1 anti-mouse IL2 antibody (Bioxcell, West Lebanon, NH or BD Biosciences) at a molar ratio 2:1 to generate the preferential CD122/CD132 agonist immunocomplex. For studies involving human T cells, human IL-2 was mixed with MAB602 anti-human IL-2 antibody (R&D Systems). The IL-2/S4B6 or IL-2/MAB602 mAb immunocomplexes were administered intraperitoneally (IP) at 2.5 µg IL2/dose on days 2, 6, and 10. Alternatively, IL-2/S4B6 mAb immunocomplexes were injected on days 2-6 (1.0 µg IL2/dose). Immunocomplexes are prepared by incubating anti-IL-2 monoclonal with IL-2 for 15 minutes at room temperature.

In some murine experiments, the CD122/CD132 agonist was comprised of recombinant mouse IL-15 (eBiosciences) and IL-15-R alpha-Fc (R&D Systems). The immunocomplex was prepared by incubated these together at 37 C for 30 minutes, and this preferential CD122/CD132 agonist immunocomplex was injected i.v. for two consecutive days once tumors become palpable. An alternate schedule is administration of the IL-15 immune complex injected IP on days 3, 5 and 7 after tumors become palpable. For IL-15 immunocomplex studies, recombinant murine IL-15 (Peprotech, Rocky Hill, CT, USA) is used in the in vivo studies at doses of 2 µg/injection recombinant murine IL-15 once per week by intravenous injection. Recombinant mouse IL-15 R alpha Fc Chimera Protein is obtained from R&D Systems (Minneapolis, MN) and used at doses equimolar to IL-15 cytokine (12 µg/injection of IL-15-Ra-Fc for each 2 ug IL-15 protein in immune complex).

Immune Checkpoint Inhibitors: To mimic the common clinical condition of tumor progression during immune checkpoint inhibitor therapy, anti-PD1 treatment, at a dose of 200 µg/mouse, was begun intraperitoneally on Day 1 and administered every 3 days up to day 30. In some experiments, to evaluate the effects of tumor suppressor and oncolytic viral VirRx007 therapy in combination with preferential CD122/132 agonist(s) and immune checkpoint inhibitors in tumors resistant to prior immunotherapy, tumor suppressor treatment was initiated after tumor progression on anti-PD-1 therapy with the first tumor suppressor therapy dose being given 1 to 2 days after the initiation of anti-PD-1 treatment. The B16F10 and B16 melanoma models are known to be highly resistant to immunotherapy. In these models, tumors progress on immune checkpoint inhibitor and preferential CD122/132 treatment therapy similarly to control treatment with Phosphate Buffered Saline (PBS). The anti-mouse PD-1 antibody (CD279) specifically produced for use in vivo was purchased from BioXcell (catalog #BE0146).

Reversal of Resistance to Prior Immunotherapy: The ability of tumor suppressor or viral oncolytic therapy combined with preferential CD122/CD132 agonist and immune checkpoint inhibitor treatment to reverse resistance to prior immunotherapy was also demonstrated. To mimic the common clinical condition of tumor progression during immune checkpoint inhibitor therapy, anti-PD1 treatment, at a dose of 10 mg/kg, was begun intraperitoneally on Day 1 and administered every 3 days up to day 30. In some experiments, to evaluate the effects of tumor suppressor or viral oncolytic treatment combined with CD122/CD132 therapy in tumors resistant to prior immunotherapy, the combined treatments were initiated after tumor progression on anti-PD-1 therapy with the first tumor suppressor and CD122/CD132 therapy dose being given 1 to 2 days after the initiation of anti-PD-1 treatment. These studies were performed in the B16F10 and B16 melanoma models, which are known to be highly resistant to immunotherapy. In these models, tumors progress on immune checkpoint inhibitor therapy similarly to control treatment with Phosphate Buffered Saline (PBS). The anti-mouse PD-1 antibody (CD279) specifically produced for use in vivo is purchased from BioXcell (catalog #BE0146) as are antibodies to anti-PD-L1 and the immune modulator anti-LAG-3. Anti-mouse-PD-L1 antibody (clone 9G2; Biolegend) and/or anti-CTLA-4 antibody (clone UC10-4F10-11; Altor) were administered IP at 100 µg per injection twice a week for 2 weeks.

Treatment efficacy and their synergistic interactions were demonstrated by measurement of tumor volumes in primary and contralateral tumors and their statistical analyses by T test, analysis of variance (ANOVA), Kruskal-Wallis ANOVA; and by comparisons of survival using Kaplan-Meier and log rank tests.

Surprisingly, the findings demonstrated the unexpected, substantial synergy of Ad-p53+CD122/132+anti-PD-1 and VirRx007+CD122/132+anti-PD-1 therapies that resulted in potentially curative treatment associated with complete tumor remissions of both primary and contralateral tumors, significantly superior abscopal effects on distant tumors not injected with tumor suppressor therapy. These effects led to exceptionally long overall survival. Statistically significant improvements in reduced tumor growth and increased survival were also observed for Ad-IL24+CD122/132+anti-PD-1 therapy.

Figure 4:
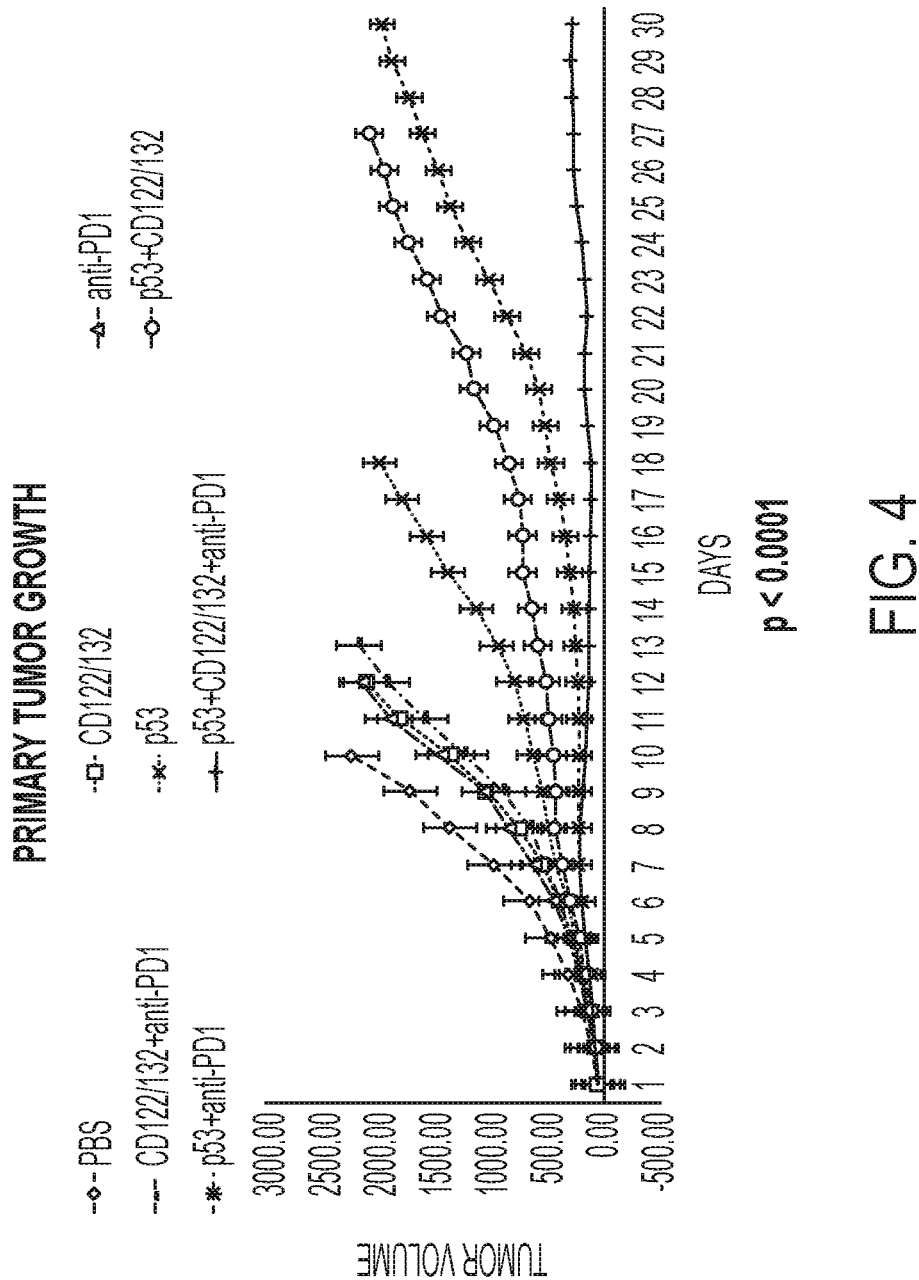
FIG. 4: Ad-p53+CD122/132 agonist+anti-PD-1 Efficacy: Tumor Volume. A graph showing primary tumor volumes over time in rodents receiving either phosphate buffered saline (PBS) control, CD122/132, anti-PD-1, Ad-p53, or the combination of CD122/132+anti-PD-1, Ad-p53+CD122/132, Ad-p53+anti-PD-1, or Ad-p53+CD122/132+anti-PD-1. There were severe tumor progressions during CD122/132, anti-PD-1, and CD122/132+anti-PD-1 therapies, which were reversed by combination with Ad-p53 therapy. The results also show enhanced efficacy of Ad-p53+CD122/132, Ad-p53+anti-PD-1 and Ad-p53+CD122/132+anti-PD-1 treatments compared to any of the therapies. By day 21, the mean tumor volumes for the groups treated with (PBS), CD122/132, anti-PD-1, CD122/132+anti-PD-1, and Ad-p53 had all exceeded 2,000 mm$^3$. In contrast, each of the combined treatments: Ad-p53+CD122/132, Ad-p53+anti-PD-1 and Ad-p53+CD122/132+anti-PD-1, induced large decreases in tumor volume, as compared to any of the non-Ad-p53 therapies or Ad-p53 treatment alone. A statistical analysis of variance (ANOVA) comparison of tumor volumes on Day 21 determined synergy of the anti-tumor effects of Ad-p53+CD122/132, Ad-p53+anti-PD-1 and Ad-p53+CD122/132+anti-PD-1 treatments (p-values <0.0001). However, by Day 30 the mean tumor volumes for the Ad-p53+CD122/132 and Ad-p53+anti-PD-1 treatment groups also exceeded 2,000 mm$^3$. Importantly, a statistical analysis of variance (ANOVA) comparison of tumor volumes on Day 30 determined that the synergy of the anti-tumor effects was only maintained in the Ad-p53+CD122/132+anti-PD-1 treatment combination (p-value <0.0001 overall and p-value <0.0001 separately compared to every other treatment group).

Ad-p53 plus CD122/132 Agonist and Checkpoint inhibitor Immunotherapy: Treatment efficacy of Ad-p53 in combination with CD122/132 agonist and anti-PD-1 treatment was evaluated by assessing tumor volumes (in primary and contralateral tumors), complete tumor response rates and survival. With regards to primary tumor volume, the graphs in FIG. 4 show tumor volumes over time in rodents receiving either phosphate buffered saline (PBS) control, CD122/132, anti-PD-1, CD122/132+anti-PD-1, Ad-p53, or the combination of Ad-p53+CD122/132, Ad-p53+anti-PD-1 and Ad-p53+CD122/132+anti-PD-1. There was severe tumor progression during CD122/132, anti-PD-1, and CD122/132+anti-PD-1 therapies which were reversed by combination with Ad-p53 therapy. There was enhanced efficacy of Ad-p53+CD122/132, Ad-p53+anti-PD-1 and Ad-p53+CD122/132+anti-PD-1 treatments compared to any of the therapies alone. By day 21, the mean tumor volumes for the groups treated with (PBS), CD122/132, anti-PD-1, CD122/132+anti-PD-1, and Ad-p53 had all exceeded 2,000 mm$^3$. In contrast, each of the combined treatments with Ad-p53+CD122/132, Ad-p53+anti-PD-1 and Ad-p53+CD122/132+anti-PD-1 induced large decreases in tumor volume, as compared to any of the non-Ad-p53 therapies or Ad-p53 treatment alone. A statistical analysis of variance (ANOVA) comparison of tumor volumes on Day 21 determined synergy of the anti-tumor effects of Ad-p53+CD122/132, Ad-p53+anti-PD-1 and Ad-p53+CD122/132+anti-PD-1 treatments (p-values <0.0001). However, by Day 30 the mean tumor volumes for the Ad-p53+CD122/132 and Ad-p53+anti-PD-1 treatment groups had also exceeded 2,000 mm$^3$. Importantly, a statistical analysis of variance (ANOVA) comparison of tumor volumes on Day 30 determined that the synergy of the anti-tumor effects was only maintained in the Ad-p53+CD122/132+anti-PD-1 treatment combination (p-value <0.0001 overall and p-value <0.0001 separately compared to every other treatment group).

Ad-p53 Treatment Groups: Evaluation of Complete Tumor Response Rates. It is generally appreciated that complete tumor responses to therapy are associated with important therapeutic benefits and are required for curative outcomes. As shown in FIG. 5 for the p53 treatment groups and their controls, only Ad-p53+CD122/132+anti-PD-1 treatment resulted in complete tumor remissions of both primary and contralateral tumors. Complete tumor responses of both primary and contralateral tumors were observed in 60% of the Ad-p53+CD122/132+anti-PD-1 treatment group and there were no complete tumor responses of both primary and contralateral tumors in any of the 70 animals in the other treatment groups (p-value <0.0001 by two-sided Fisher's Exact Test comparing Ad-p53+CD122/132+anti-PD-1 treatment group vs. animals in all other treatment groups; p-value <0.011 by two-sided Fisher's Exact Test comparing Ad-p53+CD122/132+anti-PD-1 treatment group vs. any other treatment group). Unexpectedly, the complete tumor responses were durable and were maintained after 40 days in 50% of the Ad-p53+CD122/132+anti-PD-1 treatment group presumably curing these animals of these tumors.

Figure 6A:
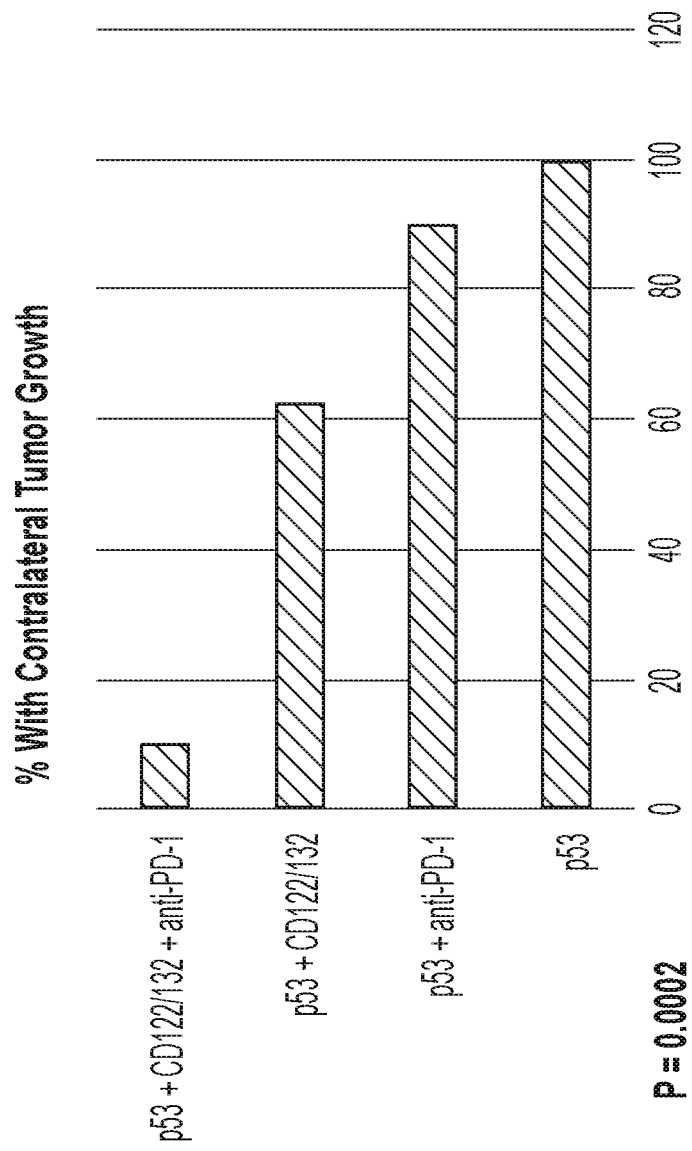
FIGS. 6A and 6B: Systemic/Abscopal Treatment Effects on Contralateral Tumor Growth. The systemic/abscopal effects of primary tumor treatment on contralaterally implanted tumors was assessed in rodents whose primary tumor had received one of the Ad-p53 intra-tumoral therapies. Consistent with the unexpected, substantially increased synergistic effects of Ad-p53+CD122/132+anti-PD-1 treatment on primary tumor growth and complete remission rates, we also observed a surprisingly powerful and statistically significant abscopal effect of Ad-p53+CD122/132+anti-PD-1 treatment compared to the other Ad-p53 treatment groups.
Figure 6B:
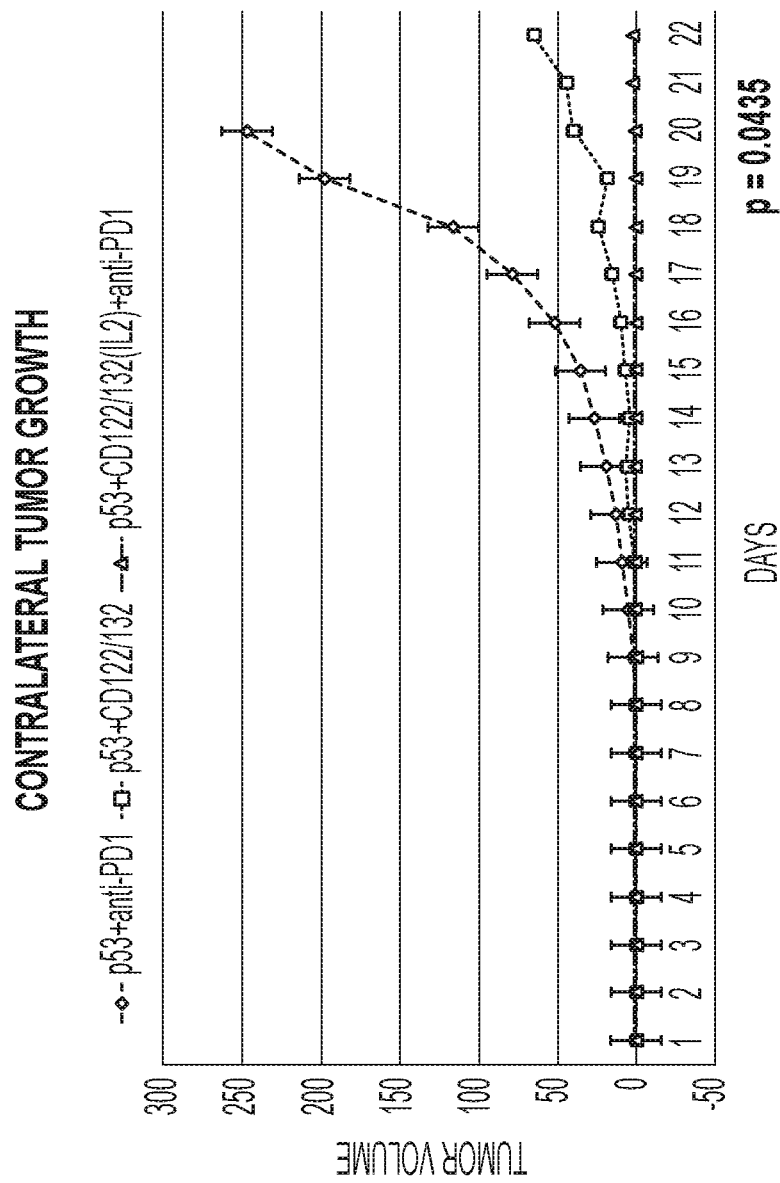

Ad-p53 Treatment Groups: Systemic/Abscopal Treatment Effects on Contralateral Tumor Growth. The systemic/abscopal effects of primary tumor treatment on contralaterally implanted tumors was assessed in rodents whose primary tumor had received one of the Ad-p53 therapies and the results are shown in FIG. 6. Consistent with the unexpected, substantially increased synergistic effects of Ad-p53+CD122/132+anti-PD-1 treatment on primary tumor growth and complete remission rates, we also observed a surprisingly powerful and statistically significant abscopal effect of Ad-p53+CD122/132+anti-PD-1 treatment compared to the other Ad-p53 treatment groups. As shown in FIG. 6A, contralateral tumor growth was abolished in 90% of the animals receiving Ad-p53+CD122/132+anti-PD-1 primary tumor treatment (9 of 10 animals). In contrast, contralateral tumor growth was observed in 62.5-100% of animals in the other Ad-p53 treatment groups. This difference in contralateral tumor growth was statistically significant (p-value=0.0004 by Chi-square analysis for all treatment groups; p-value <0.0430 by two-sided Fisher's Exact Test comparing Ad-p53+CD122/132+anti-PD-1 treatment group vs. any other treatment group). FIG. 6B depicts a graph showing contralateral tumor volumes over time in rodents receiving the three most effective primary tumor treatments with either the combination of Ad-p53+CD122/132, Ad-p53+anti-PD-1, or Ad-p53+CD122/132+anti-PD-1. A statistical analysis of variance (ANOVA) comparison of these contralateral tumor volumes on Day 22 determined synergy of the anti-tumor effects of Ad-p53+CD122/132+anti-PD-1 treatment (p-value=0.0435 overall). Only the Ad-p53+CD122/132+anti-PD-1 group demonstrated a statistically significant decrease in contralateral tumor growth vs. the Ad-p53+anti-PD-1 group (p-value=0.0360). Taken together, these findings indicate that of all the Ad-p53 therapies, only the triplet combination Ad-p53+CD122/132+anti-PD-1 treatment resulted in curative efficacy by inducing powerful local and systemic anti-tumor immunity mediating substantial abscopal effects.

Figure 7:
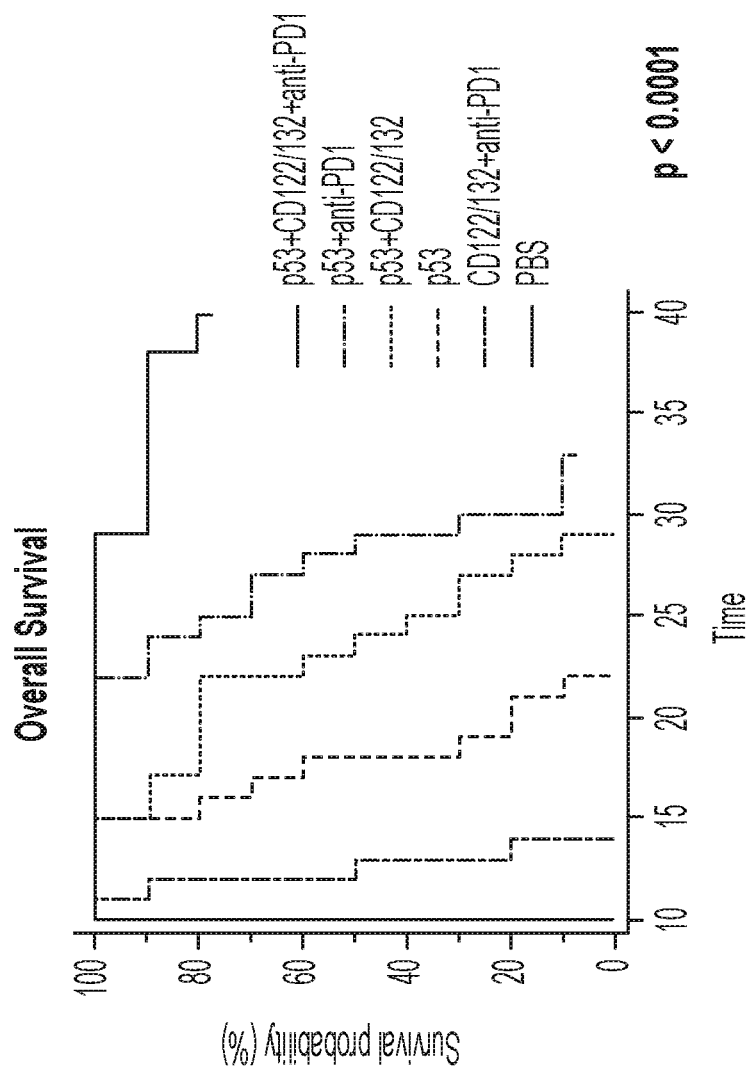
FIG. 7: Ad-p53+CD122/132+anti-PD-1 Efficacy: Extended Survival. Kaplan-Meier survival curves for mice treated with either PBS, CD122/132+anti-PD-1, Ad-p53, or the combination of Ad-p53+CD122/132, Ad-p53+anti-PD-1 and Ad-p53+CD122/132+anti-PD-1. There was a statistically significant difference in these survival curves by the log rank test (p<0.0001 overall; p-value ≤0.0003 comparing Ad-p53+CD122/132+anti-PD-1 treatment group vs. any other treatment group). These results also demonstrate an unexpected, substantial synergy of Ad-p53+CD122/132+ anti-PD-1 therapy. The median survival of the Ad-p53+ CD122/132+anti-PD-1 therapy group had not been reached after 40 days and 80% of this treatment group were still alive without evidence of any remaining tumors. In stark contrast, 98% (49/50) of animals in the other treatment groups had died by Day 30 and had median survivals ranging between 10 to 28 days.

Ad-p53 Treatment Groups: Therapeutic Efficacy Resulting in Extended Survival. Kaplan-Meier survival curves for mice treated with either PBS, CD122/132+anti-PD-1, Ad-p53, or the combination of Ad-p53+CD122/132, Ad-p53+anti-PD-1 and Ad-p53+CD122/132+anti-PD-1 are shown in FIG. 7. There was a statistically significant difference in these survival curves by the log rank test (p<0.0001 overall; p-value <0.0003 comparing Ad-p53+CD122/132+anti-PD-1 treatment group vs. any other treatment group). The results also demonstrate the unexpected, substantial synergy of Ad-p53+CD122/132+anti-PD-1 therapy. The median survival of the Ad-p53+CD122/132+anti-PD-1 therapy group had not been reached after 40 days and 80% of this treatment group were still alive. In stark contrast, 98% (49/50) of animals in the other treatment groups had died by Day 30 and had median survivals ranging between 10 to 28 days.

Figure 8:
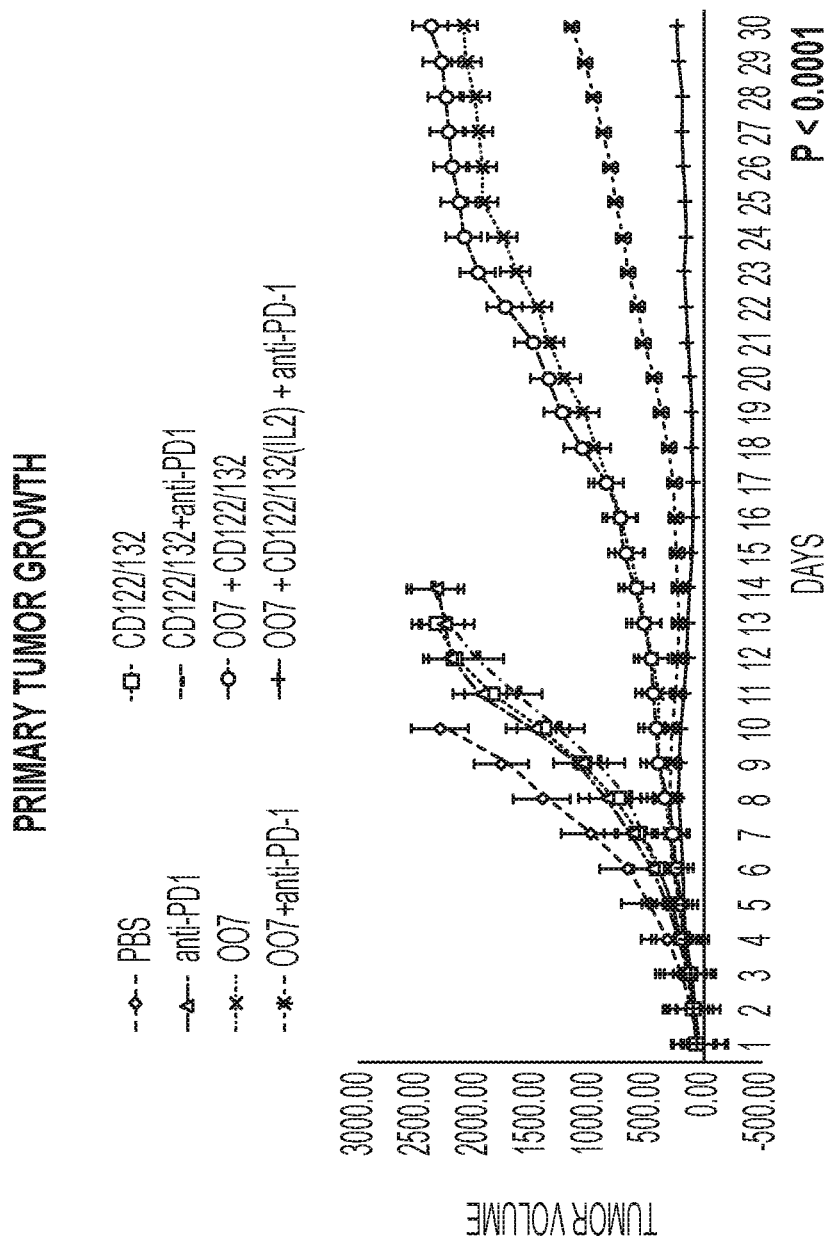
FIG. 8: VirRx007+CD122/132 agonist+anti-PD-1 Efficacy: Tumor Volume. A graph showing primary tumor volumes over time in rodents receiving either phosphate buffered saline (PBS) control, CD122/132, anti-PD-1, CD122/132+anti-PD-1, VirRx007, or the combination of VirRx007+CD122/132, VirRx007+anti-PD-1 and VirRx007+CD122/132+anti-PD-1. There was severe tumor progression in the groups treated with CD122/132, anti-PD-1, and CD122/132+anti-PD-1 therapies, which were reversed by combination with VirRx007 therapy. The results also show enhanced efficacy of VirRx007+anti-PD-1 and VirRx007+CD122/132+anti-PD-1 treatments compared to any of the therapies alone. In contrast to the findings with Ad-p53, VirRx007 did not demonstrate synergy with CD122/CD132 treatment. By day 30, the mean tumor volumes for the groups treated with (PBS), CD122/132, anti-PD-1, CD122/132+anti-PD-1, VirRx007, and VirRx007+ CD122/CD132 had all exceeded 2,000 mm$^3$. In contrast, each of the combined treatments with VirRx007+anti-PD-1 and VirRx007+CD122/132+anti-PD-1 induced large decreases in tumor volume, as compared to any of the non-VirRx007 therapies or VirRx007 treatment alone. A statistical analysis of variance (ANOVA) comparison of tumor volumes on Day 30 determined synergy of the anti-tumor effects of VirRx007+anti-PD-1 and VirRx007+ CD122/132+anti-PD-1 treatments (p-value <0.0001 overall and for each of these treatments vs. VirRx007;). VirRx007+ CD122/132+anti-PD-1 treatment was superior to VirRx007+anti-PD-1 (p-value=0.0002). Surprisingly, synergy was demonstrated for the triplet therapy combining VirRx007+CD122/132+anti-PD-1 even though there was no apparent benefit of the combination treatment VirRx007+ CD122/132 as compared to VirRx007 monotherapy.

VirRx007 plus CD122/132 Agonist and Checkpoint inhibitor Immunotherapy: Equally impressive and unexpected treatment efficacy of VirRx007 in combination with CD122/132 agonist and anti-PD-1 treatment was also observed by assessing tumor volumes (in primary and contralateral tumors), complete tumor response rates and survival. With regards to primary tumor volume, the graphs in FIG. 8 show tumor volumes overtime in rodents receiving either phosphate buffered saline (PBS) control, CD122/132, anti-PD-1, CD122/132+anti-PD-1, VirRx007, or the combination of VirRx007+CD122/132, VirRx007+anti-PD-1 and VirRx007+CD122/132+anti-PD-1. There was severe tumor progression during CD122/132, anti-PD-1, and CD122/132+anti-PD-1 therapies which were reversed by combination with VirRx007 therapy. The results show enhanced efficacy of VirRx007+anti-PD-1 and VirRx007+CD122/132+anti-PD-1 treatments compared to any of the therapies alone. In contrast to the findings with Ad-p53, VirRx007 did not demonstrate synergy with CD122/CD132 treatment. By day 30, the mean tumor volumes for the groups treated with PBS, CD122/132, anti-PD-1, CD122/132+anti-PD-1, VirRx007, and VirRx007+CD122/CD132 had all exceeded 2,000 mm3. In contrast, each of the combined treatments with VirRx007+anti-PD-1 and VirRx007+CD122/132+anti-PD-1 induced large decreases in tumor volume, as compared to any of the non-VirRx007 therapies or VirRx007 treatment alone. A statistical analysis of variance (ANOVA) comparison of tumor volumes on Day 30 determined synergy of the anti-tumor effects of VirRx007+anti-PD-1 and VirRx007+CD122/132+anti-PD-1 treatments (p-value <0.0001 overall and for each of these treatments vs. VirRx007). VirRx007+CD122/132+anti-PD-1 treatment was superior to VirRx007+anti-PD-1 (p-value=0.0002). Surprisingly, synergy was demonstrated for the triplet therapy combining VirRx007+CD122/132+anti-PD-1 even though there was no apparent benefit of the combination treatment VirRx007+CD122/132 as compared to VirRx007 monotherapy.

Figure 9:
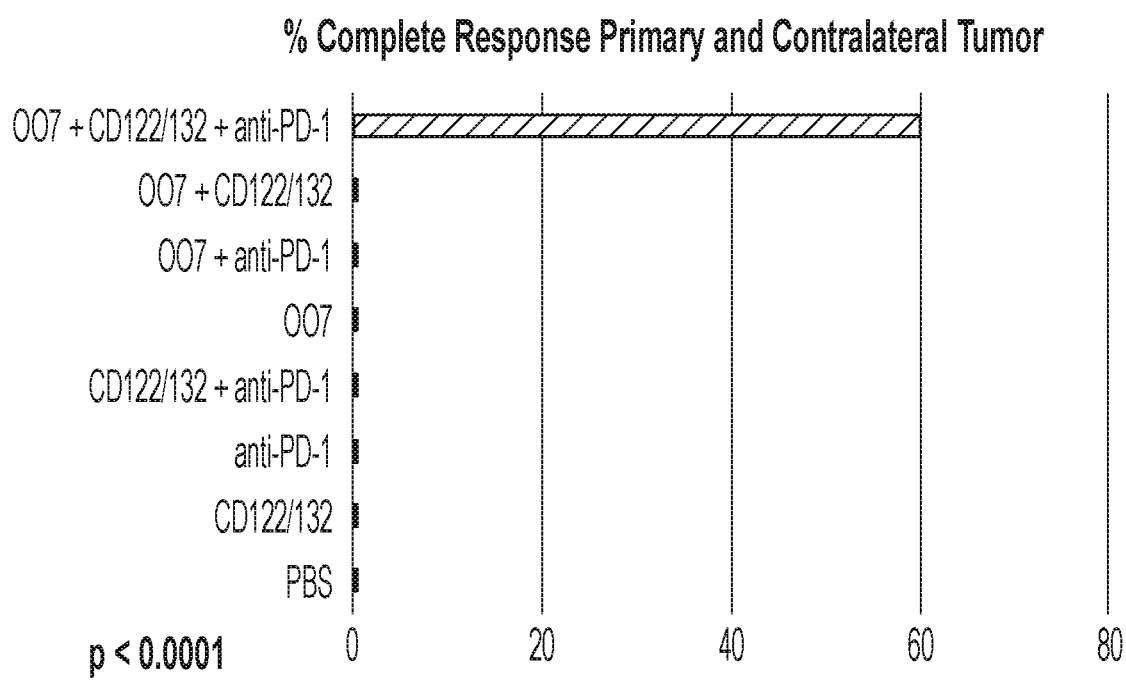
FIG. 9: Complete Tumor Response Rates. It is generally appreciated that complete tumor responses to therapy are associated with important therapeutic benefits and are required for curative outcomes.

VirRx007 Treatment Groups—Evaluation of Complete Tumor Response Rates. It is generally appreciated that complete tumor responses to therapy are associated with important therapeutic benefits and are required for curative outcomes. As shown in FIG. 9 for the VirRx007 treatment groups and their controls, only VirRx007+CD122/132+anti-PD-1 treatment resulted in complete tumor remissions of both primary and contralateral tumors. Complete tumor responses of both primary and contralateral tumors were observed in 60% of the VirRx007+CD122/132+anti-PD-1 treatment group and there were no complete tumor responses of both primary and contralateral tumors in any of the 70 animals in the other treatment groups (p-value <0.0001 by two-sided Fisher's Exact Test comparing VirRx007+CD122/132+anti-PD-1 treatment group vs. animals in all other treatment groups; p-value <0.011 by two-sided Fisher's Exact Test comparing VirRx007+CD122/132+anti-PD-1 treatment group vs. any other treatment group). Unexpectedly, the complete tumor responses were durable and were maintained after 40 days in 50% of the VirRx007+CD122/132+anti-PD-1 treatment group presumably curing these animals of these tumors.

Figure 10A:
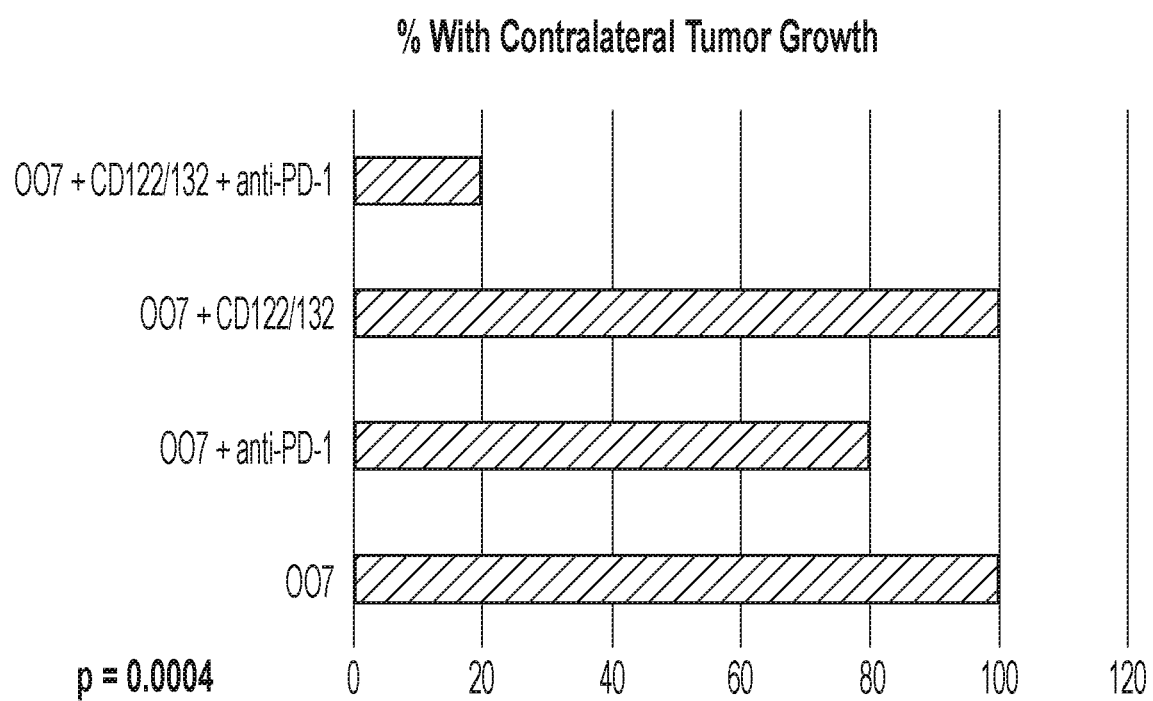

VirRx007 Treatment Groups—Systemic/Abscopal Treatment Effects on Contralateral Tumor Growth. The systemic/abscopal effects of primary tumor treatment on contralaterally implanted tumors was assessed in rodents whose primary tumor had received one of the VirRx007 therapies and the results are shown in FIG. 10. Consistent with the unexpected, substantially increased synergistic effects of VirRx007+CD122/132+anti-PD-1 treatment on primary tumor growth and complete remission rates, we also observed a surprisingly powerful and very statistically significant abscopal effect of VirRx007+CD122/132+anti-PD-1 treatment compared to the other VirRx007 treatment groups. As shown in FIG. 10A, contralateral tumor growth was abolished in 80% of the animals receiving VirRx007+CD122/132+anti-PD-1 primary tumor treatment. In contrast, contralateral tumor growth was observed in 80-100% of animals in the other VirRx007 treatment groups. This difference in contralateral tumor growth was statistically significant (p-value=0.0002 by Chi-square analysis comparing all treatment groups; p-value <0.0230 by two-sided Fisher's Exact Test comparing VirRx007+CD122/132+anti-PD-1 treatment group vs. any other treatment group). These findings imply that combination VirRx007+CD122/132+anti-PD-1 treatment induced powerful systemic anti-tumor immunity and mediated substantial abscopal effects with potential curative efficacy. FIG. 10B depicts a graph showing contralateral tumor volumes over time in rodents receiving the three most effective primary tumor combination treatments with either VirRx007+CD122/132, VirRx007+anti-PD-1, or VirRx007+CD122/132+anti-PD-1. A statistical analysis of variance (ANOVA) comparison of these contralateral tumor volumes on Day 22 determined synergy of the anti-tumor effects of VirRx007+CD122/132+anti-PD-1 treatment (p-value=0.0171 overall). Only the VirRx007+CD122/132+anti-PD-1 group demonstrated a statistically significant decrease in contralateral tumor growth vs. the VirRx007+anti-PD-1 group (p-value=0.0115). Taken together, these findings indicate that of all the VirRx007 therapies, only the triplet combination VirRx007+CD122/132+anti-PD-1 treatment resulted in curative efficacy by inducing powerful local and systemic anti-tumor immunity mediating substantial abscopal effects.

Figure 11:
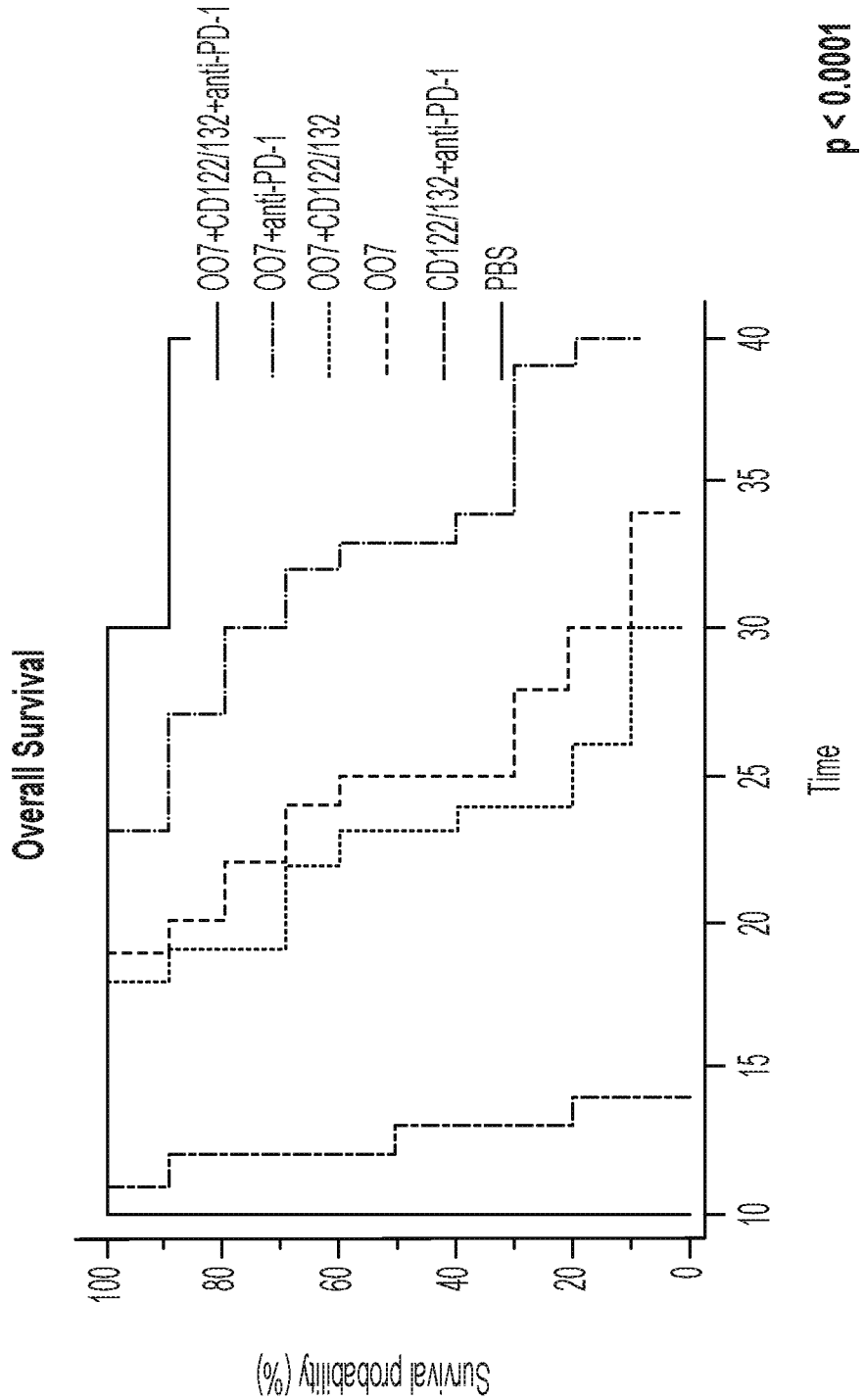
FIG. 11: VirRx007+CD122/132+anti-PD-1 Efficacy: Extended Survival. Kaplan-Meier survival curves for mice treated with either PBS, CD122/132+anti-PD-1, VirRx007, or the combination of VirRx007+CD122/132, VirRx007+ anti-PD-1 and VirRx007+CD122/132+anti-PD-1. There was a statistically significant difference in these survival curves by the log rank test (p<0.0001 overall; p-value ≤0.0005 comparing VirRx007+CD122/132+anti-PD-1 treatment group vs. any other treatment group). The results also demonstrate the unexpected, substantial synergy of VirRx007+CD122/132+anti-PD-1 therapy. The median survival of the VirRx007+CD122/132+anti-PD-1 therapy group had not been reached after 40 days and 90% of this treatment group were still alive. In stark contrast, 98% (49/50) of animals in the other treatment groups had died by Day 40 and had median survivals ranging between 10 to 33 days. Surprisingly, synergy was demonstrated for the triplet therapy combining VirRx007+CD122/132+anti-PD-1 even though there was no apparent survival benefit of the combination treatment VirRx007+CD122/132 as compared to VirRx007 monotherapy.

VirRx007 Treatment Groups—Therapeutic Efficacy Resulting in Extended Survival. Kaplan-Meier survival curves for mice treated with either PBS, CD122/132+anti-PD-1, VirRx007, or the combination of VirRx007+CD122/132, VirRx007+anti-PD-1 and VirRx007+CD122/132+anti-PD-1 are shown in FIG. 11. There was a statistically significant difference in these survival curves by the log rank test (p<0.0001 overall; p-value <0.0005 comparing VirRx007+CD122/132+anti-PD-1 treatment group vs. any other treatment group). The results also demonstrate the unexpected, substantial synergy of VirRx007+CD122/132+anti-PD-1 therapy. The median survival of the VirRx007+CD122/132+anti-PD-1 therapy group had not been reached after 40 days and 90% of this treatment group were still alive. In stark contrast, 98% (49/50) of animals in the other treatment groups had died by Day 40 and had median survivals ranging between 10 to 33 days. Surprisingly, synergy was demonstrated for the triplet therapy combining VirRx007+CD122/132+anti-PD-1 even though there was no apparent survival benefit of the combination treatment VirRx007+CD122/132 as compared to VirRx007 monotherapy.

Figure 12:
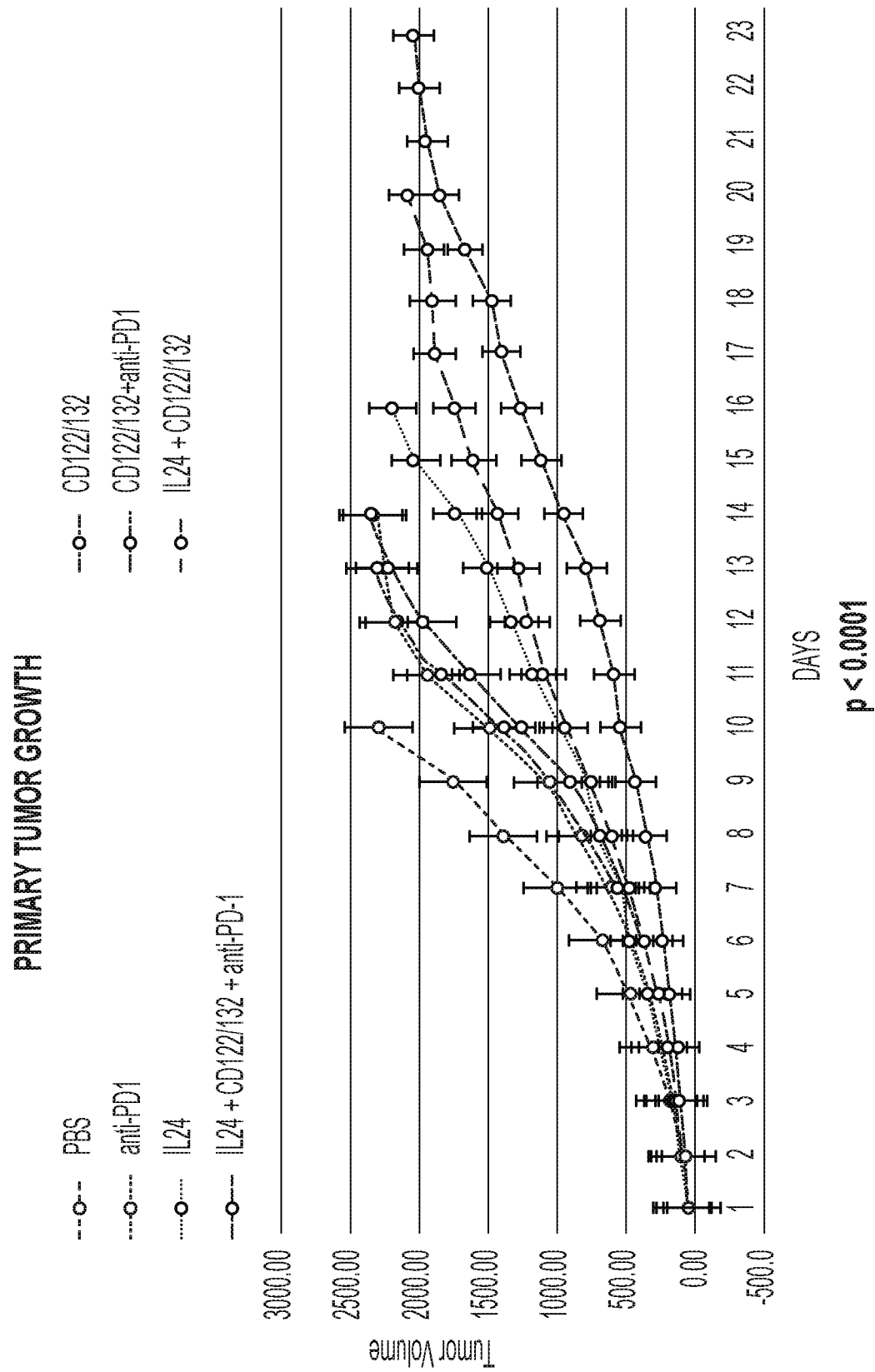
FIG. 12: Ad-IL24+CD122/132 agonist+anti-PD-1 Efficacy: Tumor Volume. A graph showing primary tumor volumes over time in rodents receiving either phosphate buffered saline (PBS) control, CD122/132, anti-PD-1, CD122/132+anti-PD-1, Ad-IL24, or the combination of Ad-IL24+CD122/132 and Ad-IL24+CD122/132+anti-PD-1. There was severe tumor progression during CD122/132, anti-PD-1, and CD122/132+anti-PD-1 therapies which were reversed by combination with Ad-IL24 therapy. There was enhanced efficacy of Ad-IL24+CD122/132+anti-PD-1 treatments compared to any of the therapies alone. By day 16, the mean tumor volumes for the groups treated with (PBS), CD122/132, anti-PD-1, CD122/132+anti-PD-1, and Ad-IL24 had all exceeded 2,000 mm3. In contrast, combined treatment with Ad-IL24+CD122/132+anti-PD-1 induced substantial decreases in tumor volume, as compared to any of the non-Ad-IL24 therapies or Ad-IL24 treatment alone. A statistical analysis of variance (ANOVA) comparison of tumor volumes on Day 16 determined synergy of the anti-tumor effects of Ad-IL24+CD122/132+anti-PD-1 treatments (p-value <0.0001). There was a statistically significant decrease in tumor volumes for Ad-IL24+CD122/132+anti-PD-1 treatment compared to either Ad-IL24 (p=0.0025) or CD122/132+anti-PD-1 treatment (p-value <0.0001).

Ad-IL24 plus CD122/132 Agonist and Checkpoint inhibitor Immunotherapy: Similar superior treatment efficacy of Ad-IL24 in combination with CD122/132 agonist and anti-PD-1 treatment was also observed by assessing primary tumor volumes and survival. With regards to primary tumor volume, the graphs in FIG. 12 show tumor volumes over time in rodents receiving either phosphate buffered saline (PBS) control, CD122/132, anti-PD-1, CD122/132+anti-PD-1, Ad-IL24, or the combination of Ad-IL24+CD122/132 and Ad-IL24+CD122/132+anti-PD-1. There was severe tumor progression during CD122/132, anti-PD-1, and CD122/132+anti-PD-1 therapies which were reversed by combination with Ad-IL24 therapy. There was enhanced efficacy of Ad-IL24+CD122/132+anti-PD-1 treatments compared to any of the therapies alone. By day 16, the mean tumor volumes for the groups treated with PBS, CD122/132, anti-PD-1, CD122/132+anti-PD-1, and Ad-IL24 had all exceeded 2,000 mm3. In contrast, combined treatment with Ad-IL24+CD122/132+anti-PD-1 induced substantial decreases in tumor volume, as compared to any of the non-Ad-IL24 therapies or Ad-IL24 treatment alone. A statistical analysis of variance (ANOVA) comparison of tumor volumes on Day 16 determined synergy of the anti-tumor effects of Ad-IL24+CD122/132+anti-PD-1 treatments (p-value <0.0001). There was a statistically significant decrease in tumor volumes for Ad-IL24+CD122/132+anti-PD-1 treatment compared to either Ad-IL24 (p=0.0025) or CD122/132+anti-PD-1 treatment (p-value <0.0001).

Figure 13:
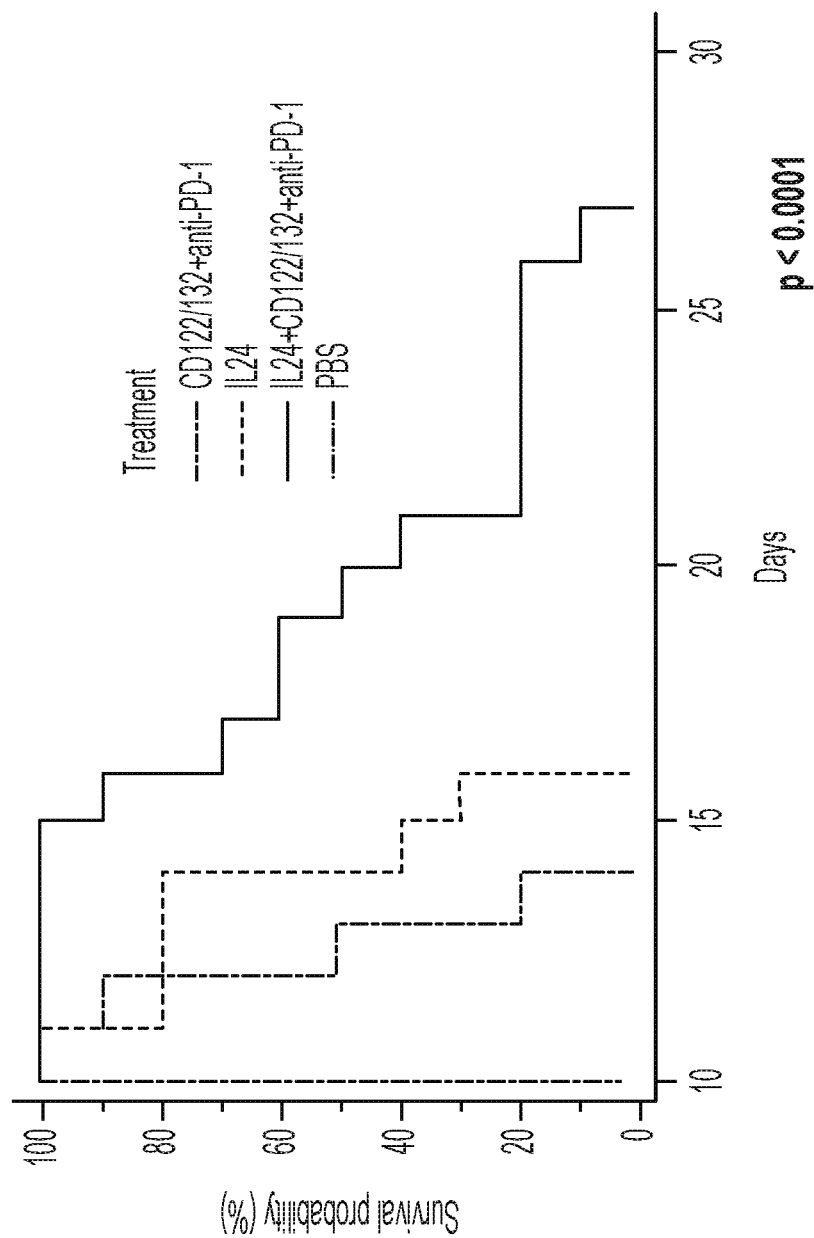
FIG. 13: Ad-IL24+CD122/132+anti-PD-1 Efficacy: Extended Survival. Kaplan-Meier survival curves for mice treated with either PBS, CD122/132+anti-PD-1, Ad-IL24, or the combination of Ad-IL24+CD122/132+anti-PD-1. There was a statistically significant difference in these survival curves by the log rank test (p<0.0001). The results demonstrate the unexpected, substantial synergy of Ad-IL24+CD122/132+anti-PD-1 therapy. The median survival of the Ad-IL24+CD122/132+anti-PD-1 therapy group was synergistically enhanced. All animals in the PBS, CD122/132+anti-PD-1 and IL24 treatment groups had perished by day 16 while 50% of the animals in the Ad-IL24+CD122/132+anti-PD-1 therapy group were alive at day 19. The Ad-IL24+CD122/132+anti-PD-1 therapy group demonstrated statistically significant improved survival compared to either Ad-IL24 alone (p=0.0003) or the CD122/132+anti-PD1 treatment group (p<0.0001). Interestingly, the Ad-IL24+CD122/132 doublet had surprisingly superior efficacy compared to the CD122/132+anti-PD-1 doublet (p=0.0002 by log rank test data not shown).

Ad-IL24 Treatment Groups—Therapeutic Efficacy Resulting in Extended Survival. Kaplan-Meier survival curves for mice treated with either PBS, CD122/132+anti-PD-1, Ad-IL24, or the combination of Ad-IL24+CD122/132+anti-PD-1 are shown in FIG. 13. There was a statistically significant difference in these survival curves by the log rank test (p<0.0001). The results demonstrate the unexpected, substantial synergy of Ad-IL24+CD122/132+anti-PD-1 therapy. The median survival of the Ad-IL24+CD122/132+anti-PD-1 therapy group was synergistically enhanced.

All animals in the PBS, CD122/132+anti-PD-1 and IL24 treatment groups had perished by day 16 while 50% of the animals in the Ad-IL24+CD122/132+anti-PD-1 therapy group were alive at day 19. The Ad-IL24+CD122/132+anti-PD-1 therapy group demonstrated statistically significant improved survival compared to either Ad-IL24 alone (p=0.0003) or the CD122/132+anti-PD1 treatment group (p<0.0001). Interestingly, the Ad-IL24+CD122/132 doublet had surprisingly superior efficacy compared to the CD122/132+anti-PD-1 doublet (p=0.0002 by log rank test data not shown).

Figure 14:
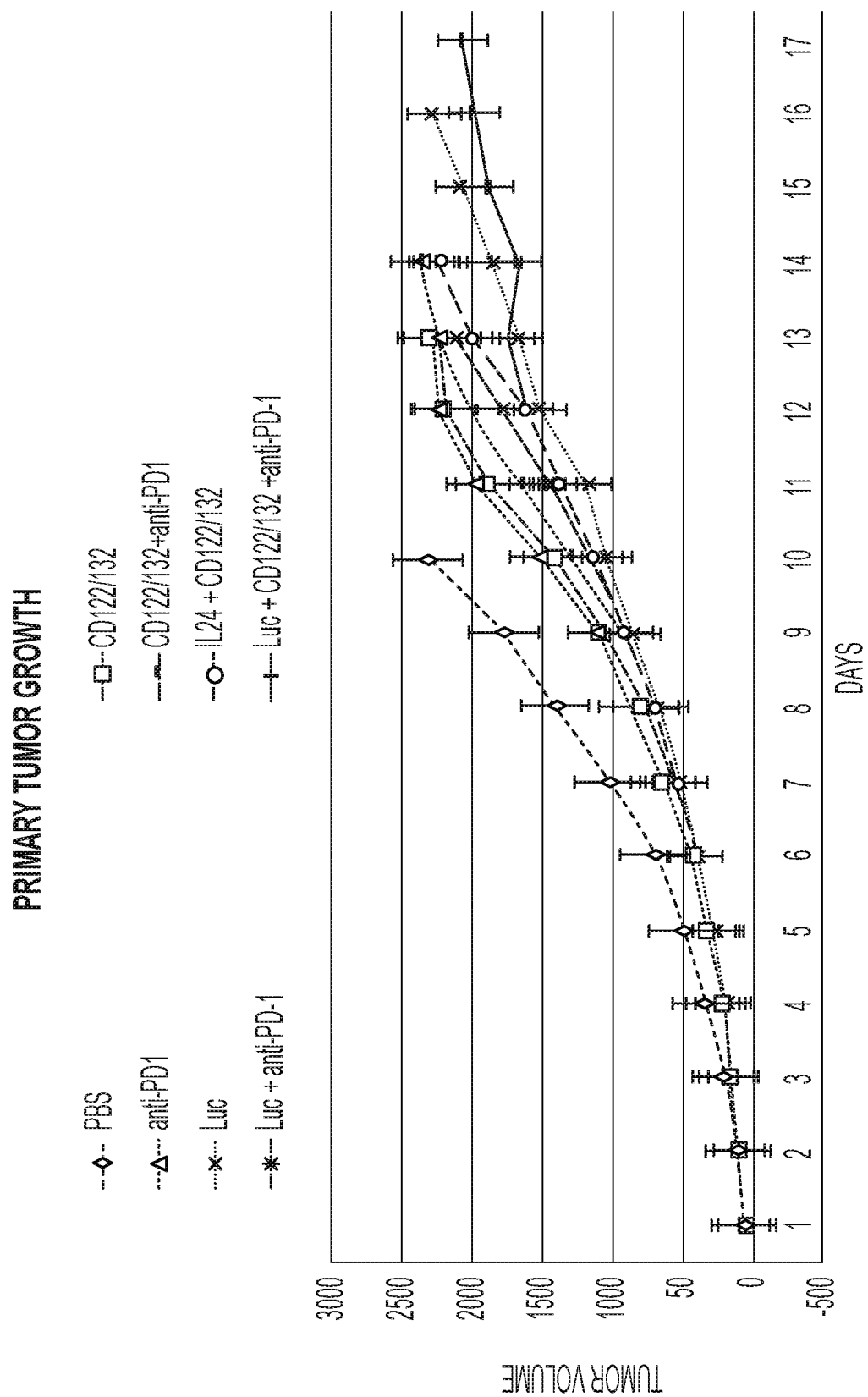
FIG. 14: Ad-Luciferase (Ad-Luc) negative control+CD122/132 agonist+anti-PD-1 Efficacy: Tumor Volume. A graph showing primary tumor volumes over time in rodents receiving either phosphate buffered saline (PBS) control, CD122/132, anti-PD-1, CD122/132+anti-PD-1, Ad-Luc control, or the combination of Ad-Luc control+CD122/132, Ad-Luc control+anti-PD-1 and Ad-Luc control+CD122/132+anti-PD-1. In contrast to the treatments with Ad-p53, VirRx007 and Ad-IL24, there was no significant increase in therapeutic efficacy when Ad-Luc was combined with anti-PD-1, CD122/132, or CD122/132+anti-PD-1 treatments. By day 16, the mean tumor volumes for all groups exceeded 2,000 mm3. A statistical analysis of variance (ANOVA) comparison of tumor volumes on Day 16 was not statistically significant (p-value=0.1212; none of the mean tumor volumes between any of the treatment groups were statistically significant).

Negative Controls with Ad-Luciferase (Ad-Luc). Ad-Luc control+CD122/132 agonist+anti-PD-1: Tumor Volume. The graph in FIG. 14 depicts primary tumor volumes over time in rodents receiving either phosphate buffered saline (PBS) control, CD122/132, anti-PD-1, CD122/132+anti-PD-1, Ad-Luc control, or the combination of Ad-Luc control+CD122/132, Ad-Luc control+anti-PD-1 and Ad-Luc control+CD122/132+anti-PD-1. In contrast to the treatments with Ad-p53, VirRx007 and Ad-IL24, there was no significant increase in therapeutic efficacy when Ad-Luc was combined with anti-PD-1, CD122/132, or CD122/132+anti-PD-1 treatments. By day 16, the mean tumor volumes for all groups exceeded 2,000 mm3. A statistical analysis of variance (ANOVA) comparison of tumor volumes on Day 16 was not statistically significant (p-value=0.1212; none of the mean tumor volumes between any of the treatment groups were statistically significant).

Figure 15:
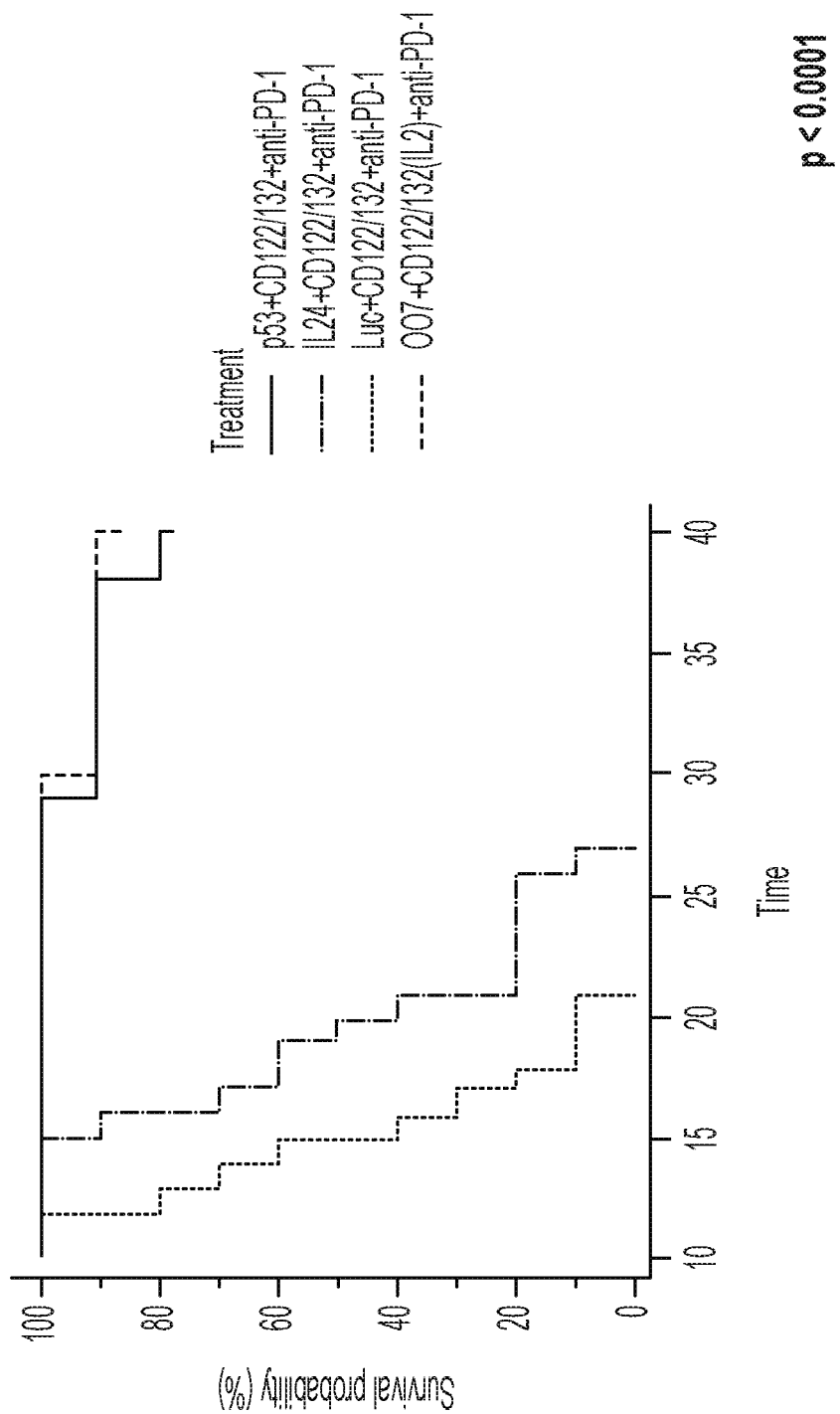
FIG. 15: "Triplet Therapy" with Ad-p53, VirRx007 and Ad-IL24 combined respectively with CD122/132+anti-PD-1 compared to Ad-Luc control+CD122/132+anti-PD-1 Extended Survival. Kaplan-Meier survival curves for mice treated with CD122/132+anti-PD-1 combined with either Ad-p53, VirRx007, Ad-IL24 or Ad-Luc control. There was a statistically significant difference in these survival curves by the log rank test (p<0.0001). Each of the Ad-p53, VirRx007 and Ad-IL24 combined with CD122/132+anti-PD-1 triplet therapies demonstrated statistically significant increased survival compared to the Ad-Luc+CD122/132+anti-PD-1 triplet therapy control (Ad-p53 and VirRx007 combined with CD122/132+anti-PD-1 triplet therapies both p-values <0.0001; Ad-IL24 combined with CD122/132+anti-PD-1 p<0.015 by log rank test).

Superiority of "Triplet Therapy" with Ad-p53, VirRx007 and Ad-IL24 combined respectively with CD122/132+anti-PD-1 compared to Ad-Luc Negative Control with CD122/132+anti-PD-1. With regard to survival, FIG. 15 reveals that "Triplet Therapy" with Ad-p53, VirRx007 and Ad-IL24 combined respectively with CD122/132+anti-PD-1 each had statistically significant increased survival compared to treatment with Ad-Luc+CD122/132+anti-PD-1. There was a statistically significant difference in these survival curves by the log rank test (p<0.0001). Each of the Ad-p53, VirRx007 and Ad-IL24 combined with CD122/132+anti-PD-1 triplet therapies demonstrated statistically significant increased survival compared to the Ad-Luc+CD122/132+anti-PD-1 triplet therapy control (Ad-p53 and VirRx007 combined with CD122/132+anti-PD-1 triplet therapies both p-values <0.0001; Ad-IL24 combined with CD122/132+anti-PD-1 p<0.015 by log rank test).

Experiments where the CD122/CD132 agonist is comprised of recombinant mouse IL-15 and IL-15-R alpha-Fc. In these studies, the preferential CD122/CD132 agonist is prepared by incubating these reagents together at 37 C for 30 minutes, and the resulting immunocomplex is injected IP on days 3, 5 and 7 after tumors become palpable.

Figure 16:
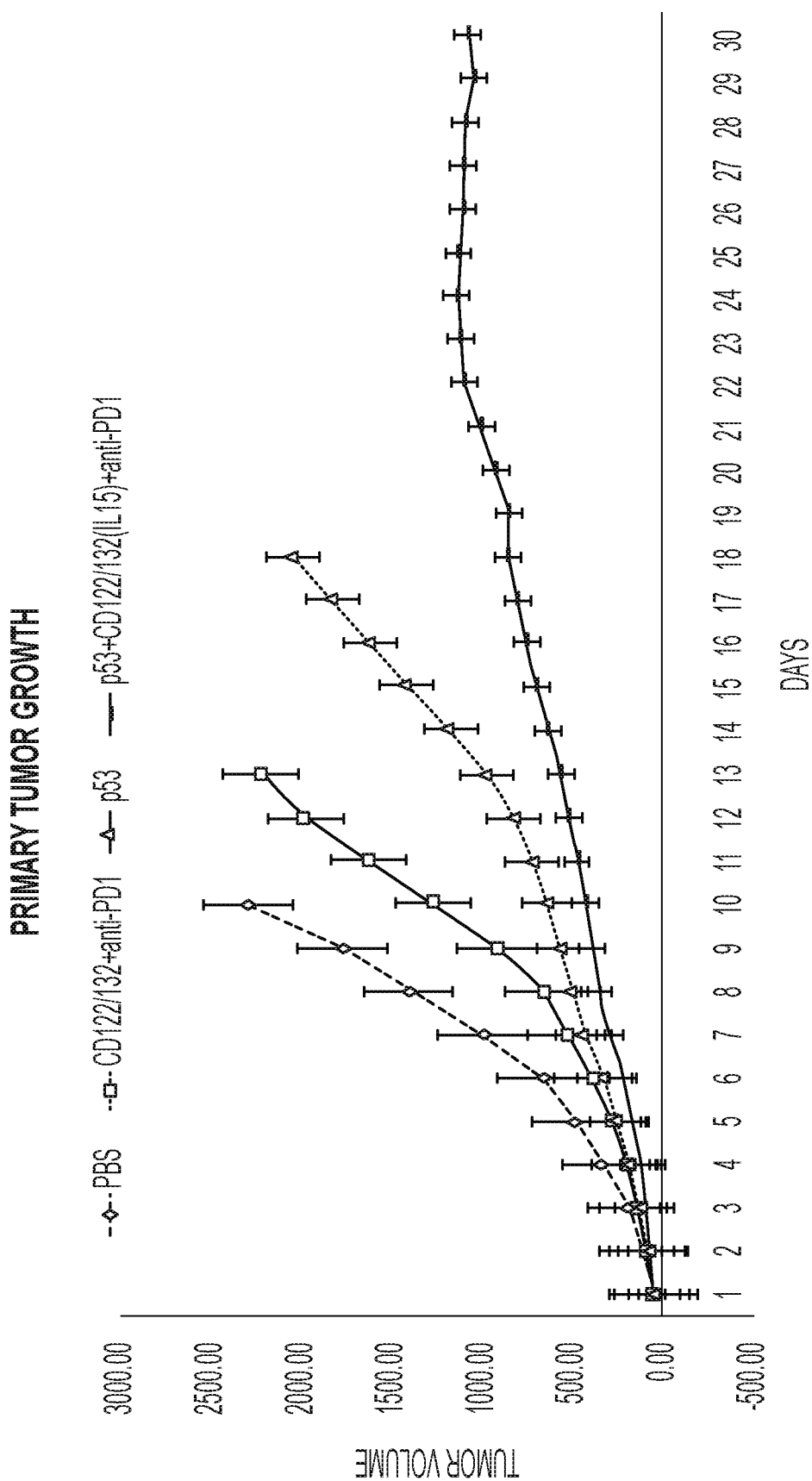
FIG. 16: Ad-p53+CD122/132 (IL15) agonist+anti-PD-1 Efficacy: Tumor Volume. The preferential CD122/CD132 agonist combined with tumor suppressor therapy was an immunocomplex comprised of recombinant IL15 and IL-15-R alpha-Fc. A graph showing primary tumor volumes over time in rodents receiving either phosphate buffered saline (PBS) control, CD122/132+anti-PD-1, Ad-p53 alone, or the combination of Ad-p53+CD122/132(IL15)+anti-PD-1. There was severe tumor progression during PBS, CD122/132+anti-PD-1 and Ad-p53 therapies. Consistent with the earlier Ad-p53 combination treatment results described above, there was substantially enhanced efficacy of Ad-p53+CD122/132(IL15)+anti-PD-1 treatment compared to any of the therapies. By day 30, the mean tumor volumes for the groups treated with PBS, CD122/132+anti-PD-1, and Ad-p53 had all exceeded 2,000 mm3. In contrast, combined treatment with Ad-p53+CD122/132(IL15)+anti-PD-1 induced large decreases in tumor volume. A statistical analysis of variance (ANOVA) comparison of tumor volumes determined synergy of the anti-tumor effects of Ad-p53+CD122/132(IL15)+anti-PD-1 treatments (p-value <0.0001 overall and p-value <0.0001 separately compared to every other treatment group).

Ad-p53 plus CD122/132(IL15) Agonist and Checkpoint inhibitor Immunotherapy—Tumor Volume: Treatment efficacy of Ad-p53 in combination with the IL15 based CD122/132 agonist and anti-PD-1 treatment was evaluated by assessing tumor volumes (in primary and contralateral tumors) and survival. With regard to primary tumor volume, the graph in FIG. 16 shows tumor volumes over time in rodents receiving either phosphate buffered saline (PBS) control, CD122/132+anti-PD-1, Ad-p53 alone, or the combination of Ad-p53+CD122/132(IL15)+anti-PD-1. There was severe tumor progression during PBS, CD122/132+anti-PD-1 and Ad-p53 therapies. Consistent with the earlier Ad-p53 combination treatment results described above, there was substantially enhanced efficacy of Ad-p53+CD122/132(IL15)+anti-PD-1 treatment compared to any of the therapies. By day 30, the mean tumor volumes for the groups treated with PBS, CD122/132+anti-PD-1, and Ad-p53 had all exceeded 2,000 mm3. In contrast, the combined treatment with Ad-p53+CD122/132(IL15)+anti-PD-1 induced large decreases in tumor volume. A statistical analysis of variance (ANOVA) comparison of tumor volumes determined synergy of the anti-tumor effects of Ad-p53+CD122/132(IL15)+anti-PD-1 treatments (p-value <0.0001 overall and p-value <0.0001 separately compared to every other treatment group).

Figure 17:
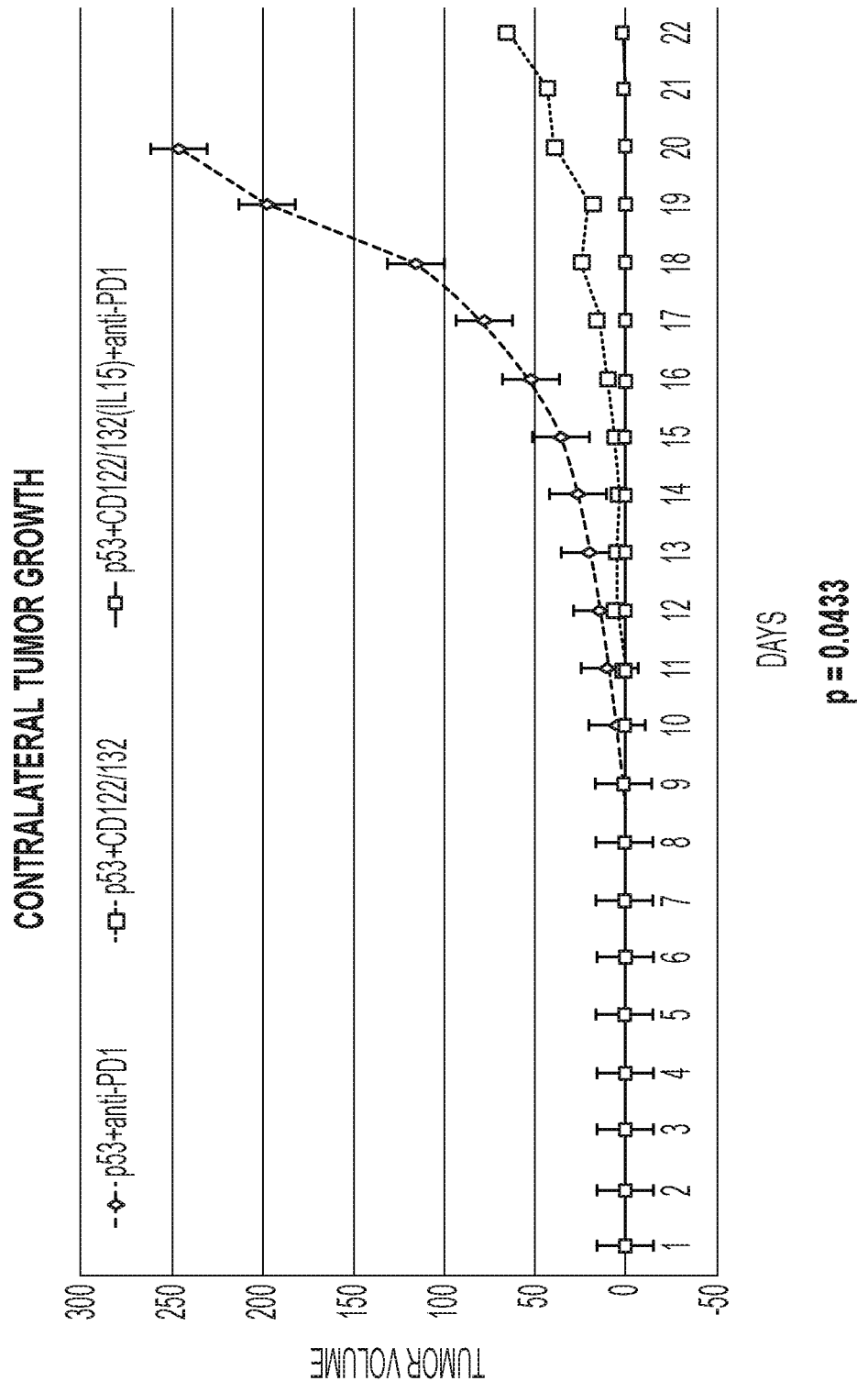
FIG. 17: Systemic/Abscopal Treatment Effects of Ad-p53+CD122/132(IL15)+anti-PD-1 on Contralateral Tumor Growth. The preferential CD122/CD132 agonist combined with tumor suppressor therapy was an immunocomplex comprised of recombinant IL15 and IL-15-R alpha-Fc. The systemic/abscopal effects of primary tumor treatment on contralaterally implanted tumors was assessed in rodents whose primary tumor had received Ad-p53+CD122/132(IL15)+anti-PD-1. Consistent with the unexpected, substantially increased synergistic effects of Ad-p53+CD122/132(IL15)+anti-PD-1 treatment on primary tumor growth shown in FIG. 16, we also observed a surprisingly powerful and statistically significant abscopal effect of Ad-p53+CD122/132(IL15)+anti-PD-1 treatment compared to the other Ad-p53 treatment groups.

Ad-p53 plus CD122/132(IL15) Agonist and Checkpoint inhibitor Immunotherapy—Systemic/Abscopal Treatment Effects on Contralateral Tumor Growth. The systemic/abscopal effects of primary tumor treatment on contralaterally implanted tumors was assessed in rodents whose primary tumor had received one of the Ad-p53 therapies and the results are shown in FIG. 17. Consistent with the unexpected, substantially increased synergistic effects of Ad-p53+CD122/132(IL15)+anti-PD-1 treatment on primary tumor growth shown in FIG. 16, we also observed a surprisingly powerful and highly statistically significant abscopal effect of Ad-p53+CD122/132(IL15)+anti-PD-1 treatment compared to the other Ad-p53 treatment groups. FIG. 17 depicts a graph showing contralateral tumor volumes over time in rodents receiving primary tumor treatments with either the combination of Ad-p53+CD122/132, Ad-p53+anti-PD-1, or Ad-p53+CD122/132 (IL15)+anti-PD-1. A statistical analysis of variance (ANOVA) comparison of these contralateral tumor volumes on Day 22 determined synergy of the anti-tumor effects of Ad-p53+CD122/132(IL15)+anti-PD-1 treatment (p-value=0.0433 overall). Only the Ad-p53+CD122/132+anti-PD-1 group demonstrated a statistically significant decrease in contralateral tumor growth vs. the Ad-p53+anti-PD-1 group (p-value=0.0359).

Figure 18:
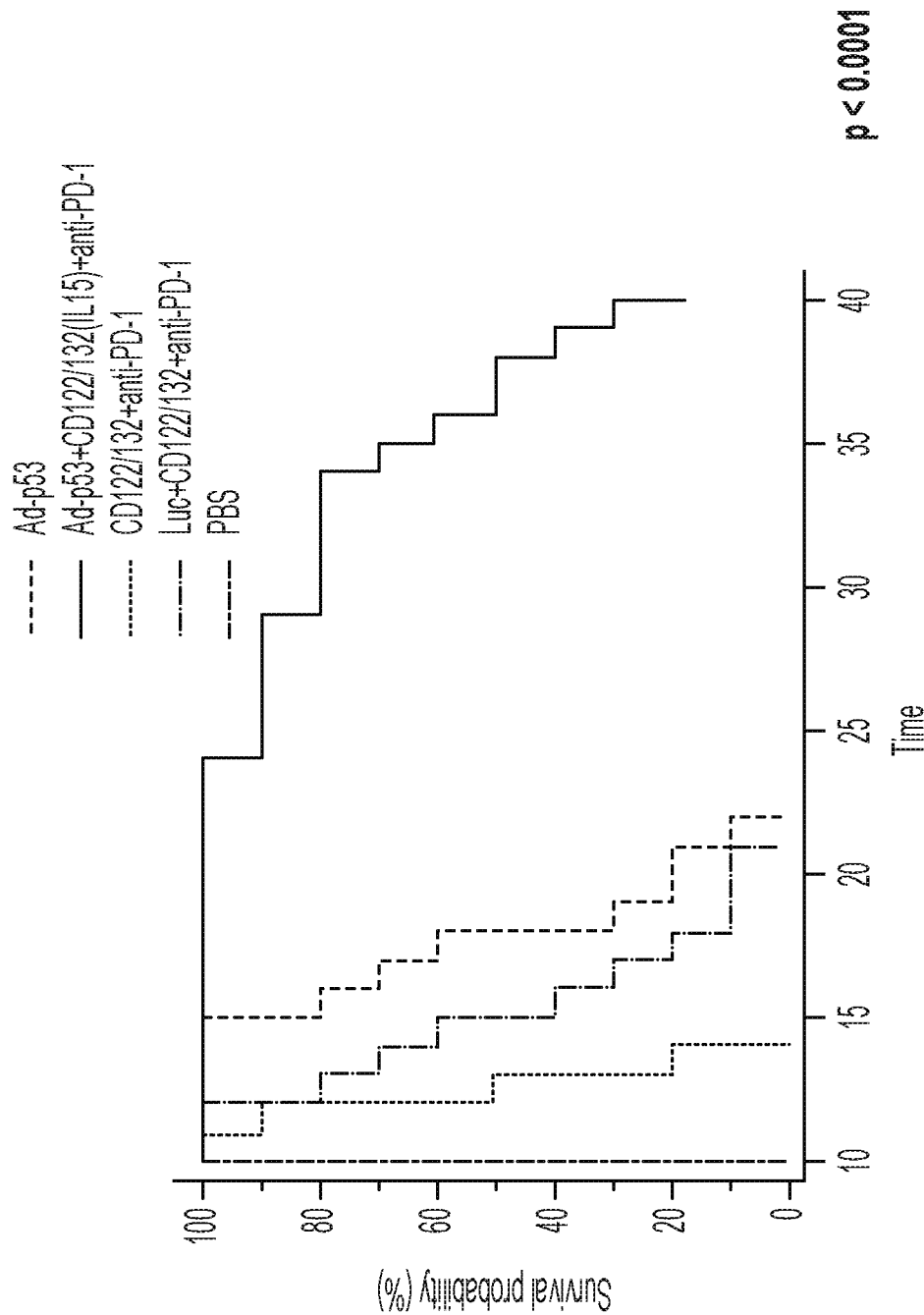
FIG. 18: Ad-p53+CD122/132(IL15)+anti-PD-1 Efficacy: Extended Survival. The preferential CD122/CD132 agonist combined with tumor suppressor therapy was an immunocomplex comprised of recombinant IL15 and IL-15-R alpha- Fc. Kaplan-Meier survival curves for mice treated with either PBS, CD122/132+anti-PD-1, Ad-Luc+CD122/132+anti-PD-1 control, Ad-p53, or the combination of Ad-p53+CD122/132(IL15)+anti-PD-1 are shown in FIG. 18. There was a statistically significant difference in these survival curves by the log rank test (p<0.0001 overall; p-value <0.0001 comparing Ad-p53+CD122/132(IL15)+anti-PD-1 treatment group vs. any other treatment group). The results further demonstrate the unexpected, substantial synergy of Ad-p53+CD122/132(IL15)+anti-PD-1 therapy. In the Ad-p53+CD122/132(IL15)+anti-PD-1 therapy group, 50% of the animals were alive on Day 36. In stark contrast, all animals in the other treatment groups had died by Day 22 and had median survivals ranging between 10 to 18 days.

Ad-p53 plus CD122/132(IL15) Agonist and Checkpoint inhibitor Immunotherapy—Therapeutic Efficacy Resulting in Extended Survival. Kaplan-Meier survival curves for mice treated with either PBS, CD122/132+anti-PD-1, Ad-Luc+CD122/132+anti-PD-1 control, Ad-p53, or the combination of Ad-p53+CD122/132(IL15)+anti-PD-1 are shown in FIG. 18. There was a statistically significant difference in these survival curves by the log rank test (p<0.0001 overall; p-value <0.0001 comparing Ad-p53+CD122/132(IL15)+anti-PD-1 treatment group vs. any other treatment group). The results further demonstrate the unexpected, substantial synergy of Ad-p53+CD122/132(IL15)+anti-PD-1 therapy. In the Ad-p53+CD122/132(IL15)+anti-PD-1 therapy group, 50% of the animals were alive on Day 36. In stark contrast, all animals in the other treatment groups had died by Day 22 and had median survivals ranging between 10 to 18 days.

Example 2—Applications with Vaccinia Vectors Engineered with N1L Deletion, IL12 Expression and Preferential CD122/CD132 Agonists, in Combination with PI3Kdelta/Gamma Inhibitors for Both Locoregional and Systemic Administration In another embodiment of this therapeutic approach, a novel oncolytic vaccinia virus termed VVL 15-NIL-IL12 is employed as an additional therapeutic virus to enhance the efficacy of the approaches described in Example 1 above. Several strains of oncolytic vaccinia virus have been reported, for example the Western Reserve, Wyeth and Lister strains. Various deletion mutants of each of these strains have been created. Wang et al (Patent WO2015/150809A1) have developed a TK-deficient vaccinia virus strain with an inactivated NIL gene which shows enhanced selectivity and antitumor efficacy. NIL is believed to inhibit apoptosis of infected cells as well as NF-kB activation. NIL gene deletion has been shown to lead to an increase in pro-inflammatory antiviral cytokines controlled by NF-kB in addition to modulating natural killer (NK) cell responses. The NIL deletion derivatives are described in Wang et al., 2015 (Patent WO2015/150809A1). To enhance the antitumor efficacy of VVL 15N1L, GM-CSF, IL-12, IL-21, tumor suppressor and other therapeutic genes are inserted into the NIL region of the VVL 15NL vector. These therapeutic "armed" VVL 15N1L vectors are used in combination with the treatments singly or multiply as described in Example 1 above to enhance the local and abscopal effects of treatment.

In addition to evaluating the approaches described in Example 1 and 2 above, the viral vectors are also combined with PI3K inhibitors. An example incorporating PI3Kdelta or PI3Kgamma/delta inhibitors is described to enhance intravenous administration of viral vectors. Animals receive IC87114 (PI3K delta inhibitor) at concentrations of 75 mg kg$^{-1}$ and then three hours later intra-venous VVL 15N1L vectors at $1\times10^8$ PFU/mouse in 100 µl of PBS via tail vein. This treatment is given at least three times on day 0, day 3, and day 5. These treatments are combined with the same therapies as described above. Tumor size and animal survival are measured and the data analyzed as described above demonstrating the increased efficacy of the treatments combined with Ad-p53 and/or Ad-IL24 and/or VVL 15NIL vectors, CD122/CD132 agonists, immune checkpoint inhibitors and PI3K inhibitors.

Example 3—Combination Therapy with Intra-Tumoral Ad-p53, a CD122/CD132 Agonist and Anti-PD-1 Treatment in Patients Progressing on Previous Treatments Including Immunotherapies The Ad-p53 is supplied at 2 mL volume per vial; each mL containing $1\times10^{12}$ viral particles (vp). It is provided as a sterile, viral suspension in phosphate buffered saline (PBS) containing 10% (v/v) glycerol as a stabilizer. Ad-p53 is diluted and filtered, per protocol described procedures, before administration. Anti-PD-1 therapy is administered according to the FDA approved package insert instructions. CD122/CD132 agonist therapy (e.g., IL-2/anti-IL-2 immune complex, IL-15/anti-IL-15 immune complex, an IL-15/IL-15 Receptor α-IgG1-Fc (IL-15/IL-15Rα-IgG1-Fc) immunocomplex, PEGylated IL-2, PEGylated IL-15, IL-2 muteins and/or IL-15 muteins) is administered in doses ranging between 5-100 ug/kg given either SQ or IV at intervals ranging from weekly to every 2-4 weeks. The CD122/CD132 agonist may be an IL-15 mutant (e.g., IL-15N72D) bound to an IL-15 receptor α/IgG1 Fc fusion protein, such as ALT-803.

The treatment is designed to improve the prognosis of advanced HNSCC patients for example, by treatment with Ad-p53, preferential CD122/CD132 agonist and anti-PD-1 antibody. The clinical efficacy of the combined therapy includes evaluations of overall response rate [ORR=partial response (PR)+complete response (CR)], complete remission rate (CRR), durable response rate (DRR=PR+CR maintained for at least 6 months); the rate and time to visceral organ metastases; progression free survival (PFS) and overall survival (OS). The effect of the study drugs on: lymphocyte phenotype and serum cytokines, disease-related biomarkers, antibody responses to selected antigens, and humoral and cellular responses to tumor antigens are also evaluated. Efficacy endpoints are correlated with PD-L1, PD-L2, immune cell infiltrates and tumor mutational burden biomarkers in exploratory analyses.

Patients receive intratumoral injections with Ad-p53 days 1, 2 and 3, every 28 days; Nivolumab infusions every 2 weeks starting Day 5 and a preferential CD122/CD132 agonist therapy (e.g. IL2/anti-IL2 immune complex, and/or IL15/anti-IL15 immune complex, and/or an IL15/IL15 Receptor α-IgG1-Fc (IL15/IL15Rα-IgG1-Fc) immunocomplex and/or PEGylated IL2 and/or PEGylated IL15 and/or IL2 muteins and/or IL15 muteins) is administered in doses ranging between 5-100 ug/kg given either SQ or IV at intervals ranging from weekly to every 2-4 weeks.

Determination of Ad-p53 Injection Dose (mL) and Ad-p53 Injection Method Based Upon Tumor Lesion Diameters Listed in the Table 3: Table 3 should be used to identify the Ad-p53 Injection Dose (mL) for each tumor lesion corresponding to its bi-dimensional Lesion Diameters measured on CT or MRI scans. The Ad-p53 Injection Dose in mL should be withdrawn from the provided 2 mL vials which contain $1\times10^{12}$ viral particles (vp)/mL. The Ad-p53 Injection Dose (mL) corresponding to the listed Lesion Diameters will result in each tumor lesion receiving an Ad-p53 dose of at least $1\times10^{11}$ viral particles (vp)/cm$^3$ of tumor volume. This treatment dose was determined from previous Ad-p53 clinical trials' tumor response, survival and safety data.

All tumor lesions should be treated. However, the total sum of Ad-p53 Injection Doses (mL) must be less than 25 mL as the MTD of Ad-p53 is $2.5\times10^{13}$ vp/treatment day). The Table below lists the corresponding Ad-p53 Injection Method to be utilized for each lesion based upon on the Ad-p53 Injection Dose (mL). Employ the Ad-p53 Injection Method for each lesion as listed in the Table below based upon the amount of the Ad-p53 Injection Dose (mL). Ad-p53 Injection Doses (mL) less than or equal to 2 mL should be administered by the Fine Needle Syringe technique while Ad-p53 Injection Doses (mL) equal to or greater than 4 mL should be administered with the Quadra-Fuse device shown below following its package insert instructions.

TABLE 3

Ad-p53 Injection Dose (mL) and Ad-p53 Injection Method Based on Lesion Diameters.

| Lesion Diameters$^a$ (cm) (L × W) | Ad-p53 Injection Dose$^b$ (mL) | Ad-p53 Injection Method$^c$ |
|---|---|---|
| 1 × 1 | 1 | Fine Needle Syringe |
| 2 × 1 | 2 | Fine Needle Syringe |
| 2 × 2 | 2 | Fine Needle Syringe |
| 3 × 2 | 2 | Fine Needle Syringe |
| 3 × 3 | 2 | Fine Needle Syringe |
| 4 × 1 | 2 | Fine Needle Syringe |
| 4 × 2 | 2 | Fine Needle Syringe |
| 4 × 3 | 2 | Fine Needle Syringe |
| 4 × 4 | 4 | Quadra-Fuse |
| 5 × 2 | 2 | Fine Needle Syringe |
| 5 × 3 | 2 | Fine Needle Syringe |
| 5 × 4 | 4 | Quadra-Fuse |
| 5 × 5 | 6 | Quadra-Fuse |
| 6 × 2 | 2 | Fine Needle Syringe |
| 6 × 3 | 4 | Quadra-Fuse |
| 6 × 4 | 5 | Quadra-Fuse |
| 6 × 5 | 8 | Quadra-Fuse |
| 6 × 6 | 12 | Quadra-Fuse |
| 7 × 2 | 2 | Fine Needle Syringe |
| 7 × 3 | 4 | Quadra-Fuse |
| 7 × 4 | 6 | Quadra-Fuse |
| 7 × 5 | 8 | Quadra-Fuse |
| 7 × 6 | 12 | Quadra-Fuse |

TABLE 3-continued

Ad-p53 Injection Dose (mL) and Ad-p53 Injection
Method Based on Lesion Diameters.

| Lesion Diameters[a] (cm) (L × W) | Ad-p53 Injection Dose[b] (mL) | Ad-p53 Injection Method[c] |
|---|---|---|
| 7 × 7 | 18 | Quadra-Fuse |
| 8 × 2 | 2 | Fine Needle Syringe |
| 8 × 3 | 4 | Quadra-Fuse |
| 8 × 4 | 6 | Quadra-Fuse |
| 8 × 5 | 10 | Quadra-Fuse |
| 8 × 6 | 14 | Quadra-Fuse |
| 8 × 7 | 20 | Quadra-Fuse |
| 8 × 8 | 24 | Quadra-Fuse |
| 9 × 2 | 2 | Fine Needle Syringe |
| 9 × 3 | 4 | Quadra-Fuse |
| 9 × 4 | 8 | Quadra-Fuse |
| 9 × 5 | 12 | Quadra-Fuse |
| 9 × 6 | 16 | Quadra-Fuse |
| 9 × 7 | 22 | Quadra-Fuse |
| 10 × 2 | 2 | Fine Needle Syringe |
| 10 × 3 | 4 | Quadra-Fuse |
| 10 × 4 | 8 | Quadra-Fuse |
| 10 × 5 | 12 | Quadra-Fuse |
| 10 × 6 | 18 | Quadra-Fuse |
| 10 × 7 | 24 | Quadra-Fuse |

[a]Lesion Diamters -- L is the longer diameter and W is shorter diamter in cm (round up to the nearest whole number).
[b]Ad-p53 Injection Dose in mL from vials containing $1 \times 10^{12}$ vp (virus particles)/mL that will result in each tumor lesion receiving an Ad-p53 dose of ~$1 \times 10^{11}$ viral particles (vp)/cm$^3$ of tumor volume. The total sum of the Ad-p53 Injection Dose (mL) must be less than 25 mL as the MTD pf Ad-p53 is $2.5 \times 10^{12}$ vp/treatment day.
[c]Ad-p53 InjectionMethod.

Ad-p53 Injection Methods: Employ the Ad-p53 Injection Method for each lesion as listed in the Table 3 based upon the amount of the Ad-p53 Injection Dose (mL). Ad-p53 Injection Doses (mL) less than or equal to 2 mL should be administered by the Fine Needle Syringe technique while Ad-p53 Injection Doses (mL) greater than 2 mL should be administered with the Quadra-Fuse device as described.

Fine Needle Syringe for Ad-p53 Injection Doses (mL) less than or equal to 2 mL: For lesions where the Ad-p53 Injection Dose (mL) is less than or equal to 2 mL, the Ad-p53 Injection Dose (either 1 or 2 mL) should be delivered using a standard 1 mL syringe with a 27 gauge needle. One-quarter of the total Ad-p53 Injection Dose (mL) should be injected into each quadrant of the tumor lesion positioning the needle while injecting to maximize distribution within each quadrant.

Figure 3:
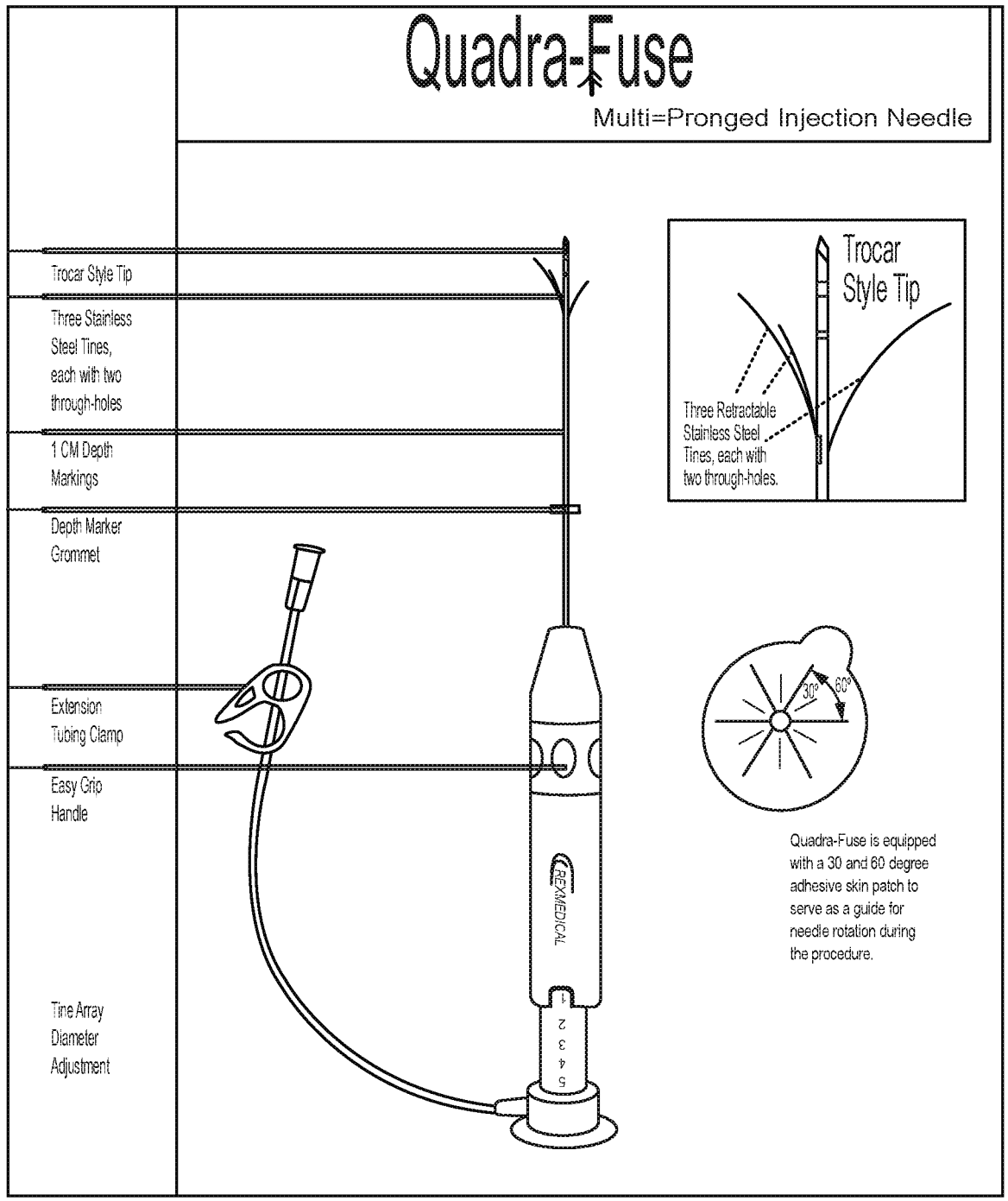
FIG. 3: QUADRA-FUSE™ Infusion Device. The QUADRA-FUSE™ (image obtained from REXMEDICAL®) is a multiple-tine infusion device with three tines extending from the trocar shaft (upper right insert) are deployed in adjustable diameters from 1-5 cm around the central needle axis depending upon the tumor lesion's shorter width (W) diameter. This lateral extension enables widespread dispersion of drug throughout the lesion. Each tine has two delivery through-holes (four fluid exits); thus, each infusion results in 12 delivery points.

Quadra-Fuse Device for Ad-p53 Injection Doses (mL) greater than 2m: For lesions where the Ad-p53 Injection Dose (mL) is greater than 2 mL, the Ad-p53 Injection Dose should be delivered using the Quadra-Fuse delivery device (Rex Medical, PA). The Quadra-Fuse device (an FDA Class 1 Medical Device) consists of a central trocar, from which three tines are extended in an adjustable 1-5 cm diameter radial orientation (FIG. 3).

The Quadra-Fuse device allows precise and diffuse delivery of drug in multiple areas of the lesion simultaneously as described in detail below.

1. The Ad-p53 Injection Dose (mL) from Table 3 matching the tumor lesion's bi-dimensional diameters is drawn into a standard syringe and attached to the Quadra-Fuse device's extension tubing.
2. The bottom half of the tumor lesion is treated first and the Quadra-Fuse central trocar tip is placed at the bottom of the lesion's longest Length diameter (L) using the device's depth marker to match the lesion's longest diameter under CT or Ultrasound guidance. The Quadra-Fuse device Tine Array Treatment Diameter is adjusted to one cm less than the shorter Width diameter (W) of the tumor lesion (Tine Array Treatment Diameter=Width Tumor Diameter—1 cm). After adjusting the Quadra-Fuse device to the Tine Array Treatment Diameter, the tines are opened and one quarter of the Ad-p53 Injection Dose (mL) is delivered at this location. (Note: The same Tine Array Treatment Diameter will be used for all four Ad-p53 Injection Dose infusions for each lesion). The tines are retracted, and the device is rotated 60 degrees at the same depth. The tines are then re-opened and the second quarter of the Ad-p53 Injection Dose (mL) is delivered at this location. These procedures effectively deliver half of the Ad-p53 treatment dose to the lower half of the tumor lesion.
3. To treat the upper half of the tumor lesion, the tines are again retracted, and the central trocar tip is moved up to the mid-point of the tumor lesion's longest L diameter. The tines are again extended to Tine Array Treatment Diameter=(Width Tumor Diameter—1 cm) and the third quarter of the Ad-p53 Injection Dose (mL) is delivered at this location. The tines are retracted, and the device is rotated 60 degrees at the same mid-point tumor depth. The tines are then re-opened and the final quarter of the Ad-p53 Injection Dose (mL) is delivered at this location.

In this manner, a total of 48 sites within each tumor lesion will receive Ad-p53. Each tine has two through-holes (four fluid exits) for a total of 12 points of simultaneous drug infusion per each tine array deployment (4 Tine Array Deployments×12=48 sites of Ad-p53 delivery).

Treatment of a 5×4 cm Tumor Lesion: As listed in the Table 3, a tumor with Lesion Diameters of L (Longest Diameter)=5 cm and W (Shortest Diameter)=4 cm will be treated with an Ad-p53 Injection Dose of 4 mL by the Quadra-Fuse Ad-p53 Injection Method.

The initial placement of the Quadra-Fuse central trocar tip under CT or US guidance should be at the bottom of the longer L=5 cm tumor diameter. The tines should be expanded to the Tine Array Treatment Diameter of 3 cm (Width Tumor Diameter 4 cm–1 cm=3 cm) and the first quarter of the treatment dose (1 mL) is infused. (Note: The same Tine Array Treatment Diameter will be used for all four Ad-p53 Injection Dose infusions for this lesion). The tines are retracted, and the device is rotated 60 degrees at the same bottom of the tumor 5 cm depth. The tines are re-expanded to the Tine Array Treatment Diameter of 3 cm and the second quarter 1 mL Ad-p53 dose is infused. These procedures have distributed half of the Ad-p53 Injection Dose to the bottom half of the tumor.

To treat the upper half of the tumor lesion, the depth of the Quadra-Fuse central trocar is raised to the midpoint of the longest lesion diameter=2.5 cm. The tines are again expanded to the Tine Array Treatment Diameter of 3 cm and the third quarter of the treatment dose (1 mL) is infused. While maintaining the same intra-tumor depth of 2.5 cm along the longest tumor diameter, retract the tines, rotate the central trocar 60° and re-expand the tines to the Tine Array Treatment Diameter of 3 cm and infuse the fourth and final quarter 1 mL Ad-p53 dose. These procedures have distributed half of the Ad-p53 Injection Dose to the upper half of the tumor. Collectively, these procedures will deliver 4 mL of Ad-p53 to 48 infusion points within the tumor lesion.

Duration of Treatment: The duration of one treatment cycle is 28 days (4 weeks). Day one of the treatment cycle will be the first day of study treatment administration. Treatment regimens are as follows:

Treatment Regimens: Scheduled treatment days will be on days 1, 2 and 3, every 28 days with Ad-p53. Nivolumab will be administered every 2 weeks, starting Day 5. Anti-PD-1 therapy is administered according to the FDA approved package insert instructions. Preferential CD122/CD132 agonist therapy (e.g. IL2/anti-IL2 immune complex, and/or IL15/anti-IL15 immune complex, and/or an IL15/IL15 Receptor α-IgG1-Fc (IL15/IL15Rα-IgG1-Fc) immunocomplex and/or PEGylated IL2 and/or PEGylated IL15 and/or IL2 muteins and/or IL15 muteins) is administered in doses ranging between 5-100 ug/kg given either SQ or IV at intervals ranging from weekly to every 2-4 weeks.

On study day 28 or 29, examinations to evaluate tumor location(s) and measurements will be completed, prior to the start of a new treatment cycle.

Patients are treated for three or more cycles unless there is local disease progression (excluding new treatable lesions) or unacceptable adverse events.

Criteria for Efficacy Evaluation:
1. Tumor size is monitored by CT or MRI. The measurement is performed on study day 28 or 29 prior to the injections on day 1 of the third cycle if CT or MRI, with scans every 8 weeks. RECIST 1.1 criteria will be applied.
2. Duration of response is defined as time elapsed from the date of response to time of progression.
3. Progression Free Survival is defined as time elapsed from the day of randomization to the recorded date of progression.
4. Overall survival is defined as time elapsed from day of randomization to death.
5. Efficacy endpoints are correlated with PD-L1, PD-L2, immune cell infiltrates and tumor mutational burden biomarkers in exploratory analyses Safety Evaluation:
1. Adverse events reporting.
2. Physical examinations, vital signs, laboratory tests including CBC, biochemistry, and urinalysis.
3. Adenovector bio distribution with antibody testing.

Favorable biomarkers of Ad-p53 efficacy are required for treatment and study patient inclusion criteria and include either wild type p53 gene sequence or less than 20% p53-positive tumor cells by immunohistochemistry, as described in Sobol et al., 2012.

In view of the recent breakthrough designation and accelerated approvals of anti-PD-1 therapies in recurrent HNSCC, we conducted a meta-analysis of the Ad-p53 treatment data in recurrent HNSCC patients to identify treatment doses and schedules with the potential to improve upon published anti-PD-1 results. The meta-analysis involved recurrent HNSCC patients with favorable p53 biomarker profiles (n=54) most of whom were treated with prior surgery, radiation and platinum-based chemotherapy. In the meta-analysis, the highest response rates were observed in clinical trials where Ad-p53 was administered in treatment schedules of three times per week intratumorally either as three consecutive daily treatments during the first week or every other day for the first 2 weeks of each monthly treatment cycle. All responders (defined by RECIST 1.1 criteria) had received Ad-p53 doses greater than $7 \times 10^{10}$ viral particles/cm3 of tumor volume.

As shown in the Table below, there was a statistically significant difference in tumor responses between patients treated with greater than $7 \times 10^{10}$ viral particles/cm³ compared to patients treated at lower Ad-p53 doses (Tumor Response 31% (9/29) for Ad-p53>$7 \times 10^{10}$ viral particles/cm³ versus 0% (0/25) for Ad-p53<$7 \times 10^{10}$ viral particles/cm³; p=0.0023).

TABLE 6

RECIST Target Lesion Response Rate by Ad-p53 HNSCC

| Dose Ad-p53 vp/cm³ | # Responders | # Non-Responders | Response Rate % | P value two-sided Fisher's Exact Test |
|---|---|---|---|---|
| >7 × 10¹⁰ | 9 | 20 | 31.0% (9/29) | 0.0023 |
| <7 × 10¹⁰ | 0 | 25 | 0% (0/25) | |

FIG. 1 shows the waterfall plots of tumor responses for patient subgroups treated with Ad-p53≥$7 \times 10^{10}$ viral particles/cm³ (left panel) compared to Ad-p53 doses ≤$7 \times 10^{10}$ viral particles/cm³ (right panel).

A more detailed examination of the Ad-p53 responders revealed that the majority of responders (7/9 patients) had received doses of Ad-p53 near or exceeding $1 \times 10^{11}$ vp/cm³ (range 7.81 to $333.2 \times 10^{10}$ vp/cm³).

Figure 2:
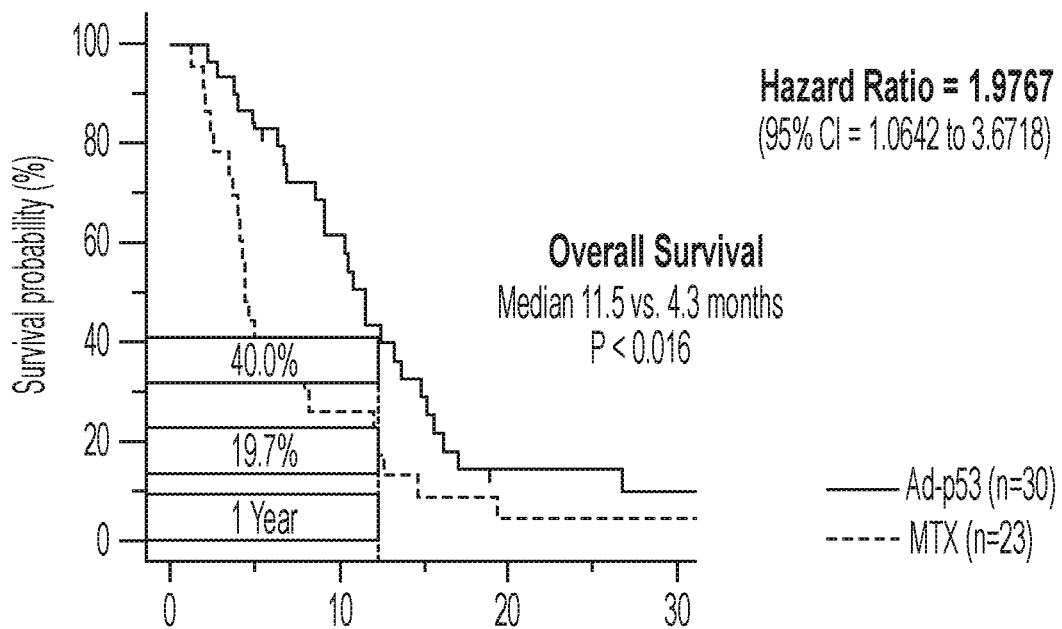
FIG. 2: Superior Overall Survival for Ad-p53 Biomarker/Dose Optimized Treatment. The superior one year and overall survival of patients with favorable tumor p53 biomarker profiles treated with Ad-p53 doses >$7 \times 10^{10}$ viral particles/cm$^3$ compared to methotrexate treated patients with favorable tumor p53 biomarker profiles. The results demonstrate a statistically significant increase in overall survival for favorable tumor p53 biomarker and Ad-p53 dose optimized treatment compared to methotrexate (median survival of Ad-p53 treatment 11.5 months vs. 4.3 for methotrexate; p<0.016, HR 1.9767).

The one year and overall survival of patients with favorable Ad-p53 biomarker profiles treated with Ad-p53 doses ≥$7 \times 10^{10}$ viral particles/cm³ compared to methotrexate treated patients with favorable Ad-p53 biomarker profiles from the previous Phase 3 recurrent HNSCC clinical trial. The results are shown in FIG. 2 and demonstrate a statistically significant increase in overall survival for Ad-p53 biomarker and dose optimized Ad-p53 treatment compared to methotrexate (median survival of Ad-p53 treatment 11.5 months vs. 4.5 for methotrexate; p<0.016, HR 1.9767)

As shown in Table 4, optimal Ad-p53 recurrent HNSCC treatment from the meta-analysis data compared favorably to standard of care (SOC) chemotherapy and anti-PD-1 treatment reported by Ferris et al., 2016 with respect to the efficacy endpoints of tumor response, 1-year survival, and median overall survival.

TABLE 4

Comparison of Efficacy Endpoints Ad-p53, Standard of Care (SOC) and Anti-PD-1 in Recurrent Head and Neck Squamous Cell Carcinoma (HNSCC)

| Efficacy Endpoint | Standard of Care | Ad-p53* | Anti-PD-1 |
|---|---|---|---|
| Tumor Response | ~5% | 31% | 16% |
| One Year Survival | 16.6% | 40.0% | 36.6% |
| Median Survival | 5.1 months | 11.5 months | 7.5 months |

*N = 30; Predictive p53 Biomarker and Dose Optimized Population

Hence, the dose for the Ad-p53 ($1 \times 10^{11}$ vp/cm³ of tumor volume) is chosen based upon this data for combination treatment with preferential CD122/CD132 agonist and anti-PD-1 therapy.

Example 4—Combination Therapy with Ad-MDA7 (IL24), CD122/CD132 Agonist and Anti-PD1 Antibody Anti-PD-1 treatment has become an approved therapy for melanoma patients with advanced, unresectable disease. While anti-PD-1 represents a breakthrough treatment that benefits many patients, clinical data from multiple studies indicate that the majority of patients do not respond to this therapy.

This therapy is designed to improve the prognosis of advanced melanoma patients, by treatment with Ad-MDA-7 (note Ad-MDA-7=Ad-IL24) and a CD122/CD132 agonist and an anti-PD-1 antibody. The clinical efficacy of the combined therapy includes evaluations of overall response rate [ORR=partial response (PR)+complete response (CR)], complete remission rate (CRR), durable response rate (DRR=PR+CR maintained for at least 6 months); the rate and time to visceral organ metastases; progression free survival (PFS) and overall survival (OS). The effect of the study drugs on: lymphocyte phenotype and serum cytokines, disease-related biomarkers, antibody responses to selected antigens, and humoral and cellular responses to tumor antigens is also evaluated.

In addition, tumor samples are examined for pathologic correlates of clinical activity, including (but not limited to) the abundance and characteristics of inflammatory infiltrates (e.g., CD8 and CD4 cells and expression of Programmed Death-1 (PD-1) and Programmed Death-Ligand 1 (PD-L1) on lymphocytes and tumor cells, respectively) and tumor mutational burden.

Patients are treated for up to 12 months or up to 18 months if they are in response at that time. Patients who are in response at 12 months (CR or PR) should continue to be treated until 18 months or clinically relevant progressive disease (PDr), whichever is the earlier.

Because immunotherapy may cause a delayed onset of tumor response and be associated with tumor inflammation mistaken for tumor progression, there are three types of PD defined. Non-clinically relevant progressive disease (PDn) is defined as PD in patients who do not suffer a decline in performance status and/or in the opinion of the physician do not require alternative therapy. Patients showing PDn are allowed to continue treatment. Clinically relevant progressive disease (PDr) is defined as PD that is associated with a decline in performance status and/or in the opinion of the physician the patient requires alternative therapy. Patients with PDr are allowed to remain on treatment until 24 weeks of therapy unless, in the opinion of the physician, other treatment is warranted. CNS progressive disease (PDcns) is defined as progression in the central nervous system (brain).

The treatment, Ad-IL24, is provided as a frozen vial suspension (2.0 mL/vial) at a concentration of $1\times10^{12}$ vp/mL in a neutral buffer containing saline and 10% glycerol. There is no minimum size for a tumor mass to be eligible for injection. A cutaneous lesion should be included in the first group of tumors to be treated to enhance immune effects of therapy mediated by dermal antigen presenting cells.

An individual patient can have up to 20 lesions with no single lesion greater than 5 cm in longest diameter. The intent is to eventually treat all lesions with at least one cycle of Ad-IL24 therapy (twice weekly intra-tumoral injection for 3 weeks). Each patient's lesions are split into Ad-IL24 treatment groups with the number of lesions in each treatment group dictated by tumor diameter and dose escalation cohort such that the Ad-IL24 delivered on each treatment day will not exceed the total volume dose permitted for each treatment day specified in the dose escalation schema specified in Table 4. The total dose (volume) delivered to the tumor(s) will not exceed the volume specified in Table 4 and the amount injected into each individual tumor within a treatment group is dependent on the size of the tumor nodule(s) and are determined according to the following algorithm:

Up to 0.1 mL for tumors up to 0.5 cm longest dimension.
Up to 0.5 mL for tumors of 0.5 to 1.5 cm longest dimension.
Up to 1.0 mL for tumors of 1.5 to 2.5 cm longest dimension.
Up to 2.0 mL for tumors of 2.5 to 5 cm longest dimension.

The maximum volume injected into any individual lesion is 2 mL. The maximum dose on any one treatment day is either 2, 4 or 6 mL depending on the treatment dose escalation cohort specified in the Tables below.

TABLE 4

Treatment Schedule.

| Cycle | ONE | | | | TWO | | | | THREE | | | |
|---|---|---|---|---|---|---|---|---|---|---|---|---|
| Week | 1 | 2 | 3 | 4 | 1 | 2 | 3 | 4 | 1 | 2 | 3 | 4 |
| Day | M T | M T | M T | M T | M T | M T | M T | | M T | M T | M T | |
| Ad-IL24 | + + | + + | + + | | + + | + + | + + | | + + | + + | + + | |
| Nivo.* | | | | | + | | + | | + | | + | |
| Pembro.* | | | | | + | | + | | | + | | |

| Cycle | FOUR | | | | FIVE | | | | SIX | | | |
|---|---|---|---|---|---|---|---|---|---|---|---|---|
| Week | 1 | 2 | 3 | 4 | 1 | 2 | 3 | 4 | 1 | 2 | 3 | 4 |
| Day | M T | M T | M T | M T | M T | M T | M T | | M T | M T | M T | |
| Ad-IL24 | + + | + + | + + | | + + | + + | + + | | + + | + + | + + | |
| Nivo. | + | | + | | + | | + | | + | | + | |
| Pembro. | | + | | | + | | + | | | + | | |

*Patients are treated with the anti-PD-1 to which they became refractory.

TABLE 5

Dose Escalation Design.

| COHORT # | Number of Patients | Ad-IL24 Dose/ Monday and Thursday | Maximum Total Tumor Diameter Treated/Ad-IL24 Volume Administered/ Day | Nivolumab 3 mg/kg IV infusion Patients refractory to nivolumab | Pembrolizumab 2 mg/kg IV infusion Patients refractory to pembrolizumab |
|---|---|---|---|---|---|
| Dose Escalation 3 | 6-16 | $6 \times 10^{12}$ vp | 20 cm/6 ml | Same * | Same * |
| Dose Escalation 2 | 3-12 | $4 \times 10^{12}$ vp | 10 cm/4 ml | Same * | Same * |
| Starting Dose 1 | 3-12 | $2 \times 10^{12}$ vp | 5 cm/2 ml | 3 mg/kg/IV* | 2 mg/kg/IV* |
| Dose de-escalation 2 | 3-12 | $1 \times 10^{12}$ vp | 2.5 cm/1 ml | Same * | Same * |
| Dose de-escalation 3 | 3-12 | $5 \times 10^{11}$ vp | 1.25 cm/0.5 ml | Same * | Same * |

The treatment regimens in the Tables above will be combined with a preferential CD122/CD132 agonists such as an IL2/anti-IL2 immune complex, and/or IL15/anti-IL15 immune complex, and/or an IL15/IL15 Receptor α-IgG1-Fc (IL15/IL15Rα-IgG1-Fc) immunocomplex and/or PEGylated IL2 and/or PEGylated IL15 and/or IL2 muteins and/or IL15 muteins) which is administered in doses ranging between 5-100 ug/kg given either SQ or IV at intervals ranging from weekly to every 2-4 weeks.

Summary: The animal study populations described in the Examples use highly aggressive forms of cancer, known to be generally resistant to immune therapies. Surprisingly, loco-regional tumor suppressor and oncolytic virus treatments combined with preferential CD122/CD132 therapy reverses resistance to systemic immune checkpoint inhibitor therapy, demonstrated unexpected synergy with immune checkpoint inhibitor treatment and the combined therapies induced superior abscopal effects on distant tumors that were not treated with tumor suppressor or oncolytic viral therapy. In highly immune therapy resistant cancers, these treatments surprisingly resulted in complete tumor remissions and curative outcomes.

All the methods disclosed and claimed herein can be made and executed without undue experimentation considering the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

Aghi et al., Cancer Res., 59:3861-3865, 1999.
Aksentijevich et al. Human Gene Ther. 7:1111, 1996.
Aoki et al., J Cell Sci., 120:3327-35, 2007.
Backman et al., Curr Opin Neurobiol., 12(5): 516, 2002.
Baichwal and Sugden, In: Gene Transfer, Kucherlapati R, ed., New York, Plenum Press, pp. 1 17-148, 1986.
Bailey and Levine, J. Pharm. Biomed. Anal., 11: 285-292, 1993.
Bernstein et al., Mutat Res., 511(2): 145-78, 2002.
Bouvet et al., Cancer Res., 58:2288-2292, 1998.
Buller et al., Cancer Gene Therapy, 9: 553-566, 2002.
Camacho et al. J Clin Oncology, 22(145), 2004.
Carroll et al., Mol Cancer Therapeutics, 1:49-60, 2001.
Caudell et al., J Immunol., 168:6041-6046, 2002.
Chada et al., Cancer Gene Ther., 13:490-502, 2006.444-448, 1998.
Chada et al., Cancer Gene Ther., 13:490-502, 2006.444-448, 1998.
Chase et al., Nat. Biotechnol., 16:
Chen and Okayama, Mol. Cell. Biol. 7:2745-2752, 1987.
Choi et al. Gene Therapy, 17: 190-201, 2010.
Corrales et al., Cell Reports, 11, 1018-1030, 2015.
Couch et al, Am. Rev. Resp. Dis., 88:394-403, 1963.
Doronin et al, Virology, 305:378-387, 2003.
Dubois et al., 2008.
European Patent Application No. EP2403951A2
European Patent Application No. EP2724728A1
Fraley et al, Proc. Nat'l Acad. Sci. 76:3348-3352, 1979.
Fujiwara et al., J Natl Cancer Inst, 86: 1458-1462, 1994.
Ghiringhelli et al., Biomed. J., 38:111-116, 2015.
Giono et al., J Cell Physiol. 209(1):13-20, 2006.
Gladden et al., Dev Cell. 16; 19(5):727-39, 2010.
Graham and Van Der Eb, Virology, 52:456-467, 1973.
Greenberg et al., Chromosoma. 117(4):305-17, 2008.
Gurnani et al., Cancer Chemother Pharmacol., 44(2): 143-151, 1999.
Harland and Weintraub, J. Cell Biol, 101:1094-1099, 1985.
Hartwell et al., Science, 266: 1821-1828, 1994.
Hashemi et al., Cancer Lett., 180(2): 211-21, 2002.
Heldin et al., Curr Opin Cell Biol. 21(2):166-76, 2009.
Hurwitz et al. Proc Natl Acad Sci. 95(17): 10067-10071, 1998.
Hynes and Ferretti, Methods Enzymol., 235: 606-616, 1994.
Iannello et al., J Experimental Medicine, 210(10):2057-2069.
IMLYGIC™ [package insert]. Amgen, Inc., Thousand Oaks, CA; October 2015.

Inoue et al., *Cancer Letters*, 157:105-112, 2000.
International Patent Application No. WO1995001994.
International Patent Application No. WO1998042752.
International Patent Application No. WO2000037504.
International Patent Application No. WO2001014424.
International Patent Application No. WO2004058801.
International Patent Publication No. WO 2005/003168.
International Patent Publication No. WO 2005/009465.
International Patent Publication No. WO 2006/003179.
International Patent Publication No. PCT/KR2011/004693
International Patent Publication No. WO 2006/072625.
International Patent Publication No. WO 2006/072626.
International Patent Publication No. WO 2007/042573.
International Patent Publication No. WO 2008/084106.
International Patent Publication No. WO 2010/065939.
International Patent Publication No. WO 2012/071411.
International Patent Publication No. WO 2012/160448.
International Patent Publication No. WO 2012009703.
International Patent Publication No. WO1995011986.
International Patent Publication No. WO2014/047350
International Patent Publication No. WO2014/047350.
International Patent Publication No. WO2014/138314
International Patent Publication No. WO2014/138314.
International Patent Publication No. WO2014100014A1
International Patent Publication No. WO2015/016718.
International Patent Publication No. WO2015/027163
International Patent Publication No. WO2015/027163.
International Patent Publication No. WO2015/150809.
International Patent Publication No. WO2016/009017
International Patent Publication No. WO2016/009017.
Jiang et al., *Proc. Natl. Acad. Sci.*, 93:9160-9165.
Johannessen et al., *Proc Natl Acad Sci USA*. 102(24):8573-8, 2005.
Kaelin et al., *Nat Rev Cancer*, 2(9):673-82, 2002.
Kawabe et al., *Mol Ther.* 6(5):637-44, 2002.
Kawabe et al., *Mol. Ther.* 6(5): 637-644, 2002.
Kim et al. *Journal of the National Cancer Institute*, 98(20): 1482-1493, 2006.
Kotin et al, *Proc. Natl. Acad. Sci. USA,* 87:221 1-2215, 1990.
Kreil, *Protein Sci.*, 4:1666-1669, 1995.
Li Phase 1 Clinical Trial, *Gene Therapy;* 16 376-382, 2009.
Lichtenstein et al, *Int. Rev. Immunol.*, 23:75-111, 2004.
Liu et al *J. Biol. Chem.*, 270:24864, 1995.
Lui et al., *Gene Therapy,* 10:292-303, 2003.
Lui et al., *Gene Therapy,* 10:292-303, 2003.
Mann et al, *Cell,* 33:153-159, 1983.
Markowitz et al., *J. Virol.,* 62: 1 120-1 124, 1988.
McLaughlin et al, *J. Virol.,* 62:1963-1973, 1988.
Mellman et al., *Nature* 480:480-489, 2011.
Mellman et al., *Nature,* 480:480-489, 2011.
Mhashilkar et al., *Mol. Medicine* 7(4): 271-282, 2001.
Miyahara et al., *Cancer Gene Therapy,* 13:753-761, 2006.
Mokyr et al., *Cancer Res.,* 58:5301-5304, 1998.
MultiVir Inc., Form S-1 Registration Statement, U.S. Securities and Exchange Commission, 2015
Muzyczka, *Curr. Top. Microbiol Immunol,* 158:97-129, 1992.
Nemunaiti et al., *Clin Cancer Res.,* 15(24):7719-25, 2009.
Nicolas and Rubenstein, In: Vectors: A survey of molecular cloning vectors and their uses, Rodriguez and Denhardt (eds.), Stoneham: Butterworth, pp. 493-513, 1988.
Nicolau and Sene, *Biochim. Biophys. Acta,* 721:185-190, 1982.
Nicolau et al. *Methods Enzymol,* 149:157-176, 1987.
Nishikawa et al., *Mol. Ther.*, 9(8):818-828, 2004b.
Nishikawa et al., *Oncogene,* 23(42): 7125-7131, 2004a.
Nishizaki M, et al., *Clin. Can. Res.,* 5: 1015-1023, 1999.
Ohashi M, et al., *Gut,* 44:366-371, 1999.
Pardoll, *Nat Rev Cancer,* 12(4): 252-64, 2012.
Pardoll, *Nature Rev Cancer,* 12:252-264, 2012.
Philip et al. *J. Biol. Chem.,* 268: 16087, 1993.
Pierceall et al., *Dev Biol.,* 166:654-665, 1994.
Qin, X., et al., *Biol Reprod.,* 56:800-11, 1997a.
Qin, X., et al., *Biol Reprod.,* 56:812-20, 1997b.
Rhode et al., *Cancer Immunol Res,* 4(1):49-60, 2016.
Ridgeway, In: Vectors: A survey of molecular cloning vectors and their uses, Rodriguez R L.
Denhardt D T, ed., Stoneham: Butterworth, pp. 467-492, 1988.
Rippe et al, *Mol. Cell Biol,* 10:689-695, 1990.
Rocco et al., Exp Cell Res., 10; 264(1):42-55, 2001.
Rosenberg et al., *Nat Med.,* 10(19): 909-15, 2004.
Samulski et al, *EMBO J.* 10:3941-3950, 1991.
Samulski et al, *J Virol,* 63:3822-3828, 1989.
Sherwood et al., *Endocrinology* 114:806-13, 1984.
Sobol R E, et al., Chapter 11: Tp53 Gene Therapy for Cancer Treatment and Prevention, NY: Springer Science+Business Media, 2013.
Solodin et al, *Biochemistry,* 34: 13537, 1995.
Spitz et al., *Clin Cancer Research,* 2: 1665-1671, 1996.
Starker et al., *Curr Opin Oncol.,* 21(1):29-33, 2009.
Swisher et al., *Clin Cancer Research,* 9:93-101, 2003.
Tatebe S, et al., *Int. J Oncol.,* 15: 229-235, 1999.
Tatebe S, et al., *Int. J Oncol.,* 15: 229-235, 1999.
Tchekmedyian et al., *Oncology,* 29(12):990-1002, 2015.
Temin, n: *Gene Transfer,* Kucherlapati (ed.), New York: Plenum Press, pp. 149-188, 1986.
Textor et al., *Cancer Res.,* 71(18):5998-6009, 2011.
Thierry et al. *Proc. Natl. Acad. Sci.,* 92(21):9742-6, 1995.
Timiryasova et al., *Biotechniques.* 31:534, 6, 8-40, 2001.
Toda et al., *Mol. Therapy,* 2(4): 324-329, 2000.
Tollefson et al., *J. Virol.,* 70: 2296-2306, 1996.
Top et al, *J. Infect. Dis.,* 124:155-160, 1971.
Tsukamoto et al, *Nature Genetics,* 9:243, 1995.
U.S. Patent Application No. US20110008369.
U.S. Patent Application No. US2014022021.
U.S. Patent Application No. US20140294898.
U.S. Pat. No. 4,797,368.
U.S. Pat. No. 4,835,251.
U.S. Pat. No. 5,023,321.
U.S. Pat. No. 5,139,941.
U.S. Pat. No. 5,302,523.
U.S. Pat. No. 5,384,253.
U.S. Pat. No. 5,464,765.
U.S. Pat. No. 5,580,859.
U.S. Pat. No. 5,589,466.
U.S. Pat. No. 5,656,610.
U.S. Pat. No. 5,702,932.
U.S. Pat. No. 5,736,524.
U.S. Pat. No. 5,780,448.
U.S. Pat. No. 5,789,215.
U.S. Pat. No. 5,811,395
U.S. Pat. No. 5,925,565
U.S. Pat. No. 5,935,819
U.S. Pat. No. 5,945,100
U.S. Pat. No. 5,981,274
U.S. Pat. No. 5,994,136
U.S. Pat. No. 5,994,624
U.S. Pat. No. 6,013,516
U.S. Pat. No. 6,207,156
U.S. Pat. No. 7,223,593
U.S. Pat. No. 7,537,924

U.S. Pat. No. 8,017,114
U.S. Pat. No. 8,119,129
U.S. Pat. No. 8,329,867
U.S. Pat. No. 8,354,509
U.S. Pat. No. 9,746,471
U.S. Patent Publication No. US 2017/0044229
U.S. Patent Publication No. US20060257361
U.S. Patent Publication No. US20070160578
U.S. Patent Publication No. US2011/0039778.
U.S. Patent Publication No. US2015/0202290
U.S. Patent Publication No. US2015/0202290.
U.S. Patent Publication No. US20170183403
U.S. Pat. No. 8,067,567
Vincent et al., *Cancer Res.*, 70(8):3052-3061, 2010.
Waku et al., *J Immunol.*, 165:5884-5890, 2000.
Xu et al. *Gene Therapy*, 22(3): 31-40, 2015.
Xu et al., *J Gastroenterol.*, 48(2):203-13, 2013.
Xue et al., *Nature*, 445(7128):656-660, 2007.
Yachida et al., *Arch Pathol Lab Med.* 133(3):413-22, 2009.
Yamasaki, *Cancer Treat Res.* 115:209-39, 2003.
Young et al., *Cancer Gene Ther.*, 20(9): 531-537, 2013.
Yu and Fang, *Current Cancer Drug Targets;* 7 659-670, 2007.
Yun et al., *Human Gene Therapy* 23:609-622, 2012.
Zeimet and Marth, *The Lancer Oncology*, 7:415-422, 2003.
Zhang et al., *Cancer Gene Ther*, 22:17-22, 2015.
Zhang et al., *Cancer Gene Ther.*, 1:5-13, 1994.

What is claimed is:

1. A method of treating cancer in a subject comprising administering an effective amount of (1) a nucleic acid encoding p53 and/or a nucleic acid encoding MDA-7, (2) at least one agonist which preferentially binds to CD122/CD132, wherein the agonist is selected from the group consisting of an IL-2/anti-IL-2 immune complex, an IL-15/anti-IL-15 immune complex, an IL-15/IL-15 Receptor α-IgG1-Fc (IL-15/IL-15Rα-IgG1-Fc) immune complex, PEGylated IL-2, PEGylated IL-15, IL-2 mutein, IL-15 mutein, and IL-15 mutant bound to an IL-15 receptor α/IgG1 Fc fusion protein, and (3) at least one immune checkpoint inhibitor to the subject; and wherein the immune checkpoint inhibitor is an inhibitor of PD-1 or PD-L1.

2. The method of claim 1, wherein the subject is administered a nucleic acid encoding p53.

3. The method of claim 1, wherein the subject is administered a nucleic acid encoding MDA7.

4. The method of claim 1, wherein the subject is administered a nucleic acid encoding p53 and a nucleic acid encoding MDA7.

5. The method of claim 1, wherein the IL-15 is pre-complexed with IL-15Ra to preferentially bind to CD122/CD132.

6. The method of claim 1, wherein 1, 2, 3, or 4 CD122/CD132 agonists are administered to the subject.

7. The method of claim 1, wherein the at least one agonist which preferentially binds to CD122/CD132 is not F42K.

8. The method of claim 1, wherein the cancer is metastatic.

9. The method of claim 1, wherein the nucleic acid encoding p53 and/or the nucleic acid encoding MDA-7 is in an expression cassette in a viral vector.

10. The method of claim 9, wherein the viral vector is an adenoviral vector, a retroviral vector, a vaccinia viral vector, an adeno-associated viral vector, a herpes viral vector, a vesicular stomatitis viral vector, a polyoma viral vector.

11. The method of claim 9, wherein the viral vector is an adenoviral vector.

12. The method of claim 11, wherein the adenoviral vector is further defined as an adenoviral vector with increased expression of ADP.

13. The method of claim 1, wherein the nucleic acid encoding p53 and/or the nucleic acid encoding MDA-7 is administered to the subject intratumorally.

14. The method of claim 1, wherein the cancer is melanoma, non-small cell lung, small-cell lung, lung, hepatocarcinoma, retinoblastoma, astrocytoma, glioblastoma, leukemia, neuroblastoma, head, neck, breast, pancreatic, prostate, renal, bone, testicular, ovarian, mesothelioma, cervical, gastrointestinal, urogenital, respiratory tract, hematopoietic, musculoskeletal, neuroendocrine, carcinoma, sarcoma, central nervous system, peripheral nervous system, lymphoma, brain, colon or bladder cancer.

15. The method of claim 1, further comprising administering at least one additional anticancer treatment.

16. The method of claim 15, wherein the at least one additional anticancer treatment is surgical therapy, chemotherapy, radiation therapy, hormonal therapy, immunotherapy, small molecule therapy, receptor kinase inhibitor therapy, anti-angiogenic therapy, cytokine therapy, cryotherapy, radioablation or a biological therapy.

17. The method of claim 1, wherein the immune checkpoint inhibitor is an anti-PD-1 antibody selected from the group consisting of nivolumab, pembrolizumab, pidilizumab, AMP-514, REGN2810, CT-011, BMS 936559, MPDL328OA and AMP-224.

18. A method of treating cancer in a subject comprising administering an effective amount of at least one oncolytic virus and at least one CD122/CD132 agonist to the subject.

19. A pharmaceutical composition comprising (a) a nucleic acid encoding p53 and/or a nucleic acid encoding MDA-7; and (b) at least one CD122/CD132 agonist.

20. The composition of claim 19, wherein the composition comprises a nucleic acid encoding p53.

21. The composition of claim 19, wherein the composition comprises a nucleic acid encoding MDA-7.

22. The composition of claim 19, wherein the composition comprises a nucleic acid encoding p53 and MDA-7.

23. The method of claim 1, wherein administering results in a decrease in primary and contralateral tumor volume as compared to tumor volume prior to administering the effective amount of (1) a nucleic acid encoding p53 and/or a nucleic acid encoding MDA-7, (2) at least one agonist which preferentially binds to CD122/CD132, and (3) at least one immune checkpoint inhibitor to the subject.

* * * * *

UNITED STATES PATENT AND TRADEMARK OFFICE
CERTIFICATE OF CORRECTION

PATENT NO. : 12,454,561 B2  
APPLICATION NO. : 15/733619  
DATED : October 28, 2025  
INVENTOR(S) : Robert E. Sobol et al.

Page 1 of 1

It is certified that error appears in the above-identified patent and that said Letters Patent is hereby corrected as shown below:

In the Claims

Claim 5, Column 85, Line 50, delete "IL-15Ra" and replace it with --IL-15Rα-- therefor Signed and Sealed this  
Twentieth Day of January, 2026

John A. Squires  
*Director of the United States Patent and Trademark Office*